(12) United States Patent
Kobayashi et al.

(10) Patent No.: US 7,813,430 B2
(45) Date of Patent: Oct. 12, 2010

(54) METHOD AND APPARATUS FOR DECIMATION MODE DETERMINATION UTILIZING BLOCK MOTION

(75) Inventors: Seiji Kobayashi, Tokyo (JP); Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1565 days.

(21) Appl. No.: 11/119,122

(22) Filed: Apr. 30, 2005

(65) Prior Publication Data

US 2005/0259740 A1    Nov. 24, 2005

(30) Foreign Application Priority Data

May 18, 2004    (JP)    ............ P2004-147739

(51) Int. Cl.
*H04N 7/12*    (2006.01)
(52) U.S. Cl. ................................. 375/240.21
(58) Field of Classification Search ............. 375/240.21
See application file for complete search history.

(56) References Cited

U.S. PATENT DOCUMENTS 5,592,226 A * 1/1997 Lee et al. ............... 375/240.14

2004/0036807 A1 * 2/2004 Takahashi et al. ........... 348/700

FOREIGN PATENT DOCUMENTS

JP    01-231583    9/1989
JP    2005-198268    7/2005

OTHER PUBLICATIONS

Japanese Office Action issued on Nov. 10, 2009 in connection with corresponding JP Application No. 2005-052678.

* cited by examiner

*Primary Examiner*—Y. Lee
*Assistant Examiner*—Richard Torrente
(74) *Attorney, Agent, or Firm*—Sonnenschein Nath & Rosenthal LLP

(57) ABSTRACT

In an apparatus that converts (compresses) motion image data, the amount of motion of a subject in a block of motion image data is detected, and spatial decimation is performed in a mode in which sampling point positions are fixed or in a mode in which sampling point positions are shifted, depending on the detected amount of motion. When predicted image quality corresponding to the moving speed of a subject detected by analyzing blocks is lower than a predetermined threshold level, spatial decimation is performed in the mode in sampling point positions are shifted such that the moving speed of the subject is virtually changed to a value at which a super resolution effect occurs, thereby achieving data conversion without causing significant degradation in image quality.

2 Claims, 52 Drawing Sheets

FIG. 15
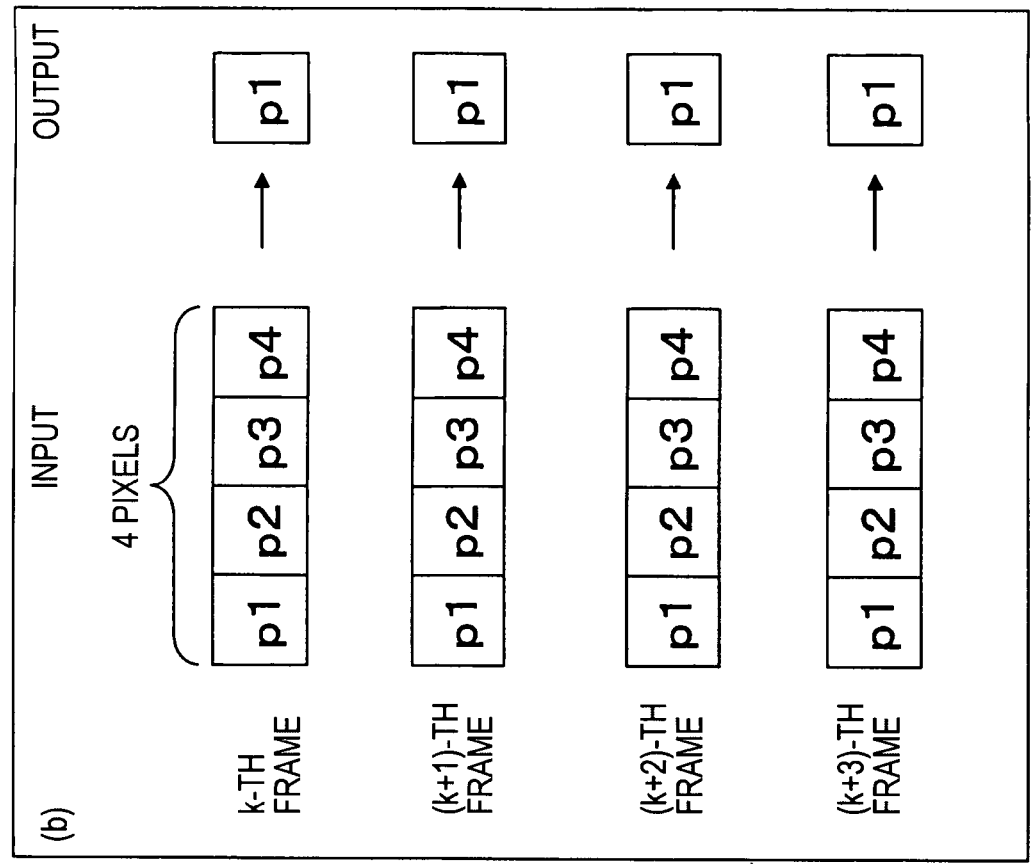
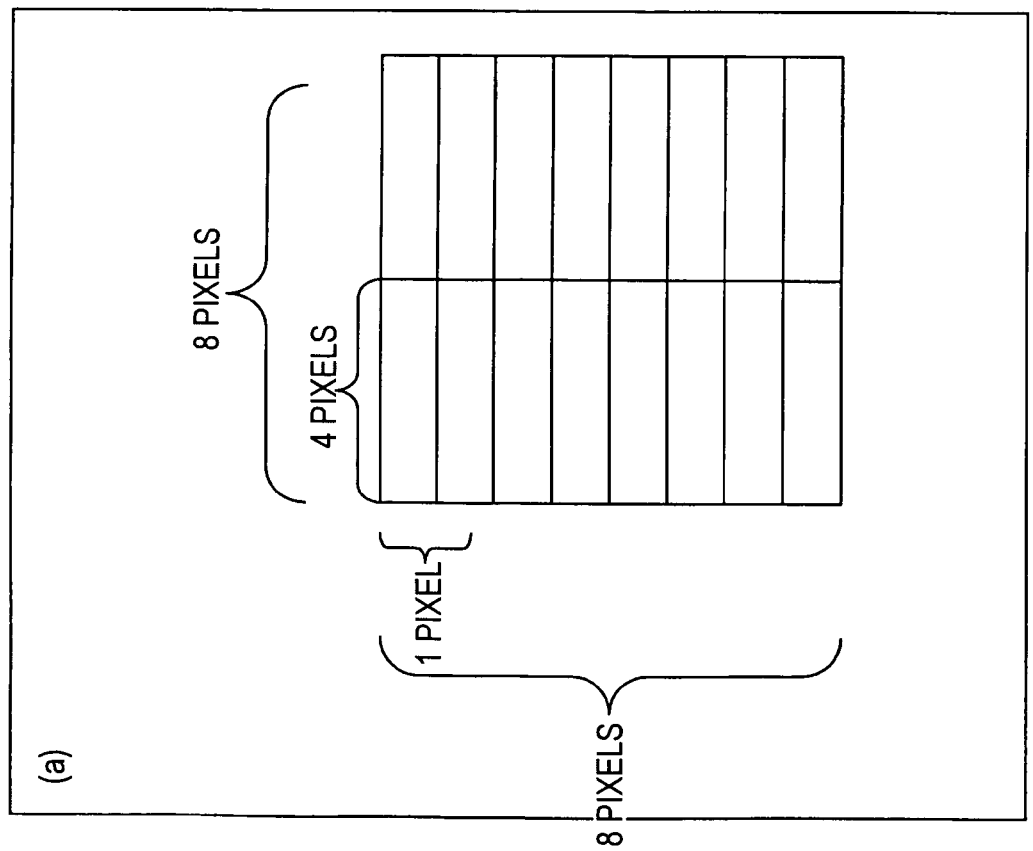

FIG. 23

| | MOVEMENT SPEED: v (PIXELS/FRAME) | DIRECTION OF MOTION | DECIMATION MODE | | |
|---|---|---|---|---|---|
| (a) | $2 \leq v < c$ | TO RIGHT | DECIMATION IS PERFORMED SUCH THAT SAMPLE POINT POSITION IS MOVED TO RIGHT WITH ADVANCING FRAME (VIRTUAL ACCELERATION) | FIG. 17 | FROM REGION B-1 TO REGION C-1 IN FIG. 21 |
| (b) | $f \leq v < e$ | TO LEFT | DECIMATION IS PERFORMED SUCH THAT SAMPLE POINT POSITION IS MOVED TO RIGHT WITH ADVANCING FRAME (VIRTUAL ACCELERATION) | | FROM REGION B-2 TO REGION C-2 IN FIG. 21 |
| (c) | $2 \leq v < c$ | TO RIGHT | DECIMATION IS PERFORMED SUCH THAT SAMPLE POINT POSITION IS MOVED TO LEFT WITH ADVANCING FRAME (VIRTUAL ACCELERATION) | FIG. 16 | FROM REGION B-1 TO REGION C-1 IN FIG. 21 |
| (d) | $f \leq v < e$ | TO LEFT | DECIMATION IS PERFORMED SUCH THAT SAMPLE POINT POSITION IS MOVED TO LEFT WITH ADVANCING FRAME (VIRTUAL ACCELERATION) | FIG. 16 | FROM REGION B-2 TO REGION C-2 IN FIG. 21 |
| (e) | $d \leq v < f$ | TO RIGHT | DECIMATION IS PERFORMED SUCH THAT SAMPLE POINT POSITION IS MOVED TO RIGHT WITH ADVANCING FRAME (VIRTUAL DECELERATION) | FIG. 17 | |
| (f) | $d \leq v < f$ | TO LEFT | DECIMATION IS PERFORMED SUCH THAT SAMPLE POINT POSITION IS MOVED TO RIGHT WITH ADVANCING FRAME (VIRTUAL DECELERATION) | FIG. 17 | FROM REGION B-3 TO REGION C-3 IN FIG. 22 |
| (g) | MOVEMENT SPEED OTHER THAN THOSE DESCRIBED ABOVE $c \leq v \leq d$ $e \leq v$ | TO RIGHT OR LEFT | DECIMATION IS PERFORMED WITHOUT MOVING SAMPLE POINT POSITION WITH ADVANCING FRAME | FIG. 15 | REGION A IN FIG. 20 |

FIG. 27A

| SPEED OF MOTION: v (PIXELS/FRAME) | 2≤v<c | c≤v<d | d≤v<e | f≤v<e | e≤v |
|---|---|---|---|---|---|
| PROCESS | PROCESS 3 | PROCESS 1 | PROCESS 2 | PROCESS 3 | PROCESS 1 |

FIG. 27B

| PROCESS 1 | DECIMATION POSITION IS NOT CHANGED |
|---|---|
| PROCESS 2 | DECIMATION POSITION IS CHANGED IN THE SAME DIRECTION AS THE DIRECTION OF MOVEMENT OF SUBJECT |
| PROCESS 3 | DECIMATION POSITION IS CHANGED IN A DIRECTION OPPOSITE TO THE DIRECTION OF MOVEMENT OF SUBJECT |

FIG. 29A

| | SPEED IN THE PAST: p | SPEED OF MOTION: v (PIXELS/FRAME) | PROCESS |
|---|---|---|---|
| (1) | $2 \leq p < c$ | $2 - \Delta v1 \leq v < c + \Delta v2$ | PROCESS 3 |
| (2) | $c \leq p < d$ | $c - \Delta v3 \leq v < d + \Delta v4$ | PROCESS 1 |
| (3) | $d \leq p < f$ | $d - \Delta v5 \leq v < f + \Delta v6$ | PROCESS 2 |
| (4) | $f \leq p < e$ | $f - \Delta v7 \leq v < e + \Delta v8$ | PROCESS 3 |
| (5) | $e \leq p$ | $e - \Delta v9 \leq v$ | PROCESS 1 |

FIG. 29B

| PROCESS 1 | DECIMATION POSITION IS NOT CHANGED |
|---|---|
| PROCESS 2 | DECIMATION POSITION IS CHANGED IN THE SAME DIRECTION AS THE DIRECTION OF MOVEMENT OF SUBJECT |
| PROCESS 3 | DECIMATION POSITION IS CHANGED IN A DIRECTION OPPOSITE TO THE DIRECTION OF MOVEMENT OF SUBJECT |

FIG. 41A

| SPEED OF MOTION: v (PIXELS/FRAME) | 1≤v<i | i≤v<j | j≤v<m | m≤v<k | k≤v |
|---|---|---|---|---|---|
| PROCESS | PROCESS 3 | PROCESS 1 | PROCESS 2 | PROCESS 3 | PROCESS 1 |

FIG. 41B

| PROCESS 1 | DECIMATION POSITION IS NOT CHANGED |
|---|---|
| PROCESS 2 | DECIMATION POSITION IS CHANGED IN THE SAME DIRECTION AS THE DIRECTION OF MOVEMENT OF SUBJECT |
| PROCESS 3 | DECIMATION POSITION IS CHANGED IN A DIRECTION OPPOSITE TO THE DIRECTION OF MOVEMENT OF SUBJECT |

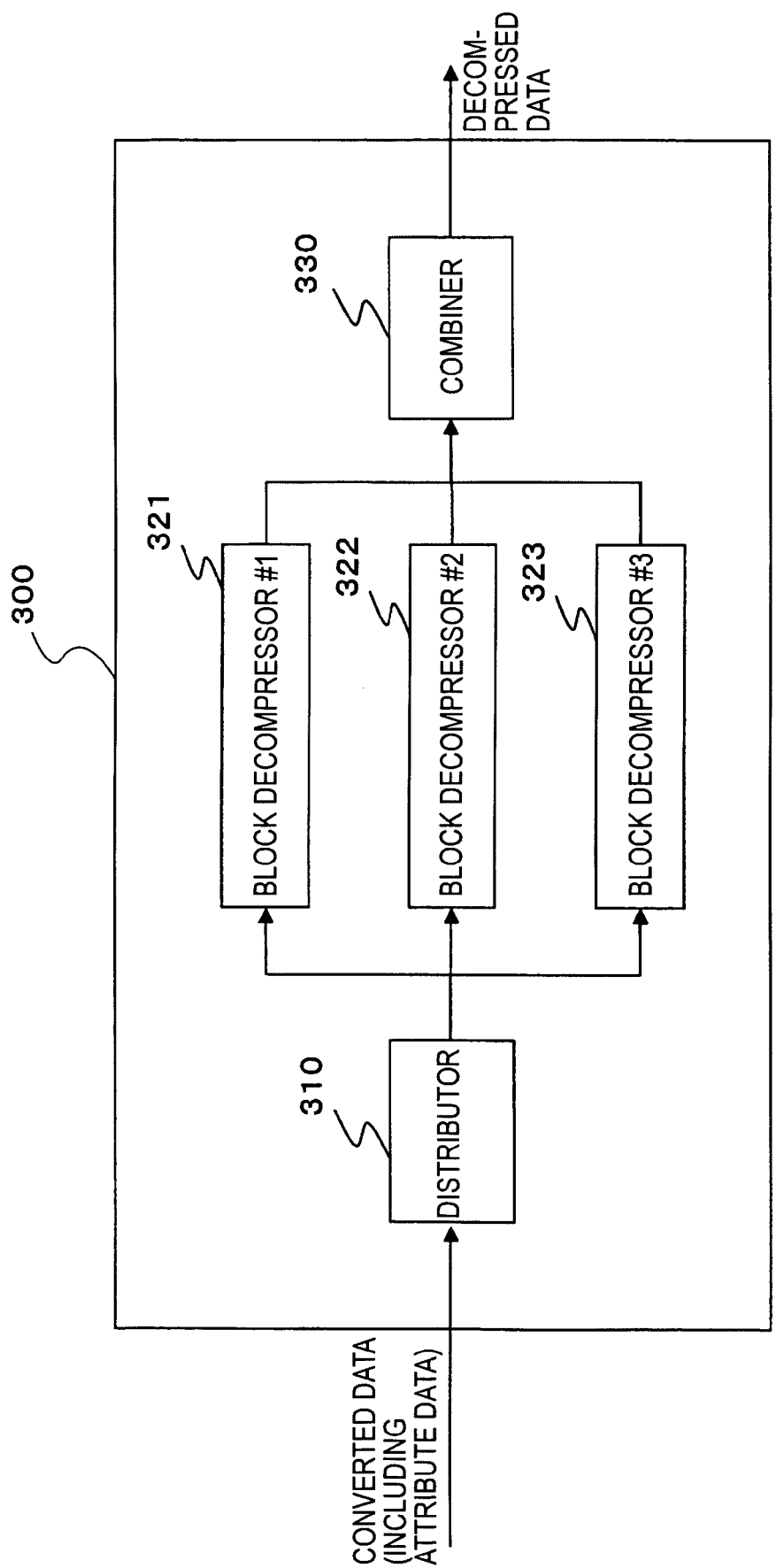

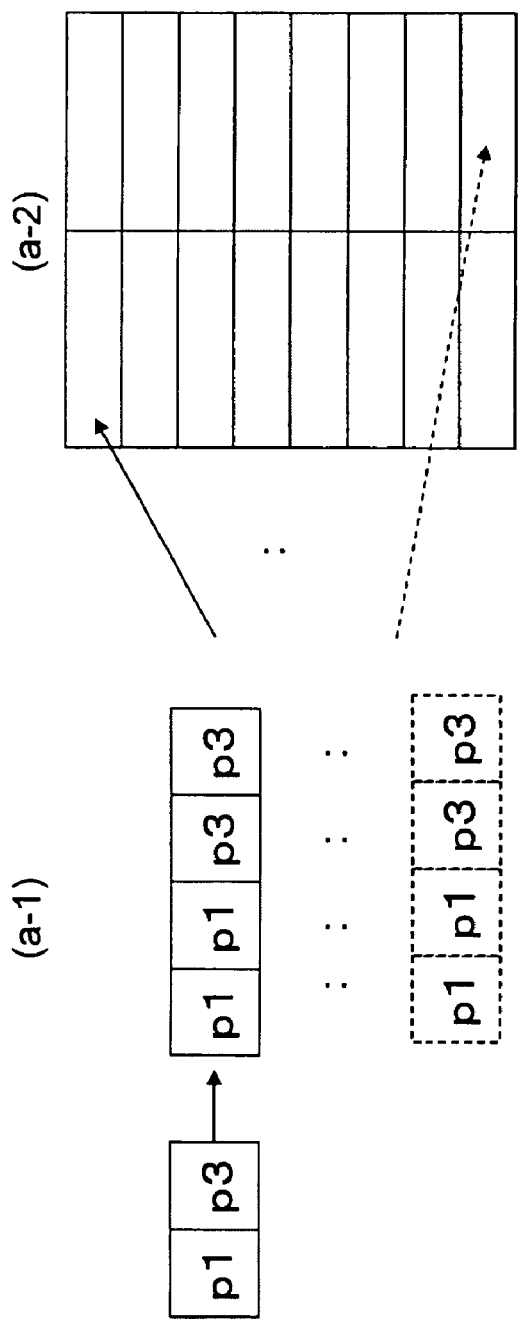
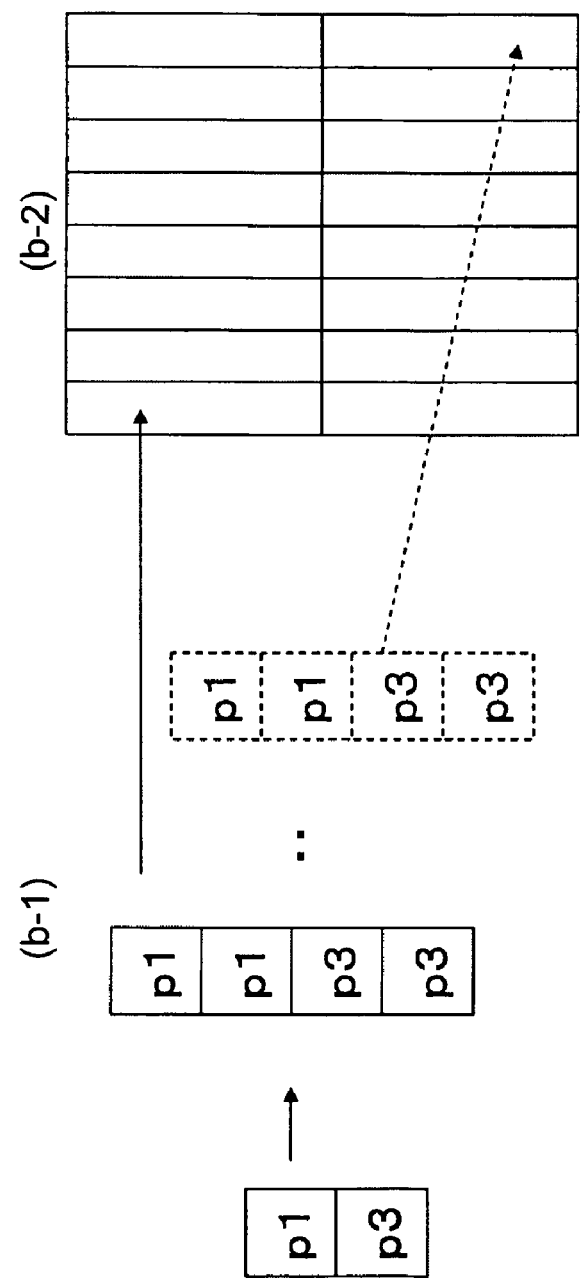
FIG. 47A
FIG. 47B

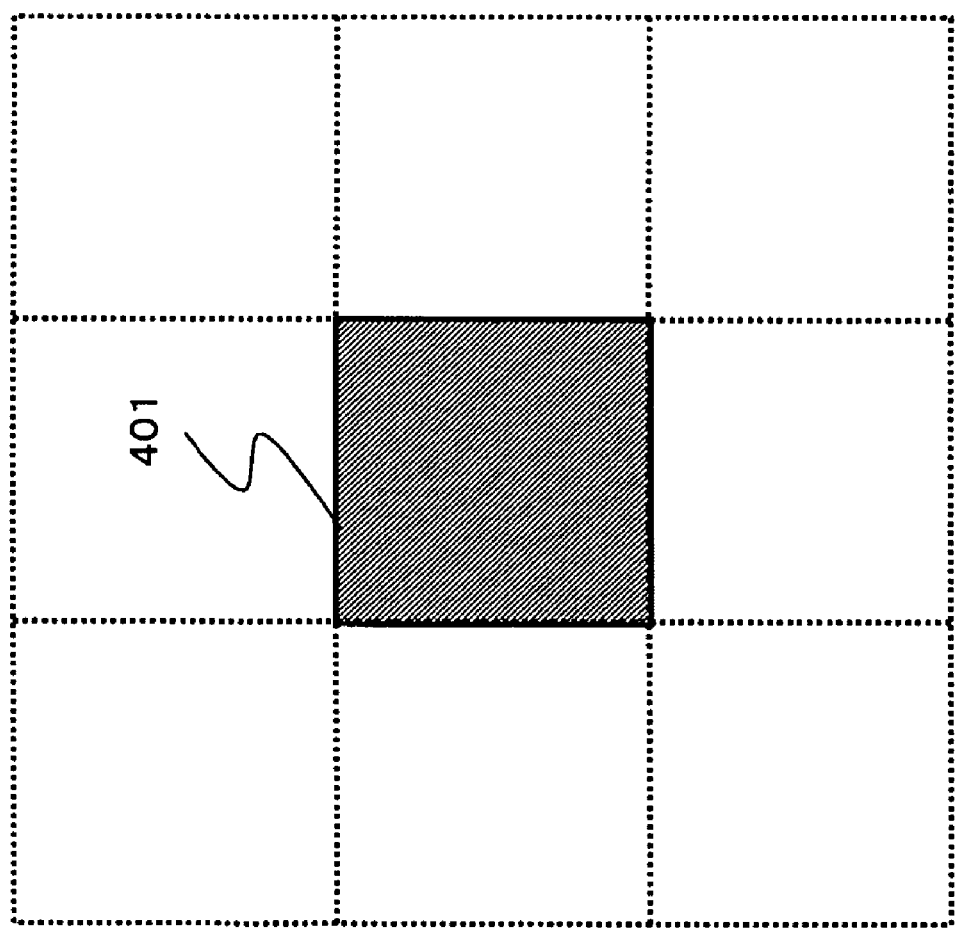

2ND FRAME MOVING TO RIGHT OR
3RD FRAME MOVING TO LEFT

4TH FRAME MOVING TO RIGHT OR
1ST FRAME MOVING TO LEFT
2 PIXELS

1ST FRAME MOVING TO RIGHT OR
4TH FRAME MOVING TO LEFT
1 PIXEL

3RD FRAME MOVING TO RIGHT OR
2ND FRAME MOVING TO LEFT
1 PIXEL

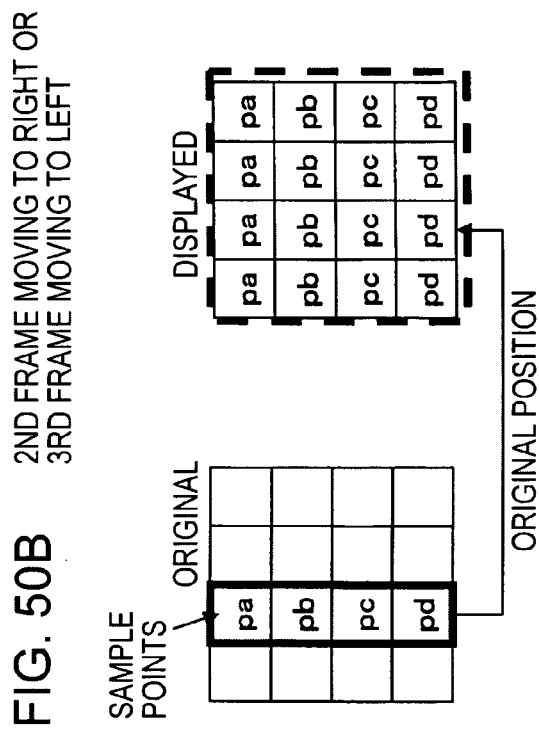
FIG. 50A  1ST FRAME MOVING TO RIGHT OR 4TH FRAME MOVING TO LEFT
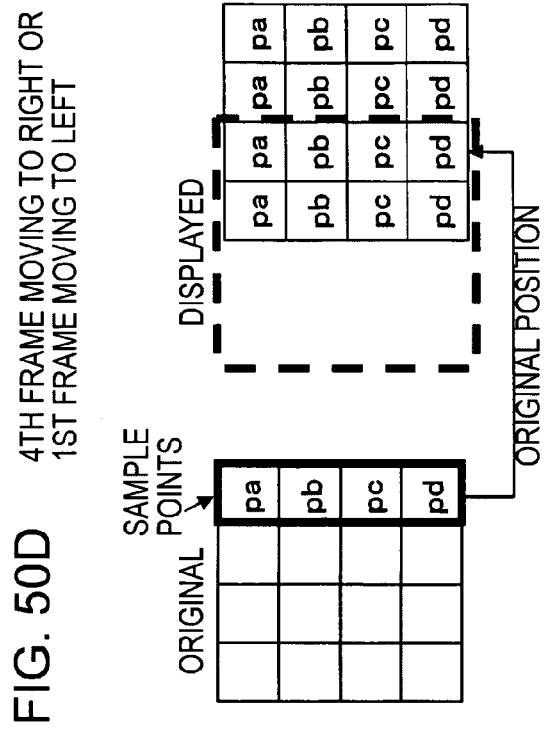
FIG. 50B  2ND FRAME MOVING TO RIGHT OR 3RD FRAME MOVING TO LEFT
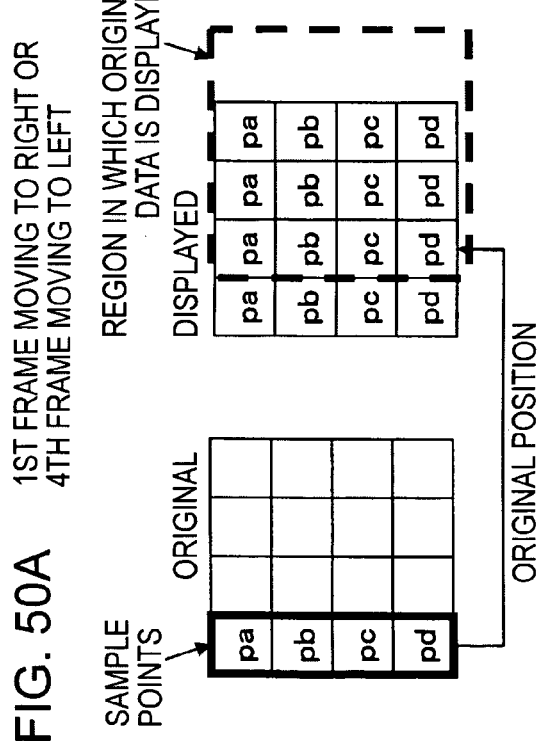
FIG. 50C  3RD FRAME MOVING TO RIGHT OR 2ND FRAME MOVING TO LEFT
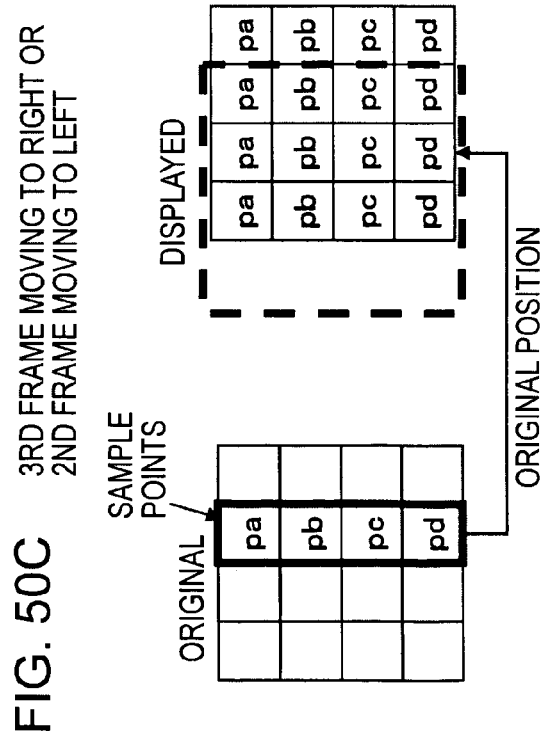
FIG. 50D  4TH FRAME MOVING TO RIGHT OR 1ST FRAME MOVING TO LEFT

1ST FRAME MOVING DOWNWARD OR 4TH FRAME MOVING UPWARD

2ND FRAME MOVING DOWNWARD OR 3RD FRAME MOVING UPWARD

3RD FRAME MOVING DOWNWARD OR 2ND FRAME MOVING UPWARD

4TH FRAME MOVING DOWNWARD OR 1ST FRAME MOVING UPWARD

METHOD AND APPARATUS FOR DECIMATION MODE DETERMINATION UTILIZING BLOCK MOTION

CROSS REFERENCES TO RELATED APPLICATIONS

The present invention contains subject matter related to Japanese Patent Application JP 2004-147739 filed in the Japanese Patent Office on May 18, 2004, the entire contents of which are incorporated herein by reference.

BACKGROUND OF THE INVENTION

1. Field of the Invention

The present invention relates to a method and apparatus for converging motion image data, a method and apparatus for reproducing motion image data, a computer program for converting motion image data, and a computer program for reproducing motion image data, and more particularly, to a method and apparatus for converging motion image data, a method and apparatus for reproducing motion image data, a computer program for converting motion image data, and a computer program for reproducing motion image data, capable of performing high-quality data conversion such that motion image data is compressed with substantially no degradation in image quality, and capable of performing inverse data conversion such that high-quality motion image data is reproduced from compressed motion image data.

2. Description of the Related Art

When motion image data is stored on a storage medium such as a hard disk or a DVD or when motion image data is transmitted via a network, the motion image is generally compressed to reduce its data size. In recent years, a great improvement in quality of motion image data has been achieved. For example, an HD (High Definition) format is now available for representing high-quality motion image data. However, with improving in data quality, a drastic increase in the data size is occurring. To solve such a problem, a wide variety of techniques to improve efficiency in compression/decompression of motion image data and to prevent degradation in data quality due to compression/decompression are under development and evaluation.

A known technique to compress motion image data is spatial decimation to decimate pixels constituting an image frame of motion image data. Another known technique is temporal decimation to decimate frames (to reduce the frame rate).

By performing such data conversion, the data size can be reduced and thus it becomes possible to efficiently store data on storage medium or transmit data via a network. However, compression of data causes degradation in image quality. That is, data reproduced from compressed image data is not as good as the original data. The problem with degradation in image quality is serious, in particular, when original data is of a high-resolution image.

A wide variety of techniques have been proposed to reduce such degradation in image quality. For example, Japanese Unexamined Patent Application Publication No. 2003-169284 discloses an image compression technique in which parameters are set based on information indicating the brightness of an image, and a compression mode is switched depending on the brightness of the image. Japanese Unexamined Patent Application Publication No. 2002-27466 discloses an image compression technique in which a screen is divided into a plurality of regions, and an optimum compression mode is determined for each region.

SUMMARY OF THE INVENTION

However, the known techniques to improve the data quality by selecting an optimum compression mode based on various characteristics detected from image data being processed cannot sufficiently suppress degradation in image quality due to compression/decompression of image data.

Motion image data includes various parts, some of which includes a subject moving at a high speed, some of which includes a subject moving at a low speed, and some of which includes a subject at rest. It is difficult to properly compress motion image data including such various parts without causing significant degradation in image quality so that degradation in quality of image data reproduced from compressed motion image data is not substantially perceptible.

In view of the above, the present invention provides a method and apparatus for converting motion image data, a method and apparatus for reproducing motion image data, a computer program for converting motion image data, and a computer program for reproducing motion image data, by which an optimum compression mode is determined depending on a feature of a region of an image, in particular, depending on motion of a subject, and data conversion is performed for each region in the determined optimum mode thereby making it possible to compress image data and decompress the compressed image data with substantially no degradation in image quality.

According to an embodiment, the invention provides a motion image data conversion apparatus that performs data conversion of motion image data, including a block divider that divides each frame of the motion image data into blocks, a motion detector that detects the amount of motion of a subject for each block generated by the block divider, and a block processing unit that receives block data of blocks generated by the block divider and the data of motion detected by the motion detector and that decimates the block data, the block processing unit including a decimation mode determination unit that determines a decimation mode as to whether to perform spatial decimation in a fixed sampling point position mode or a sampling point position shifting mode, in accordance with the data of motion, and a decimation execution unit that executes spatial decimation in the fixed SPP mode or the SPP shifting mode in accordance with a determination made by the decimation mode determination unit.

In the motion image data conversion apparatus, the decimation mode determination unit may further determine a direction in which the sample point position is shifted with frame advance in the spatial decimation process in the SPP shifting mode, and the decimation execution unit may shift the sample point position in the direction determined by the decimation mode determination unit when the spatial decimation process is performed in the SPP shifting mode.

In the motion image data conversion apparatus, the decimation mode determination unit may determine the decimation mode in accordance with data indicating the correspondence between an evaluated image quality score and a moving speed of a subject, the evaluated image quality score being estimated for data obtained as a result of the decimation process in the fixed sampling point position mode, the determination being made such that when a moving speed of a subject indicated by the data of motion detected by the motion detector corresponds to an evaluated image quality score equal to or higher than a predetermined threshold value, the decimation mode determination unit determines that the decimation process should be performed in the fixed process point position mode, but when a moving speed of a subject indicated by the data of motion detected by the motion detector corresponds to an evaluated image quality score lower than the predetermined threshold value, the decimation mode determination unit determines that the decimation process should be performed in the process point position shifting mode.

In the motion image data conversion apparatus, the decimation mode determination unit may further include a memory adapted to store a decimation mode determined for a previous frame by the decimation mode determination unit, and the decimation mode determination unit may determine the decimation mode in accordance with data indicating the correspondence between an evaluated image quality score and a moving speed of a subject, the evaluated image quality score being estimated for data obtained as a result of the decimation process in the fixed sampling point position mode, and also in accordance with the decimation mode determined for the previous frame, the determination being made such that when the decimation mode determined for the previous frame was the fixed sample point position mode and when a moving speed of a subject indicated by the data of motion detected by the motion detector corresponds to an evaluated image quality score equal to or higher than a predetermined threshold value T1, the decimation mode determination unit determines that the decimation process should be performed in the fixed process point position mode, when the decimation mode determined for the previous frame was the fixed sample point position mode and when a moving speed of a subject indicated by the data of motion detected by the motion detector corresponds to an evaluated image quality score lower than the predetermined threshold value T1, the decimation mode determination unit determines that the decimation process should be performed in the process point position shifting mode, when the decimation mode determined for the previous frame was the sample point position shifting mode and when a moving speed of a subject indicated by the data of motion detected by the motion detector corresponds to an evaluated image quality score lower than a predetermined threshold value T2, the decimation mode determination unit determines that the decimation process should be performed in the process point position shifting mode, and when the decimation mode determined for the previous frame was the sample point position shifting mode and when a moving speed of a subject indicated by the data of motion detected by the motion detector corresponds to an evaluated image quality score equal to or higher than the predetermined threshold value T2, the decimation mode determination unit determines that the decimation process should be performed in the fixed process point position mode.

In the motion image data conversion apparatus, the block processing unit may perform the spatial decimation process in the sample point position shifting mode such that a virtual moving speed of a subject resulting from execution of the decimation process in the sample point position shifting mode falls within a range of the moving speed in which an evaluated image quality score corresponding to the virtual moving speed is equal to or higher than a predetermined threshold value, the evaluated image quality score being estimated based on prepared data indicating the correspondence between the moving speed of a subject and the evaluated image quality score of data obtained as a result of the decimation process in the fixed sampling point position mode.

In the motion image data conversion apparatus, the block processing unit may further include a memory adapted to store data indicating a mode in which the sample point position is shifted or fixed in the spatial decimation process performed by the block processing unit for a previous frame, and when the virtual moving speed of a subject obtained as a result of spatial decimation performed on the previous frame depending on the mode in which the sampling point position was shifted or fixed is evaluated based on data indicating the correspondence between the moving speed of a subject and the image quality score for data obtained as a result of decimation in the fixed SPP mode, if an image quality score corresponding to the virtual moving speed of the subject is equal to or higher than a predetermined threshold value T3, then the spatial decimation may be performed in the same mode as the mode used in the spatial decimation performed on the previous frame, but when the virtual moving speed of the subject obtained as the result of spatial decimation performed on the previous frame depending on the mode in which the sampling point position was shifted or fixed is evaluated based on data indicating the correspondence between the moving speed of a subject and the image quality score for data obtained as a result of decimation in the fixed SPP mode, if the image quality score corresponding to the virtual moving speed of the subject is lower than the predetermined threshold value T3, then the spatial decimation may be performed in a mode selected such that the virtual speed of the subject obtained as a result of the decimation falls within a range of the moving speed in which the image quality score evaluated based on the data indicating the correspondence between the moving speed of a subject and the image quality score for data obtained as a result of decimation in the fixed SPP mode is equal to or higher than a predetermined threshold value T4.

In the motion image data conversion apparatus, the block processing unit may perform the decimation process in one of following modes (a) to (c) selected based on the data of motion, (a) mode in which only spatial decimation is performed, (b) mode in which spatial decimation and temporal decimation are performed, or (c) mode in which only temporal decimation is performed.

In the motion image data conversion apparatus, the motion detector may detect a motion vector based on blocks that correspond to each other and that belong to different frames, and the block processing unit may determine the decimation mode based on the motion vector and perform the decimation process in the determined mode.

According to another embodiment, the invention provides a motion image reproduction apparatus that reproduces motion image data from converted motion image data, including a block expander that receives converted block data included in the converted motion image data and data indicating a conversion mode in which the converted block data was converted and that expands the converted block data based on the data indicating the conversion mode, and a combiner that produces frame data by combining blocks reproduced via the block expansion performed by the block expander, wherein the block expander reproduces the block by performing the block expansion process in a mode corresponding to at least one of a spatial decimation process in a fixed sampling point position mode, a spatial decimation process in a sampling point position shifting mode, and a temporal decimation process, performed in the production of the converted motion image data, and the combiner produces the frame data by combining blocks reproduced via the block expansion process.

In the motion image reproduction apparatus, when the blocks reproduced by the block expander are blocks reproduced from blocks subjected to the spatial decimation process in the sampling point position shifting mode, the combiner may shift the positions at which the blocks are laid with frame advance.

In the motion image reproduction apparatus, when the blocks reproduced by the block expander are blocks reproduced from blocks subjected to the spatial decimation process in the sampling point position shifting mode, the combiner may shift the positions at which the blocks are laid with frame advance and may perform a pixel value correction process to determine a pixel value in a pixel gap created when blocks were laid or determine a pixel value for an overlapping pixel.

According to another embodiment, the invention provides a method of converting motion image data, including the steps of dividing each frame of the motion image data into blocks, detecting the amount of motion of a subject for each block generated in the block dividing step, and processing block data by receiving block data of blocks generated in the block dividing step and data indicating the amount of motion detected in the step of detecting the amount of motion, and decimating the block data, the block data processing step including the steps of determining a decimation mode as to whether to perform spatial decimation in a fixed sampling point position mode or a sampling point position shifting mode, in accordance with the data of motion, and executing spatial decimation in the fixed SPP mode or the SPP shifting mode in accordance with a determination made in the decimation mode determination step.

In the method of converting motion image data, the decimation mode determination step may further include the step of determining a direction in which the sample point position is shifted with frame advance in the spatial decimation process in the SPP shifting mode, and in the decimation execution step, spatial decimation may be performed while shifting the sampling point position in the direction determined in the decimation mode determination step.

In the method of converting motion image data, in the decimation mode determination step, the decimation mode may be determined in accordance with data indicating the correspondence between an image quality score and a moving speed of a subject, the image quality score being estimated based on data obtained as a result of the decimation process in the fixed sampling point position mode, the determination being made such that when a moving speed of a subject indicated by the data of motion detected in the step of detecting the amount of motion corresponds to an evaluated image quality score equal to or higher than a predetermined threshold value, it is determined that the decimation process should be performed in the fixed process point position mode, but when a moving speed of a subject indicated by the data of motion detected in the step of detecting the amount of motion corresponds to an evaluated image quality score lower than the predetermined threshold value, it is determined that the decimation process should be performed in the process point position shifting mode. According to another embodiment, the invention provides a method of reproducing motion image data from converted motion image data, including the steps of: expanding a block by receiving converted block data included in the converted motion image data and data indicating a conversion mode in which the converted block data was converted, and expanding the converted block data based on the data indicating the conversion mode, and combining blocks reproduced in the block expansion step to produce frame data, wherein the block expansion step reproduces the block by performing the block expansion process in a mode corresponding to at least one of a spatial decimation process in a fixed sampling point position mode, a spatial decimation process in a sampling point position shifting mode, and a temporal decimation process, performed in the production of the converted motion image data, and the block combining step produces the frame data by combining blocks reproduced via the block expansion process.

In the method of reproducing motion image data, in the block combining step, when the blocks reproduced by the block expander are blocks reproduced from blocks subjected to the spatial decimation process in the sampling point position shifting mode, the positions at which to lay the blocks may be shifted with frame advance.

In the method of reproducing motion image data, the block combining step may include the step of, when the blocks reproduced by the block expander are blocks reproduced from blocks subjected to the spatial decimation process in the sampling point position shifting mode, shifting the positions at which the blocks are laid with frame advance and performing a pixel value correction process to determine a pixel value in a pixel gap created when blocks were laid or determine a pixel value for an overlapping pixel.

According to another embodiment, the invention provides a computer program for executing a motion image data conversion process, the process including the steps of dividing each frame of the motion image data into blocks, detecting the amount of motion of a subject for each block generated in the block dividing step, processing block data by receiving block data of blocks generated in the block dividing step and data indicating the amount of motion detected in the step of detecting the amount of motion, and decimating the block data, the block data processing step including the steps of determining a decimation mode as to whether to perform spatial decimation in a fixed sampling point position mode or a sampling point position shifting mode, in accordance with the data of motion; and executing spatial decimation in the fixed SPP mode or the SPP shifting mode in accordance with a determination made in the decimation mode determination step.

According to another embodiment, the invention provides a computer program for executing a process of reproducing motion image data from converted motion image data, the process including the steps of expanding a block by receiving converted block data included in the converted motion image data and data indicating a conversion mode in which the converted block data was converted, and expanding the converted block data based on the data indicating the conversion mode, and combining blocks reproduced in the block expansion step to produce frame data, wherein the block expansion step reproduces the block by performing the block expansion process in a mode corresponding to at least one of a spatial decimation process in a fixed sampling point position mode, a spatial decimation process in a sampling point position shifting mode, and a temporal decimation process, performed in the production of the converted motion image data, and the block combining step produces the frame data by combining blocks reproduced via the block expansion process.

The computer program may be provided to a general-purpose computer system capable of executing various computer program codes via a storage medium such as a CD, an FD, or an MO on which the program is stored in a computer-readable manner or via a communication medium such as a network. By providing the program in the computer-readable form as described above, it becomes possible to execute processes on the computer system in accordance with the program.

Note that in the present description, the term "system" is used to describe a logical collection of a plurality of devices, and it is not necessarily required that the plurality of devices be disposed in a single case.

The present invention provides great advantages. That is, in an embodiment, an optimum compression mode is determined depending on a feature of a region of an image, in particular, depending on motion of a subject, and data conversion is performed for each region in the determined optimum mode. This makes it possible to compress image data and decompress the compressed image data with substantially no degradation in image quality.

In an embodiment, the amount of motion of a subject in a block of motion image data is detected, and spatial decimation is performed in the fixed SPP mode or the SPP shifting mode depending on the detected amount of motion. The spatial decimation in the SPP shifting mode allows the subject to have a virtual moving speed that allows a super resolution effect to occur, thereby achieving data conversion without causing significant degradation in image quality.

In an embodiment, the decimation mode is determined in accordance with data indicating the correspondence between an image quality score and a moving speed of a subject, the image quality score being estimated based on data obtained as a result of the decimation process in the fixed sampling point position mode, the determination being made such that when a moving speed of a subject in a block of interest indicated by the data of motion detected by the motion detector corresponds to an evaluated image quality score equal to or higher than a predetermined threshold value, it is determined that the decimation process should be performed in the fixed process point position mode, but when a moving speed of a subject indicated by the data of motion detected by the motion detector corresponds to an evaluated image quality score lower than the predetermined threshold value, it is determined that the decimation process should be performed in the process point position shifting mode, thereby making it possible for the subject moving at a speed that may vary over a wide range to have a virtual speed in a range in which the super resolution effect can be obtained, and thus achieving data conversion without causing significant degradation in image quality.

In an embodiment, blocks are reproduced by performing the block expansion process in a mode corresponding to at least one of a spatial decimation process in the fixed sampling point position mode, a spatial decimation process in the sampling point position shifting mode, and a temporal decimation process, performed in the production of the converted motion image data, and the frame data is reproduced by combining the blocks reproduced via the block expansion process. That is, when motion image data compressed by the spatial decimation in the SPP shifting mode is given, motion image data is reproduced by performing decompression on blocks in a mode selected depending on the mode in which original blocks were spatially decimated, thereby making it possible to reproduce motion image data with high image quality similar to that of the original motion image data.

Further features and advantages of the present invention will become apparent from the following description of exemplary embodiments with reference to the attached drawings.

BRIEF DESCRIPTION OF THE DRAWINGS

FIG. 15 is a diagram showing a process performed by a block processing unit of a motion image data conversion apparatus;

FIG. 23 is a table showing the correspondence between the moving speed and the mode of the decimation process performed by a block processing unit of a motion image data conversion apparatus;

FIGS. 27A and 27B are tables showing the correspondence between the moving speed and the mode of the decimation process performed by a block processing unit of a motion image data conversion apparatus;

FIGS. 29A and 29B are tables showing a process performed by a decimation mode determination unit;

FIGS. 41A and 41B are tables showing the correspondence between the moving speed and the mode of the decimation process performed by a block processing unit of a motion image data conversion apparatus;

FIG. 43 is a block diagram showing a structure of a motion image reproduction apparatus;

FIGS. 47A and 47B are diagrams showing processes performed by a block decompressor of a motion image reproduction apparatus;

FIG. 48 is a diagram showing a block laying process performed by a motion image reproduction apparatus;

FIGS. 50A to 50D are diagrams showing a block laying process performed by a motion image reproduction apparatus;

DESCRIPTION OF THE PREFERRED EMBODIMENTS

The method and apparatus for converting motion image data, the method and apparatus for reproducing motion image data, the computer program for converting motion image data, and the computer program for reproducing motion image data are described below with reference to specific embodiments in conjunction with the accompanying drawings. The description will be provided in the following order.

(1) Basic structure of a motion image data conversion apparatus using the super resolution effect (2) Structure of a motion image data conversion apparatus that performs a decimation process in an improved manner (3) Apparatus and method of reproducing motion image data (1) Basic Structure of a Motion Image Data Conversion Apparatus using the Super Resolution Effect First, described is the basic structure of a motion image data conversion apparatus that compresses motion image data using the super resolution effect on which the present invention is based. The details of the basic structure are disclosed in Japanese Patent Application No. 2003-412501 filed by the present applicant. The motion image data conversion apparatus is configured to divide an image into small blocks and adaptively decimate pixels or frames depending on the moving speed of respective blocks thereby achieving compression of the motion image data.

Figure 1:
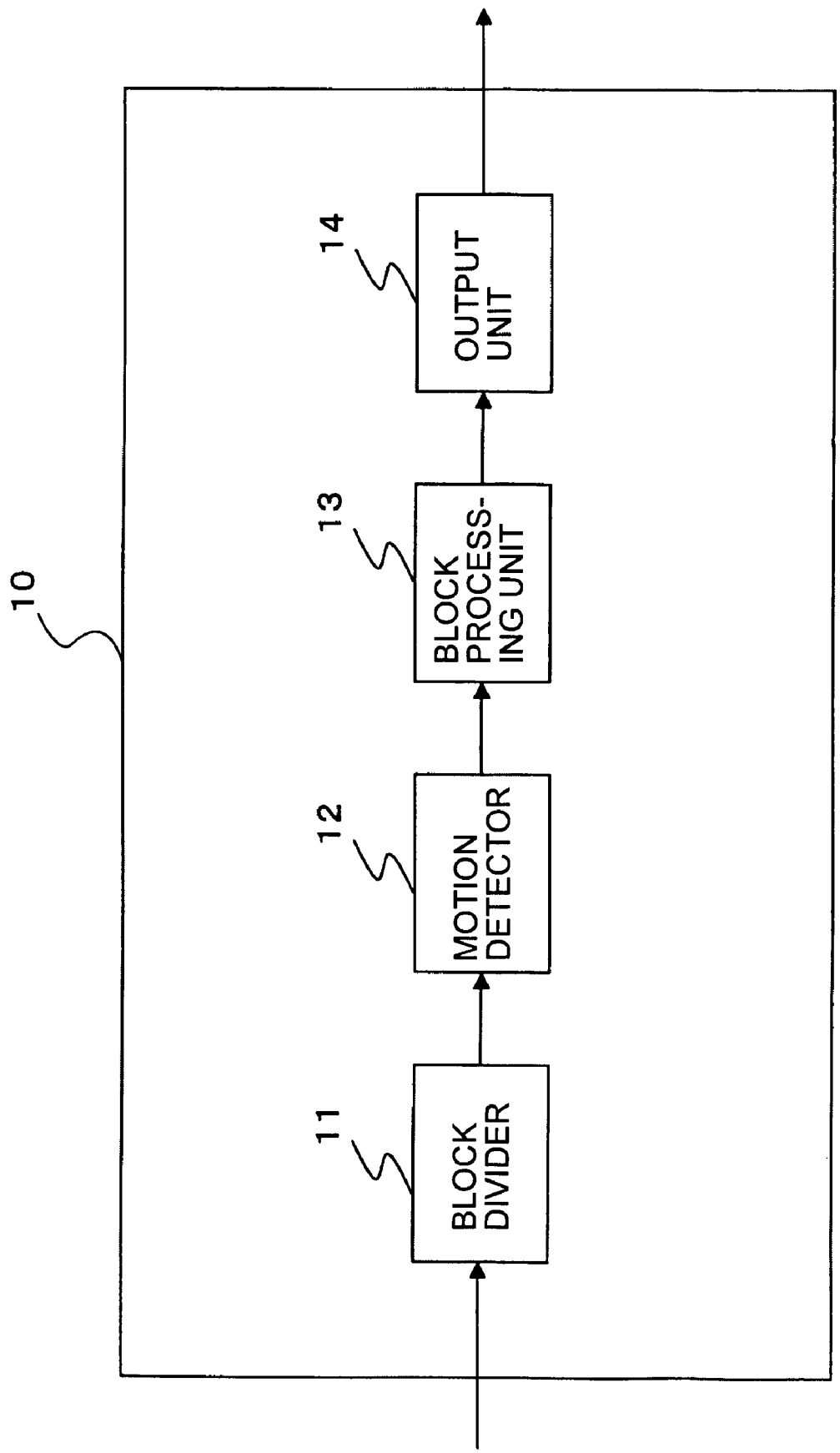
FIG. 1 is a block diagram showing a basic structure of a motion image data conversion apparatus that performs data conversion using a super resolution effect.

FIG. 1 shows an example of a structure of the motion image data conversion apparatus 10. This structure is disclosed in Japanese Patent Application No. 2003-412501. This motion image data conversion apparatus 10 is capable of converting motion image data using the super resolution effect such that the data size is reduced without causing degradation in image quality perceptible by viewers.

The super resolution effect refers to a visual effect based on the nature of visual sense that causes a viewer to perceive the sum of a plurality of images given in a particular period. By nature of human visual sense, if human visual sense is stimulated, the stimulation is memorized for a particular period even after the stimulation is removed (this phenomenon is known as sensory memory). According to many reports, the sensory memory is retained for a period of 10 ms to 200 ms. This phenomenon is also called "iconim memory" or "visual information storage". A more detailed description thereof may be found, for example, in "Visual Information Handbook" (edited by the Vision Society of Japan, pp. 229-230). The super resolution effect occurs as a result of a complicated mixture of functions of human visual sense, in particular, a function of temporally integrating visual stimulation and a function of memorizing stimulation.

The motion image data conversion apparatus 10 shown in FIG. 1 is configured to perform motion image data conversion using the super resolution effect due to the human visual function of temporarily integrating visual stimulation, so that data is compressed without image quality degradation perceptible by viewers. The structure of the motion image data conversion apparatus 10 shown in FIG. 1 is described below.

A block divider 11 divides each frame of an input motion image into blocks each including a predetermined number of pixels and supplies the resultant blocks to a motion detector 12. The motion detector 12 detects the amount of motion of each block supplied from the block divider 11 and transmits data indicating the amount of motion together with the block to a block processor 13. The block processor 13 reduces data sizes of the blocks supplied from the motion detector 12 by performing a motion image conversion process (a compression process) on the block depending on the amount of motion. The block processor 13 supplies resultant block data with the reduced data size to an output unit 14. The output unit 14 combines data of respective blocks with reduced data sizes supplied from the block processor 13 and outputs the data in the form of stream data.

Figure 2:
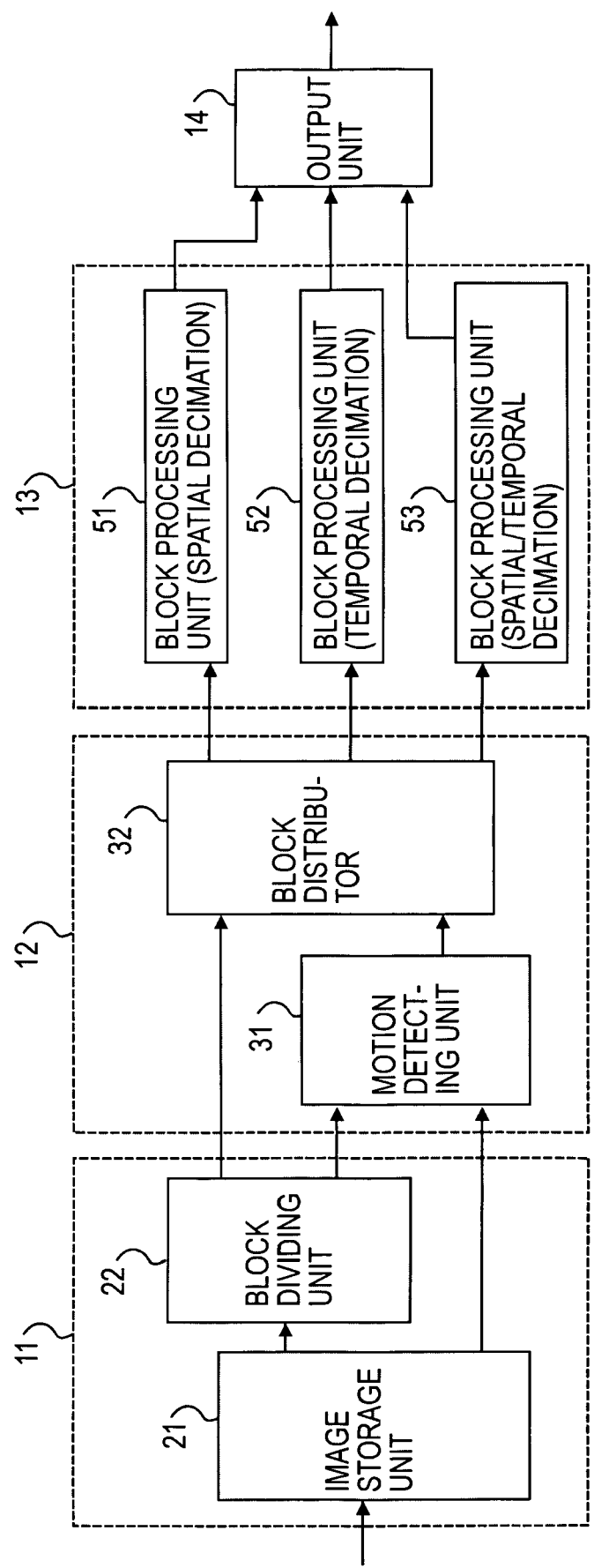
FIG. 2 is a block diagram showing details of the basic structure of the motion image data conversion apparatus that performs data conversion using the super resolution effect.

Referring to FIG. 2, details of the respective parts of the motion image data conversion apparatus 10 are described below. Each frame of the motion image input to the motion image data conversion apparatus 10 is supplied to an image storage unit 21 of the block divider 11. The image storage unit 21 stores the supplied frames. Each time N frames have been stored in the image storage unit 21 (where N is an integer), the image storage unit 21 supplies the N frames to a block dividing unit 22 and also supplies an M-th (M-thly stored) frame of the N frames to a motion detecting unit 31 of the motion detector 12. For example, N=4.

The block dividing unit 22 divides each of the N successive frames supplied from the image storage unit 21 into blocks with a predetermined size (for example, 8×8 pixels or 16×16 pixels) and outputs the blocks to a block distributor 32 of the motion detector 12. The block dividing unit 22 also supplies a P-th (P-thly stored) frame of the N frames stored in the image storage unit 21 to the motion detecting unit 31 of the motion detector 12. Note that the P-the frame is different from the M-th frame.

Next, the details of the motion detector 12 are described below. The motion detecting unit 31 of the motion detector 12 detects the motion vector of each block of the P-th frame supplied from the block dividing unit 22 of the block divider 11 by means of, for example, interframe block matching with respect to the M-th frame supplied from the image storage unit 21. The detected motion vector is supplied to the block distributor 32. The motion vector represents the amount of motion between frames in the horizontal direction (along the X axis) and the vertical direction (along the Y axis). To improve the accuracy of the detection of motion, the motion detecting unit 31 may enlarge the image and may detect the motion on the enlarged image.

The block distributor 32 of the motion detector 12 receives N blocks (located at the same position of respective of N frames) at a time from the block dividing unit 22 and also receives the data indicating the motion of the block of the P-th frame, of the received N blocks, from the motion detecting unit 31. The block distributor 32 transfers the received N blocks and the data indicating the motion to a block processing unit, which performs processing in a mode determined depending on the amount of motion, of block processing units 51 to 53 of the block processor 13.

More specifically, when the data received from the motion detecting unit 31 indicates that the motion in the horizontal (X) direction or the vertical (Y) direction per frame is equal to or greater than 2 pixels, the block distributor 32 supplies the N blocks received from the block dividing unit 22 and the motion data received from the motion detecting unit 31 to the block processing unit 51. In a case in which the motion per frame is less than 2 pixels but equal to or greater than 1 pixel in both horizontal and vertical directions, the block distributor 32 supplies the N blocks and the motion data to the block processing unit 53. When the motion has any other value, the block distributor 32 supplies the N blocks and the motion data to the block processing unit 52.

That is, the block distributor 32 determines an optimum frame rate and an optimum spatial resolution depending on the amount of motion indicated by the data supplied from the motion detector 12, and distributes the block image data to the block processing units 51 to 53 depending on the frame rate and the spatial resolution.

The criterion for determining the block processing unit to which to supply the block image data is not limited to that employed above, but the block processing unit may be determined based on another criterion.

Now, the details of the block processor 13 are described below. As described above, the block processor 13 includes three block processing units 51 to 53. The block processing unit 51 performs pixel decimation (spatial decimation) on a total of N blocks (having motion equal to or greater than 2 pixels/frame in the horizontal or vertical direction) located at the same position of respective N frames supplied from the block distributor 32 of the motion detector 12, depending on the amount of motion indicated by the data received from the block distributor 32.

Figure 3:
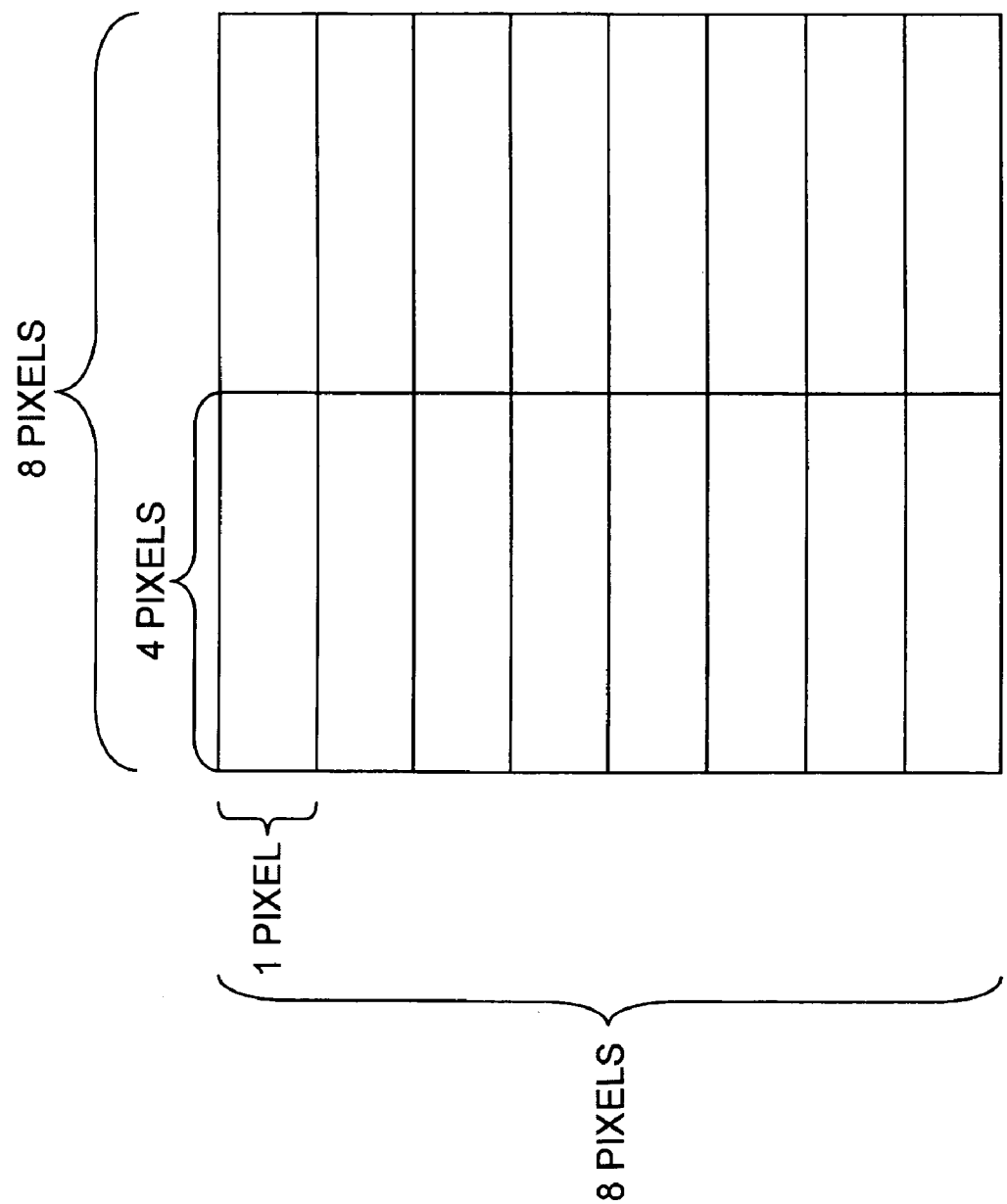
FIG. 3 is a diagram showing a process performed by a block processing unit of a motion image data conversion apparatus.
Figure 4:
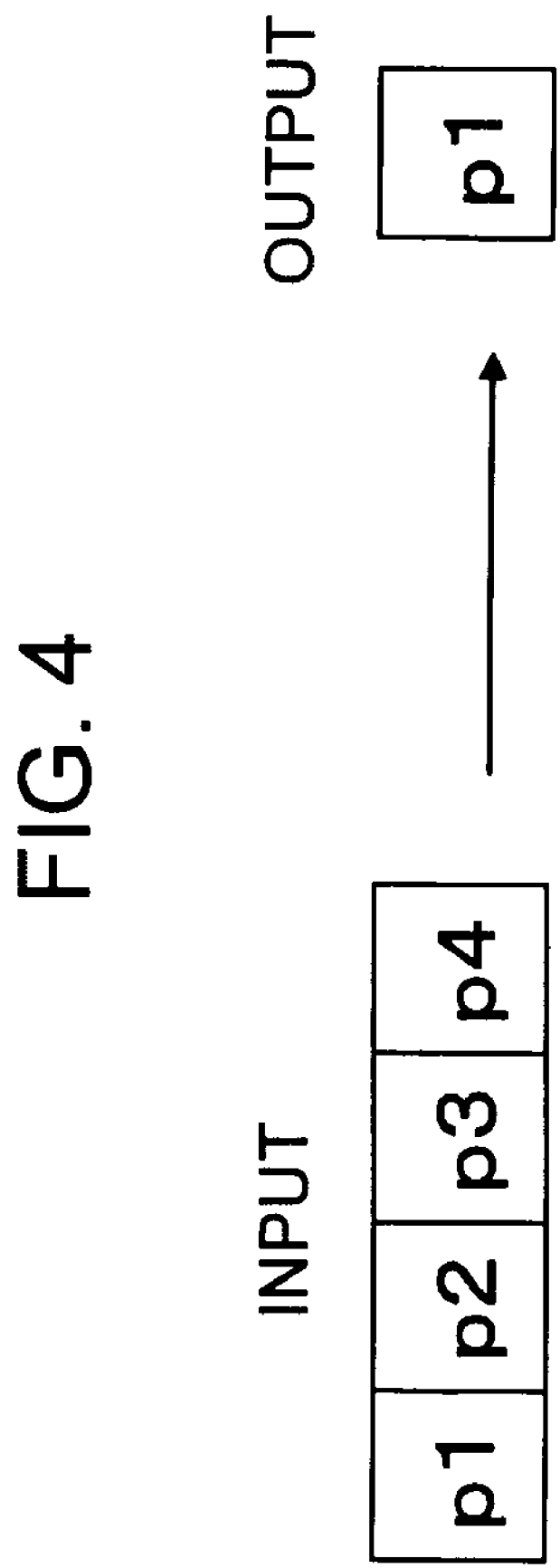
FIG. 4 is a diagram showing a process performed by a block processing unit of a motion image data conversion apparatus.

More specifically, In the case in which each block includes 8×8 pixels, when the amount of motion in the horizontal direction is equal to or greater than 2 pixels/frame, the block processing unit 51 divides each block into pixel sets each including 1×4 pixels as shown in FIG. 3. Furthermore, as shown in FIG. 4, the block processing unit 51 decimates pixel values p1 to p4 of each 1×4 pixel set into one pixel value equal to one of the pixel values p1 to p4 (p1, in the example shown in FIG. 4) (that is, the block processing unit 51 decimates pixels by a factor of 4).

Figure 5:
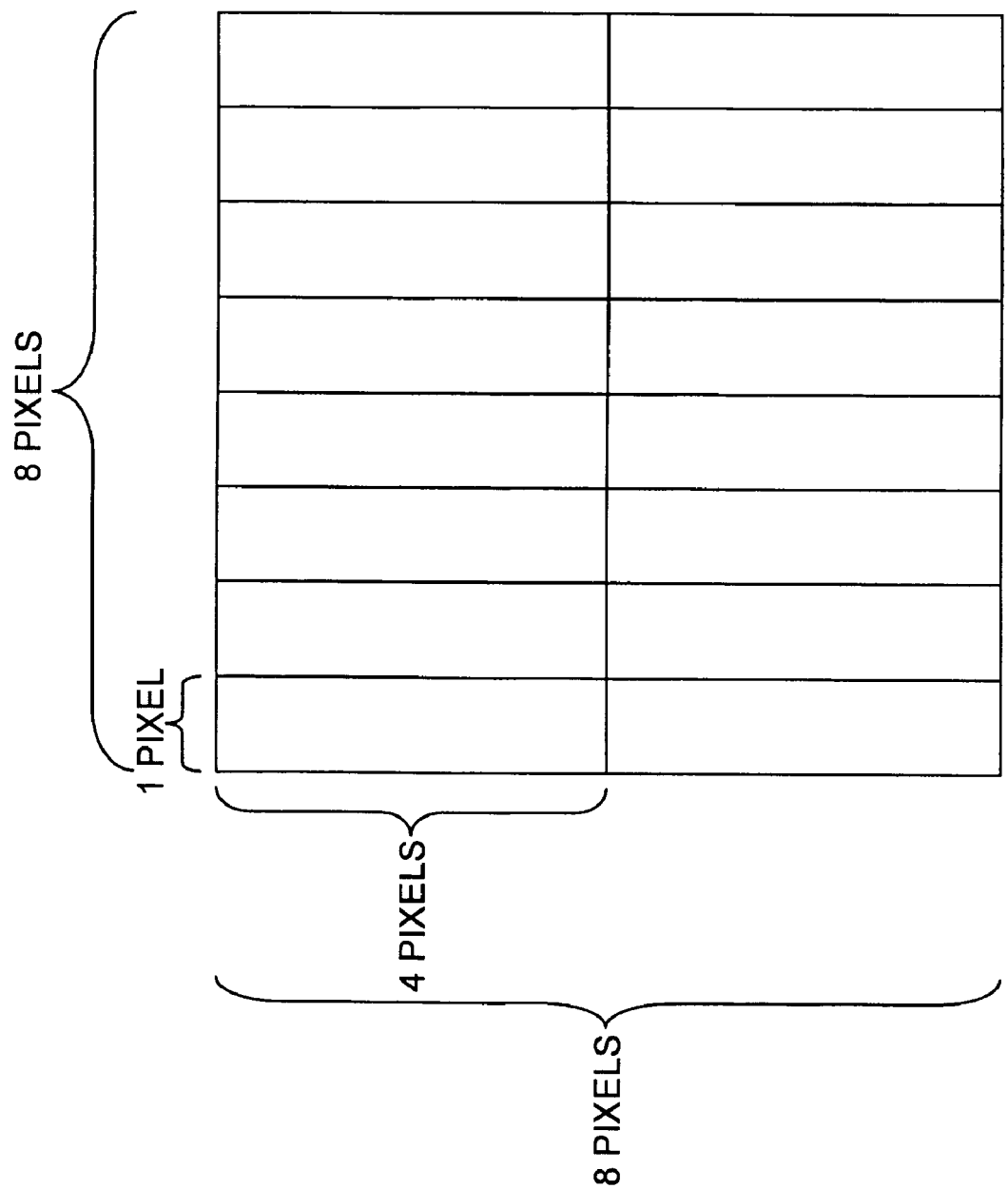
FIG. 5 is a diagram showing a process performed by a block processing unit of a motion image data conversion apparatus.
Figure 6:
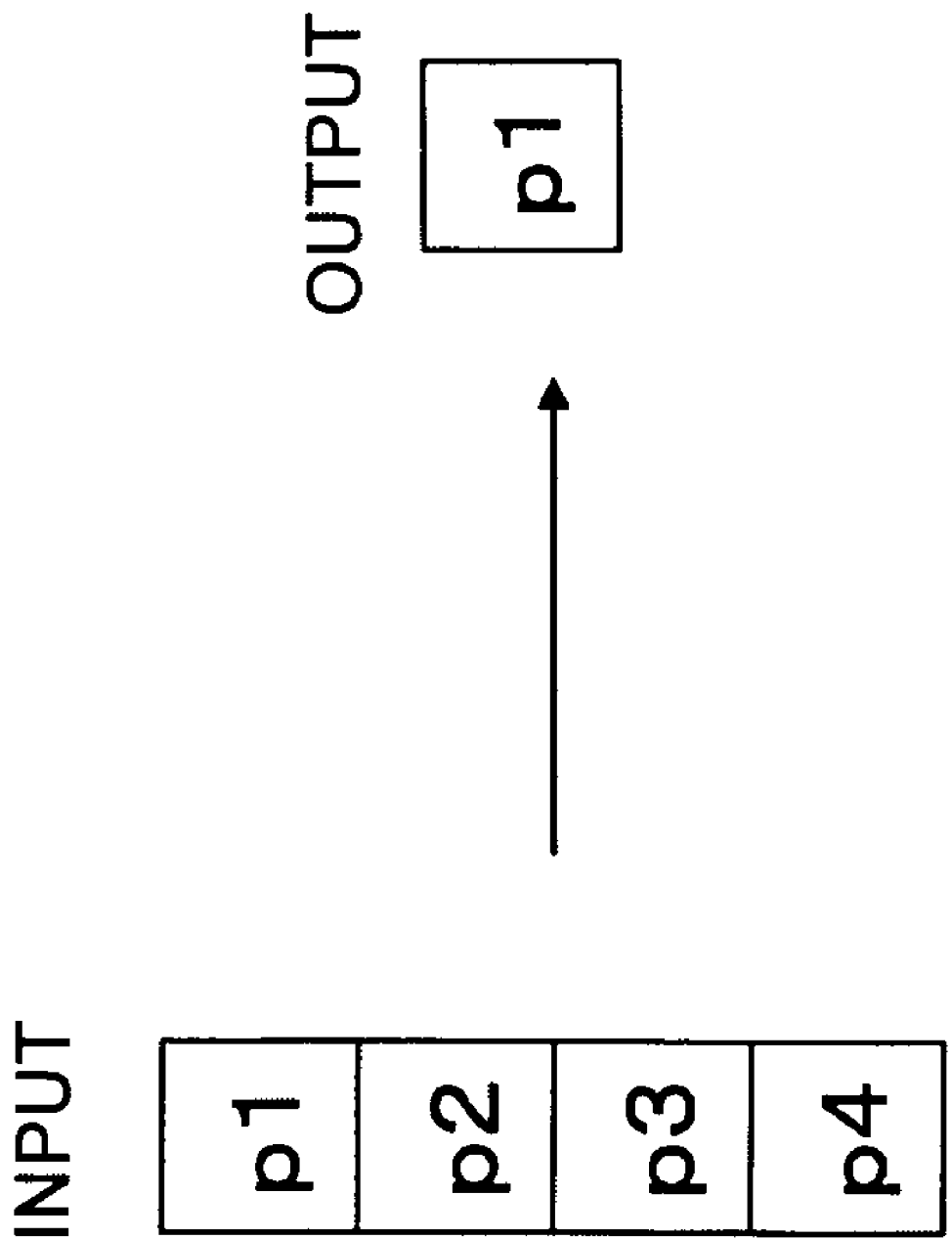
FIG. 6 is a diagram showing a process performed by a block processing unit of a motion image data conversion apparatus.

When the amount of motion in the vertical direction is equal to or greater than 2 pixels/frame, the block processing unit 51 divides each block into pixel sets each including 4×1 pixels as shown in FIG. 5, and decimates pixel values p1 to p4 of each 4×1 pixel set into one pixel value equal to one of the pixel values p1 to p4 (p1, in the example shown in FIG. 6) as shown in FIG. 6.

Figure 7:
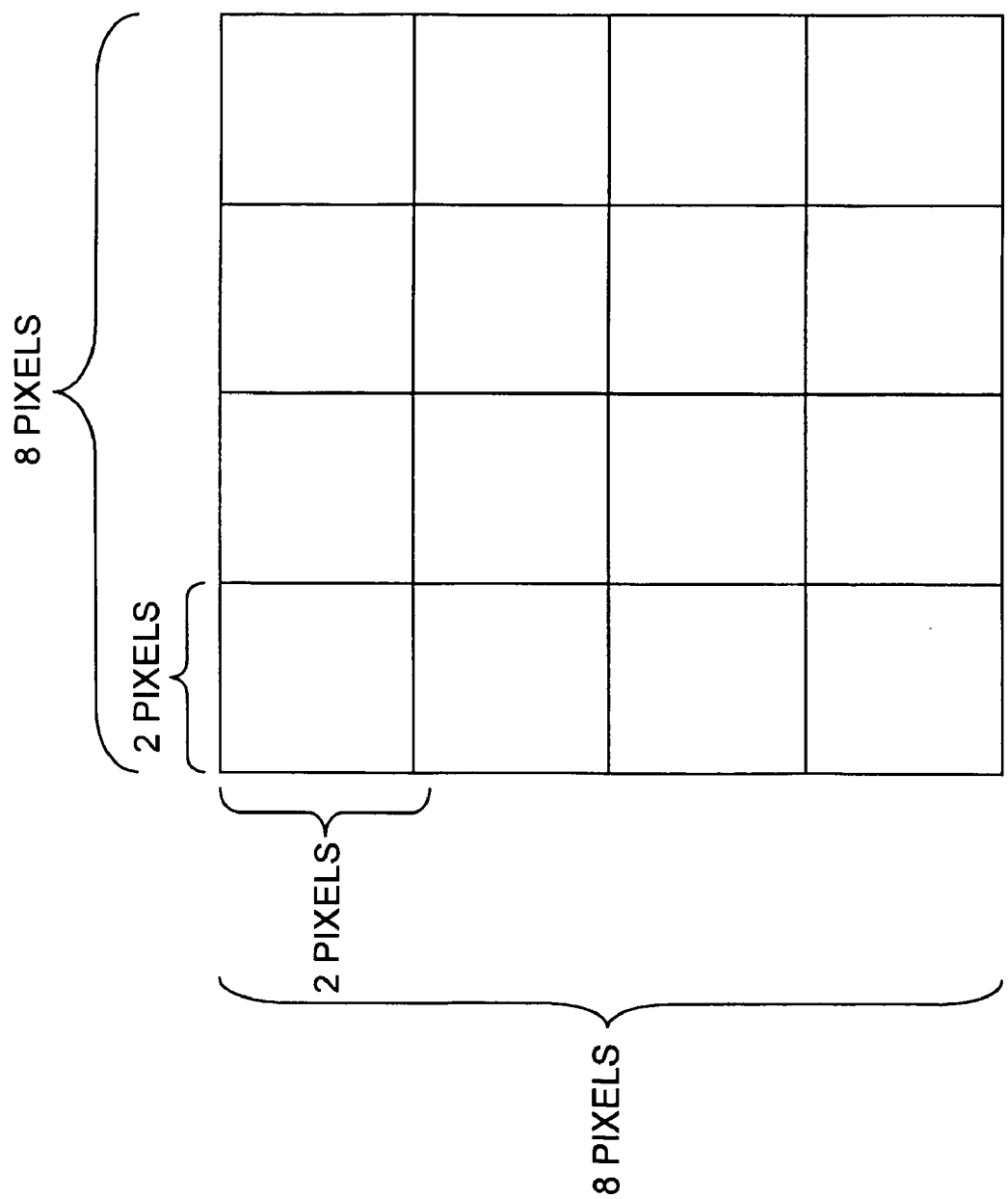
FIG. 7 is a diagram showing a process performed by a block processing unit of a motion image data conversion apparatus.
Figure 8:
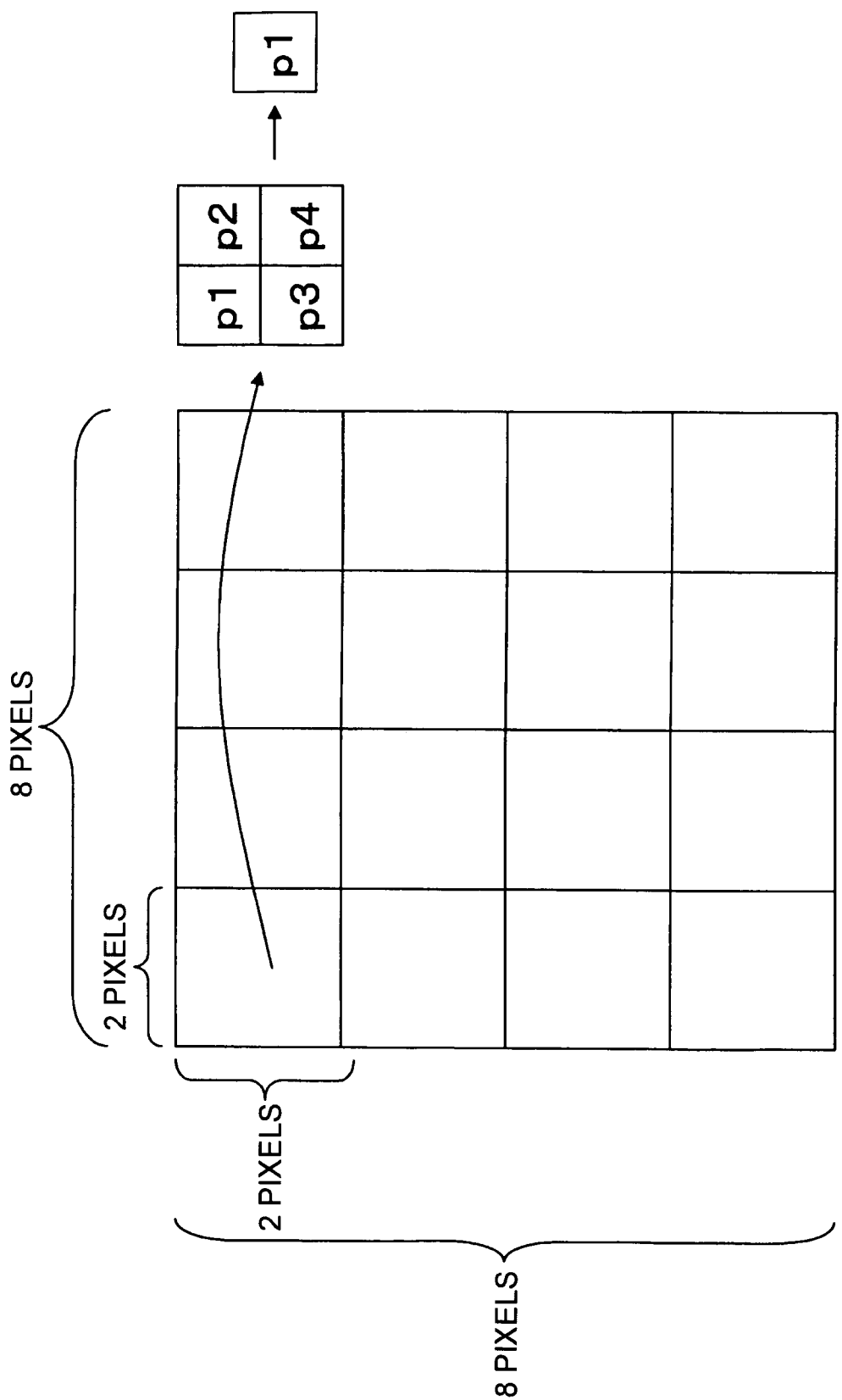
FIG. 8 is a diagram showing a process performed by a block processing unit of a motion image data conversion apparatus.

When the amount of motion is equal to or greater than 2 pixels/frame in both vertical and horizontal directions, the block processing unit 51 divides each block into pixel sets each including 2×2 pixels as shown in FIG. 7, and decimates pixel values p1 to p4 of each 2×2 pixel set into one pixel value equal to one of the pixel values p1 to p4 (p1, in the example shown in FIG. 8) as shown in FIG. 8.

The block processing unit 51 performs the spatial decimation on each of four supplied blocks in the above-described manner. Because data of each 4 adjacent pixels is reduced to data of 1 pixel, the data size of each block is reduced by a factor of 4, and the total data size of 4 blocks is reduced by a factor of 4. The resultant data of 4 blocks with the data size reduced by the factor of 4 is supplied from the block processing unit 51 to the output unit 14.

Although in the example shown in FIG. 4, pixel values of each 1×4 pixel set are decimated into one pixel value equal to the pixel value p1 at the leftmost position, in the example shown in FIG. 6, pixel values of each 4×1 pixel set are decimated into one pixel value equal to the pixel value p1 located at the top, and in the example shown in FIG. 8, pixel values of each 2×2 pixel set are decimated into one pixel value equal to the pixel value p1 located in the upper left corner, the decimated pixel value may be equal to any one of pixel values p1 to p4. Instead of using one of the pixel values p1 to p4, the pixel value may be calculated from the pixel values p1 to p4. For example, the average value of the pixel values p1 to p4 may be used.

Next, the operation performed by the block processing unit 52 shown in FIG. 2 is described below. The block processing unit 52 shown in FIG. 2 performs frame decimation (temporal decimation) on a total of N blocks (having motion less than 1 pixel/frame in both horizontal and vertical directions) located at the same position of respective N frames supplied from the block distributor 32 of the motion detector 12.

Figure 9:
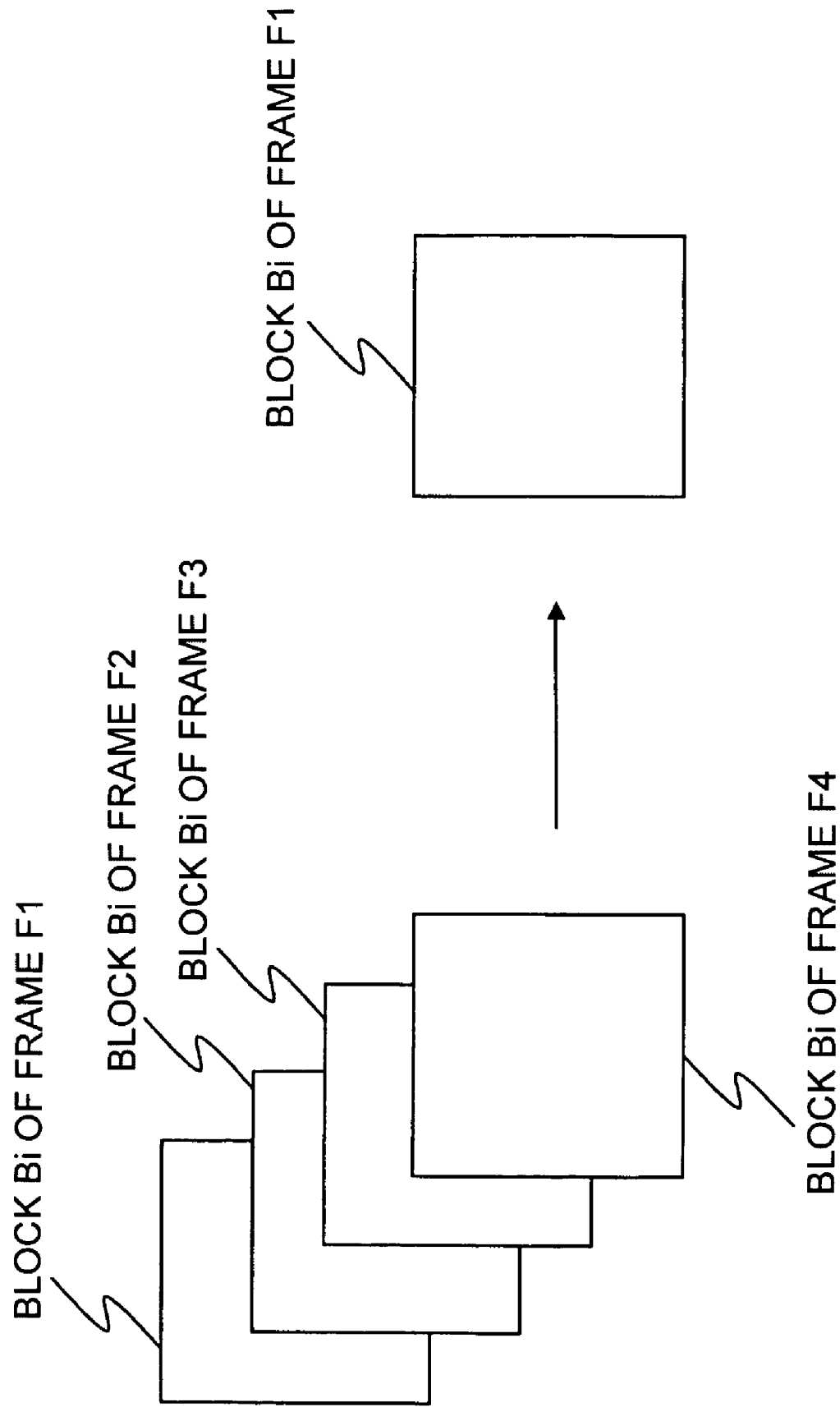
FIG. 9 is a diagram showing a process performed by a block processing unit of a motion image data conversion apparatus.

More specifically, as shown in FIG. 9, the block processing unit 52 performs decimation such that four blocks Bi at the same position of respective four successive frames F1 to F4 are decimated into one block (block Bi of frame F1 in the example shown in FIG. 9) selected from these four blocks. The resultant data of the four blocks whose total data size was reduced to ¼ of the original total data size via the temporal decimation (that is, the data of one block) is supplied from the block processing unit 52 to the output unit 14.

The block processing unit 53 performs pixel decimation (spatial decimation) and frame decimation (temporal decimation) on a total of N blocks (having motion equal to or greater than 1 pixel/frame but less than 2 pixels/frame in both horizontal and vertical directions) located at the same position of respective N frames supplied from the block distributor 32 of the motion detector 12.

Figure 10:
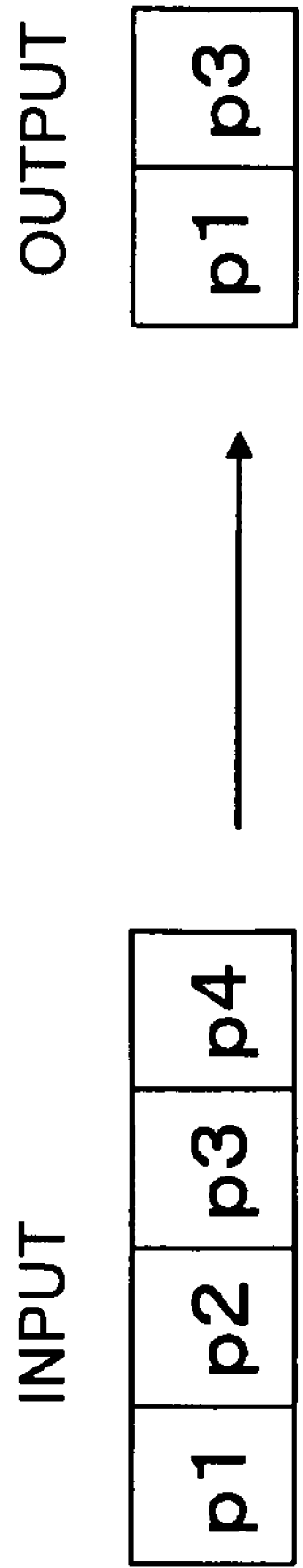
FIG. 10 is a diagram showing a process performed by a block processing unit of a motion image data conversion apparatus.
Figure 11:
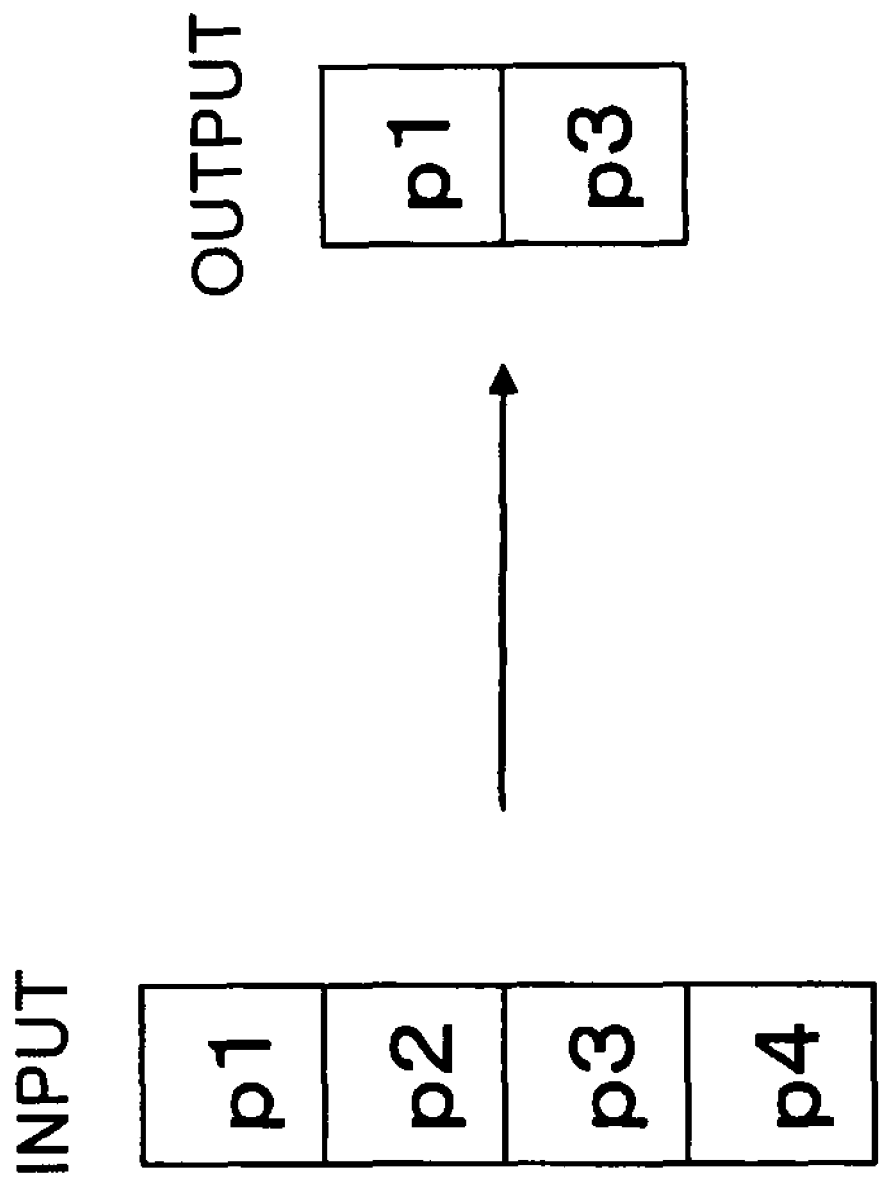
FIG. 11 is a diagram showing a process performed by a block processing unit of a motion image data conversion apparatus.

In the decimation process performed by the block processing unit 53, unlike the decimation process performed by the block processing unit 51, each pixel set including pixels p1 to p4 is decimated into a pixel set including two pixels (p1 and p3, in the example shown in FIGS. 10 and 11) selected from the pixels p1 to p4 as shown in FIGS. 10 and 11.

In the decimation process performed by the block processing unit 51, as described above, the decimation is performed in one of three ways: decimation of 1×4 pixels into one pixel; decimation of 4×1 pixels into one pixel; and decimation of 2×2 pixels into one pixel. In contrast, in the decimation process performed by the block processing unit 53, the decimation is performed in one of two ways: decimation of 1×4 pixels into 1×2 pixels; and decimation of 4×1 pixels into 2×1 pixels.

In the frame decimation process performed by the block processing unit 53, unlike the frame decimation process performed by the block processing unit 52, arbitrary two blocks (blocks of frames F1 and F3, in the example shown in FIG. 12) are selected from a total of four blocks Bi located at the same position of respective four successive frames F1 to F4, and the four blocks are decimated into two selected blocks thereby decimating frames (by a factor of 2).

As a result of the decimation performed by the block processing unit 53 on the supplied four blocks, the data size is reduced by a factor of 2 via the spatial decimation and also reduced by a factor of 2 via the temporal decimation, and thus, the total data size of four blocks is reduced to ¼ (=½×½) of the original data size. The resultant data of 4 blocks with the data size reduced by the factor of 4 is supplied from the block processing unit 53 to the output unit 14.

As described above, the motion image data conversion apparatus 10 shown in FIG. 1 converts (compresses) an input motion image into a motion image with a reduced data size. Note that the data conversion is performed using the super resolution effect based on the nature of human visual sense so that a viewer does not perceive degradation in image quality.

More specifically, the block distributor 32 determines the optimum frame rate and the optimum spatial resolution depending on the amount of motion informed by the motion detector 12, the block distributor 32 determines which one of the block processing units 51 to 53 should perform image data conversion, based on the determined optimum frame rate and spatial resolution, and the block distributor 32 supplies image data to the selected block processing unit. That is, it is possible to perform data conversion in different modes using the block processing units 51 to 53 so that the motion image data is converted without image quality degradation perceptible by viewers. As described above, the super resolution effect refers to a visual effect based on the nature of visual sense that causes a viewer to perceive the sum of a plurality of images given in a particular period. The super resolution effect occurs as a result of a complicated mixture of functions of human visual sense, in particular, a function of temporally integrating visual stimulation and a function of memorizing stimulation. The motion image data conversion apparatus 10 shown in FIG. 1 is configured to perform motion image data conversion using the super resolution effect due to the human visual function of temporarily integrating visual stimulation.

A more detailed explanation of the characteristics of human visual sense and the super resolution effects may be found, for example, in Japanese Patent Application No. 2003-412501. As described in Japanese Patent Application No. 2003-412501, the super resolution effect occurs when the following conditions are satisfied.

To obtain the super resolution effect when pixel decimation is performed by a factor of m, it is required to substantially cancel out the aliasing components of first to (m−1)-th orders caused by the decimation. When the following two equations (1) and (2) are satisfied, the aliasing components of k-th (k=1, 2, ..., (m−1)) order are cancelled out.

$$\sum_t \cos(2\pi k \phi_t) = 0 \qquad \text{Equation (1)}$$

$$\sum_t \sin(2\pi k \phi_t) = 0 \qquad \text{Equation (2)}$$

where $\phi_t$ is the sampling position deviation that occurs when pixels are decimated, and that is defined by the following equation (3):

$$\phi_t = -\frac{v}{m}\frac{t}{T} \qquad \text{Equation (3)}$$

Note that in the above equation, when the sampling position is shifted to the right, the $\phi_t$ has a positive value (unlike the definition in Japanese Patent Application No. 2003-412501).

If the decimation factor m and the amount of local motion v satisfy equations (1) and (2), the super resolution effect occurs and thus degradation in image quality is not easily perceived by viewers.

In the motion image data conversion apparatus 10 described above with reference to FIGS. 1 to 12, pixel decimation by a factor of 4 is performed when the local motion per frame is equal to or greater than 2 pixels in the horizontal or vertical direction. However, when the motion per frame is equal to 4 pixels, that is, when the amount of local motion v=4, if the pixel decimation factor m=4, then the sampling position deviation $\phi_t$ given by equation (3) can take an integer greater than 0.

That is, equation (1) is not satisfied for all values of k, and thus the super resolution effect does not occur. Similarly, when the pixel decimation factor m=2 and the amount of local motion v=1, or when the pixel decimation factor m=4 and the amount of local motion v=2, equation (1) is also not satisfied for all values of k, and thus the super resolution effect does not occur and significant degradation in image quality occurs. That is, in the motion image data conversion apparatus 10 described above with reference to FIGS. 1 to 12, although when the pixel decimation factor m and the amount of local motion v satisfy particular conditions, the super resolution can be achieved and degradation in image quality due to the reduction in the data size is not perceived by viewers, the super resolution cannot be achieved and significant degradation in image quality occurs when the pixel decimation factor m and the amount of local motion v do not satisfy the particular conditions. In an embodiment of the present invention, the above problem is solved as follows.

(2) Structure of a Motion Image Data Conversion Apparatus that Performs a Decimation Process in an Improved Manner In an embodiment described below, a motion image data conversion apparatus is capable of performing a decimation process in an improved manner such that the super resolution effect can be achieved more easily under much wider conditions and thus the data conversion (data compression) can be performed without causing significant degradation in image quality.

Figure 13:
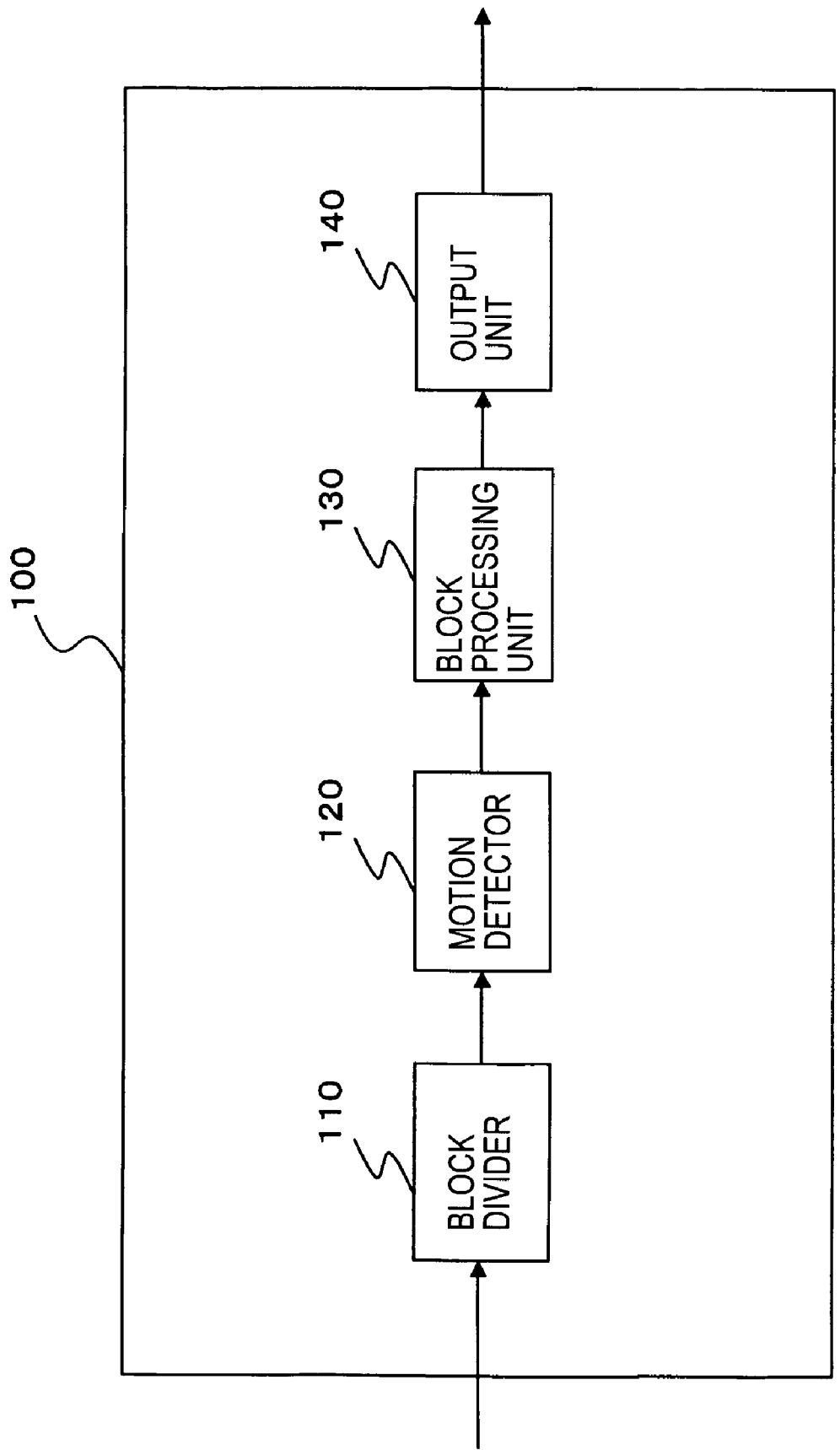
FIG. 13 is a block diagram showing a structure of a motion image data conversion apparatus that performs data conversion using the super resolution effect.

The motion image data conversion apparatus 100 according to the present embodiment is described below with reference to FIG. 13. The motion image data conversion apparatus 100 shown in FIG. 13 is capable of, as with the motion image data conversion apparatus 10 described above with reference to FIG. 1, reducing the data size using the super resolution effect based on the nature of human visual sense such that degradation in image quality due to the reduction in the data size is not perceived by viewers. Note that in the motion image data conversion apparatus 100 according to the present embodiment, the super resolution effect occurs regardless of whether the pixel decimation factor m and the amount of local motion v satisfy particular conditions, and thus data size reduction does not cause perceptible degradation in image quality.

Referring to FIG. 13, the structure of the motion image data conversion apparatus 100 is described below. A block divider 110 divides each frame of input image data into blocks and supplies the resultant blocks to a motion detector 120. The motion detector 120 detects the amount of motion of each block supplied from the block divider 110 and transmits data indicating the amount of motion together with the block to a block processor 130. The block processor 130 reduces data sizes of the blocks supplied from the motion detector 120 by performing a motion image conversion process on the blocks depending on the amount of motion. The block processor 130 supplies resultant block data with reduced data sizes to an output unit 140. The output unit 140 combines data of respective blocks with reduced data sizes supplied from the block processor 130 and outputs the data in the form of stream data.

Figure 14:
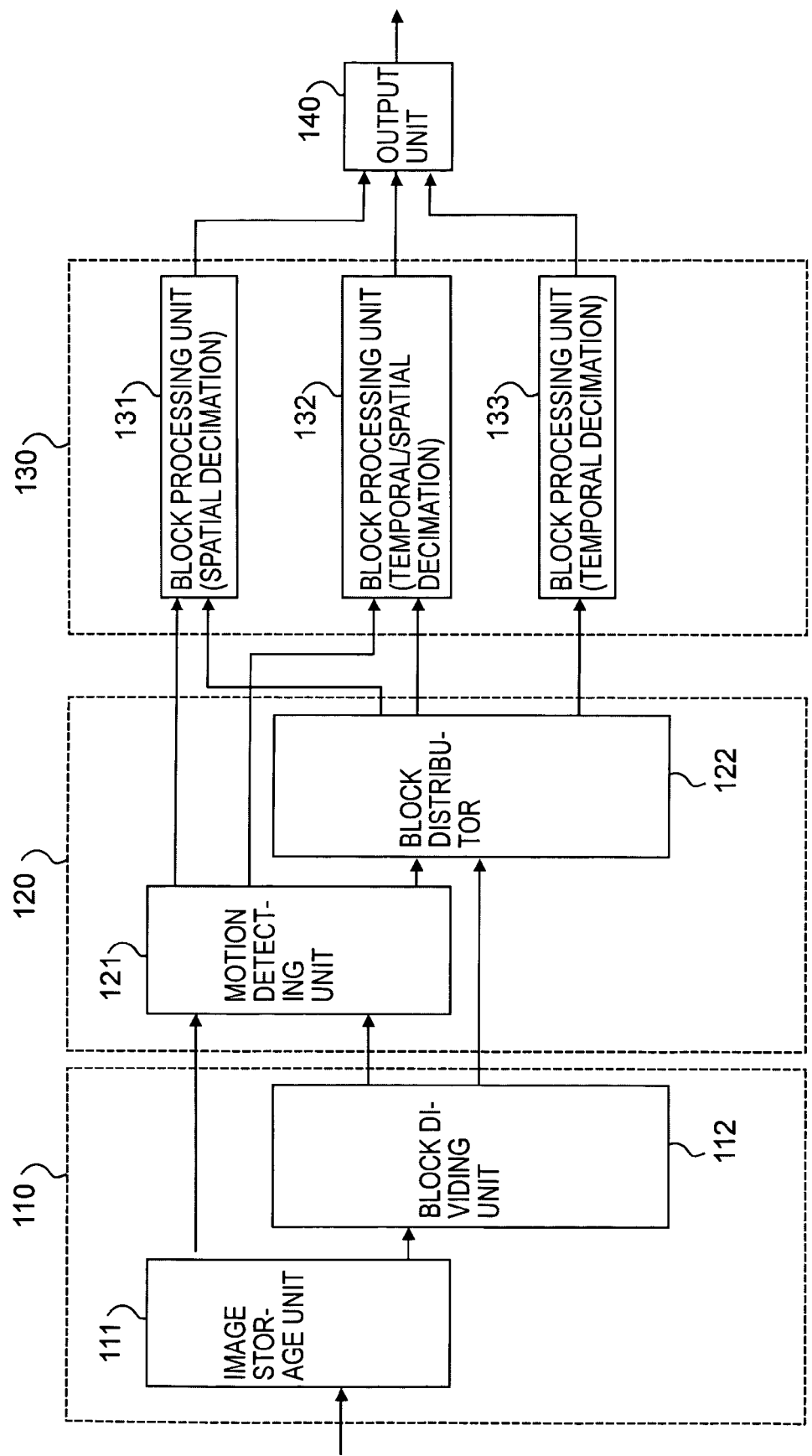
FIG. 14 is a block diagram showing a detailed structure of a motion image data conversion apparatus according to an embodiment of the invention.

Referring to FIG. 14, details of the respective parts of the motion image data conversion apparatus 100 are described below. First, the block divider 110 is described. Each frame of the motion image input to the motion image data conversion apparatus 100 is supplied to an image storage unit 111 of the block divider 110. The image storage unit 111 stores the supplied frames. Each time N frames have been stored in the image storage unit 111 (where N is an integer), the image storage unit 111 supplies the N frames to a block dividing unit 112 and also supplies an M-th (M-thly stored) frame of the N frames to a motion detecting unit 121 of the motion detector 120. For example, N=4.

The block dividing unit 112 divides each of the N successive frames supplied from the image storage unit 111 into blocks with a predetermined size (for example, 8×8 pixels or 16×16 pixels) and outputs the blocks to a block distributor 122 of the motion detector 120. The block dividing unit 112 also supplies a P-th (P-thly stored) frame of the N frames stored in the image storage unit 111 to the motion detecting unit 121 of the motion detector 120. Note that the P-the frame is different from the M-th frame.

Now, the details of the motion detector 120 are described below. The motion detecting unit 121 of the motion detector 120 detects the motion vector of each block of the P-th frame supplied from the block dividing unit 112 of the block divider 110 by means of, for example, interframe block matching with respect to the M-th frame supplied from the image storage unit 111. The detected motion vector is supplied to the block distributor 122 and the block processing units 131 and 132. The motion vector represents the amount of motion between frames in the horizontal direction (along the X axis) and the vertical direction (along the Y axis). For example, when M=2 and P=3, the motion vector indicates the amount of motion per frame in the horizontal (X) direction and vertical (Y) direction. The method of detecting the motion vector is not limited to the block matching, but the motion vector may be detected using other methods.

The block distributor 122 of the motion detector 120 receives N blocks (located at the same position of respective of N frames) at a time from the block dividing unit 112 and also receives the data indicating the motion of the block of the P-th frame of the received N blocks from the motion detecting unit 121. The block distributor 122 transfers the received N blocks to one of block processing units 131 to 133 of the block processor 130, selected depending on the amount of motion. Hereinafter, the "block processing unit 130" will be used when it is not necessary to identify a particular one of block processing units 131 to 133.

More specifically, when the amount of motion per frame indicated by the data supplied from the motion detecting unit 121 is greater in one of horizontal (X) and vertical directions than in the other direction, if a greater amount of motion is equal to or greater than 2 pixels/frame, the block distributor 122 supplies the N blocks received from the block dividing unit 112 to the block processing unit 131. In a case in which the greater amount of motion is equal to or greater than 1 pixel/frame but less than 2 pixels/frame, the block distributor 122 supplies the N blocks to the block processing unit 132.

When the amount of motion has any other value, the block distributor 122 supplies the N blocks to the block processing unit 133.

That is, depending on the amount of motion, the blocks are supplied to one of block processing units 131 to 133, as follows:

(a) When the amount of motion≧2 pixels/frame, the blocks are supplied to the block processing unit 131 (to perform spatial decimation).

(b) When 2 pixels/frame>amount of motion≧1 pixel/frame, the blocks are supplied to the block processing unit 132 (to perform temporal and spatial decimation).

(c) When 1 pixel/frame>amount of motion, the blocks are supplied to the block processing unit 133 (to perform temporal decimation).

That is, when the amount of motion≧2 pixels/frame, spatial decimation is performed by the block processing unit 131. When 2 pixels/frame>amount of motion≧1 pixel/frame, temporal and spatial decimation is performed by the block processing unit 132. When 1 pixel/frame>amount of motion, temporal decimation is performed by the block processing unit 133.

As described above, the block distributor 122 determines an optimum frame rate and an optimum spatial resolution depending on the amount of motion indicated by the motion data supplied from the motion detecting unit 121, and distributes the block image data to the block processing units 131 to 133 depending on the frame rate and the spatial resolution. The criterion for determining the block processing unit to which to supply the block image data is not limited to that employed above, but the block processing unit may be determined based on another criterion.

For example, when the amount of motion per frame is greater in one the horizontal (X) direction and the vertical (Y) direction than in the other direction, if a greater amount of motion is equal to or greater than 2 pixels/frame, the N blocks output from the block divider 112 may be supplied to the block processing unit 131, but when the greater amount of motion has any other value, the N blocks may be supplied to the block processing unit 133. In this case, the block processing unit 132 does not perform any process.

Now, the details of the block processor 130 are described below. In this embodiment, the block processor 130 includes three block processing units 131 to 133.

When the amount of motion of N blocks located at the same position of respective N successive frames supplied from the block distributor 122 of the motion detector 120 is equal to or greater than 2 pixel/frame in the horizontal or vertical direction, the block processing unit 131 performs pixel decimation (spatial decimation) depending on a greater amount of motion of amounts of motion in the horizontal and vertical directions indicated by the motion data supplied from the motion detecting unit 131. That is, the block processing unit 131 performs spatial decimation on N blocks having an amount of motion≧2 pixels/frame.

More specifically, in the case in which each block includes 8×8 pixels, when the amount of motion in the horizontal direction is equal to or greater than 2 pixels/frame, the block processing unit 131 divides each block into pixel sets each including 1×4 pixels as shown in FIG. 15A.

Figure 16:
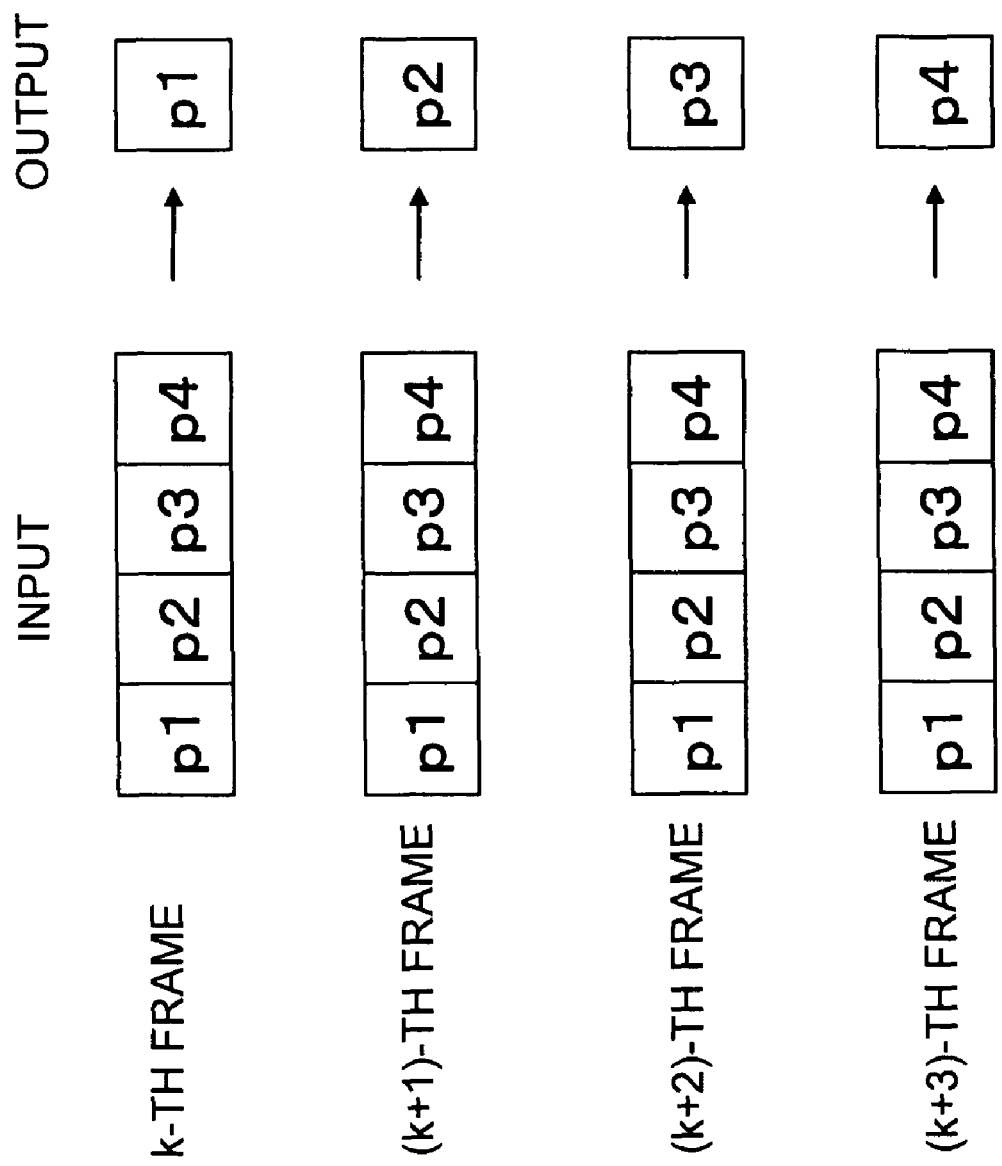
FIG. 16 is a diagram showing a process performed by a block processing unit of a motion image data conversion apparatus.
Figure 17:
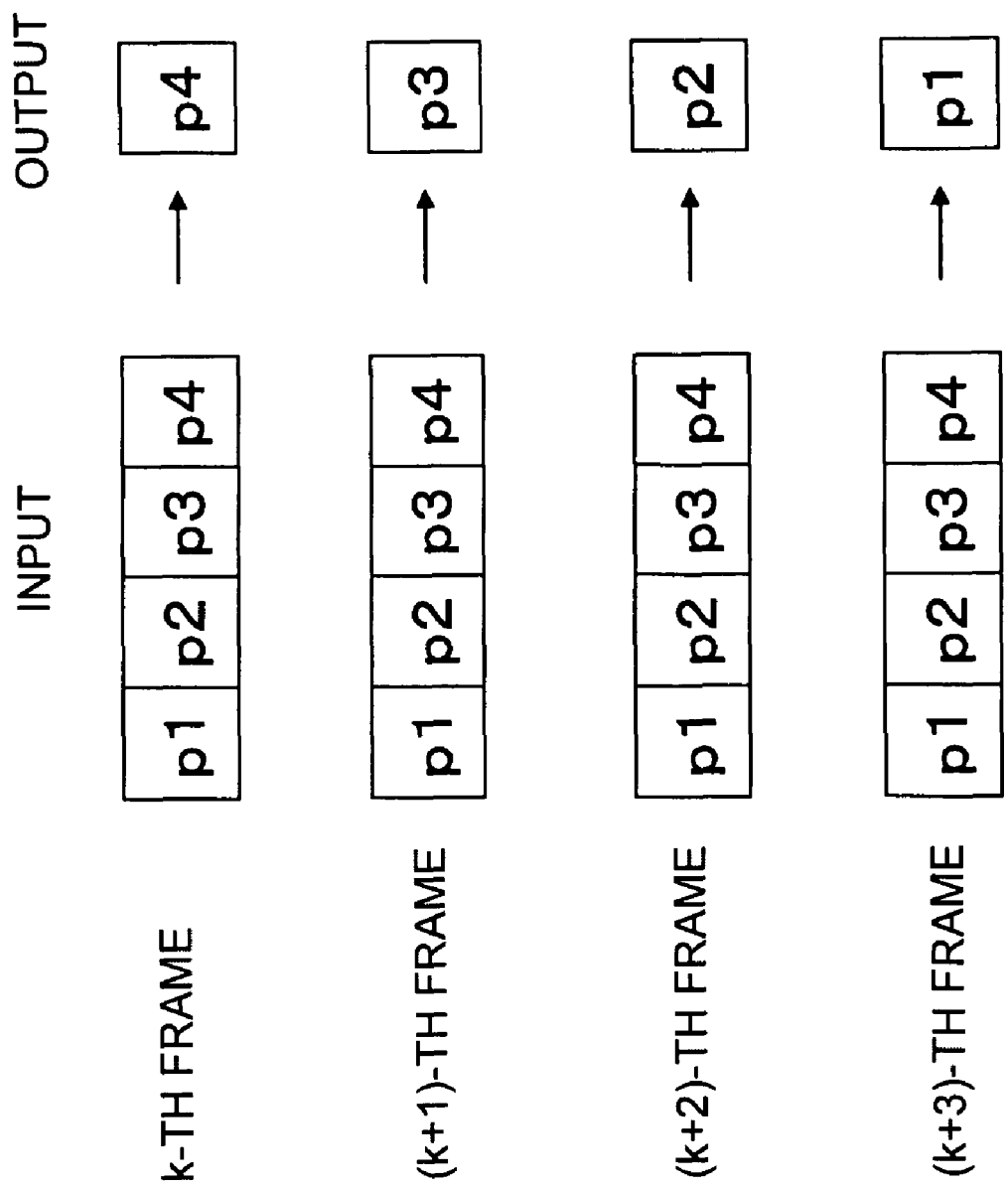
FIG. 17 is a diagram showing a process performed by a block processing unit of a motion image data conversion apparatus.

Furthermore, the block processing unit 131 decimates pixel values p1 to p4 of each 1×4 pixel set into one pixel equal to one of the pixel values p1 to p4 (that is, four pixels are decimated into one pixel, in other words, pixels are decimated by a factor of 4) in one of modes shown in FIGS. 15B, 16, and 17.

In the decimation mode shown in FIG. 15B, decimation is performed in a similar manner to the decimation process (shown in FIG. 4) performed by the motion image data conversion apparatus having the basic structure. That is, in this decimation mode, for all N successive frames (k-th to (k+3)-th frames), four pixel values are decimated into one representative pixel value at a sampling point (p1 in the example shown in FIG. 15B).

In the decimation modes shown in FIGS. 16 and 17, rather than employing a pixel value at the same position as a sampling point for all N successive frames (k-th to (k+3)-th frames), the sampling point position of the representative pixel value to which four pixel values are decimated is varied frame by frame.

More specifically, in the decimation mode shown in FIG. 16, the sampling point position of the representative pixel value, to which four pixel values p1 to p4 which are in a horizontal line and which are located at the same positions for all four frames (k-th to (k+3)-th frames) are decimated, is shifted by one pixel to the right, frame by frame, as follows:

p1 is selected as the sampling point for the k-th frame;
p2 is selected as the sampling point for the (k+1)-th frame;
p3 is selected as the sampling point for the (k+2)-th frame; and
p4 is selected as the sampling point for the (k+3)-th frame.

In the decimation mode shown in FIG. 17, the sampling point position of the representative pixel value, to which four pixel values p1 to p4 which are in a horizontal line and which are located at the same positions for all four frames (k-th to (k+3)-th frames) are decimated, is shifted by one pixel to the left, frame by frame, as follows:

p4 is selected as the sampling point for the k-th frame;
p3 is selected as the sampling point for the (k+1)-th frame;
p2 is selected as the sampling point for the (k+2)-th frame; and
p1 is selected as the sampling point for the (k+3)-th frame.

As described above, in the decimation modes shown in FIGS. 16 and 17, in N successive frames (k-th to (k+3)-th frames), four pixel values are decimated into one pixel value at the sampling point position which is shifted frame by frame rather than is fixed.

The block processing unit 131 selects one of decimation modes shown in FIG. 15 to 17 depending on motion indicated by the motion data supplied from the motion detecting unit 121 of the motion detector 120.

The details of the block processing unit 131 are described below with reference to FIG. 18. The block processing unit 131 includes a decimation mode determination unit 151 and a decimation execution unit 152. The motion data indicating the amount of motion output from the motion detecting unit 121 is applied to the decimation mode determination unit 151. As described above, blocks supplied to the block processing unit 131 are those blocks whose motion≧2 pixels/frame, and thus the amount of motion indicated by the motion data input to the decimation mode determination unit 151 of the block processing unit 131 is equal to or greater than 2 pixels/frame.

Based on the amount of motion, the decimation mode determination unit 151 selects one of the modes shown in FIGS. 15 to 17 in which to perform decimation. The details of the manner in which to select the decimation mode will be described later. In accordance with the determination made by the decimation mode determination unit 151, the decimation execution unit 152 executes the decimation process in one the modes shown in FIGS. 15 to 17.

In the decimation process, by shifting the sampling point position depending on the frame as shown in FIG. 16 or 17, the following effects are obtained. Hereinafter, the decimation mode in which the sampling point position is shifted depending on the frame will be referred to as a "sampling point position shifting mode" (SPP shifting mode) or a "decimation position shifting mode". Note that the SPP shifting mode has two submodes, in one of which the sampling point position is shifted to the right with frame advance as shown in FIG. 16, and in the other one of which the sampling point position is shifted to the left with frame advance as shown in FIG. 17.

Shifting of the decimation position is equivalent to adding 1/m to the sampling position deviation $\phi_t$ in equation (3) frame by frame (in the case in which the sampling point position is shifted to the right (FIG. 16)) or equivalent to subtracting 1/m from the sampling position deviation $\phi_t$ in equation (3) frame by frame (in the case in which the sampling point position is shifted to the left (FIG. 17)), where m is the decimation factor (m pixels are decimated into one pixel).

When the decimation position is shifted, the sampling position deviation $\phi'_t$ is given by equation (4).

$$\phi'_t = \phi_t \pm \frac{1}{m}\frac{t}{T}$$
$$= -\frac{v}{m}\frac{t}{T} \pm \frac{1}{m}\frac{t}{T}$$
$$= \frac{-(v \mp 1)}{m}\frac{t}{T}$$

Equation (4)

Figure 19:
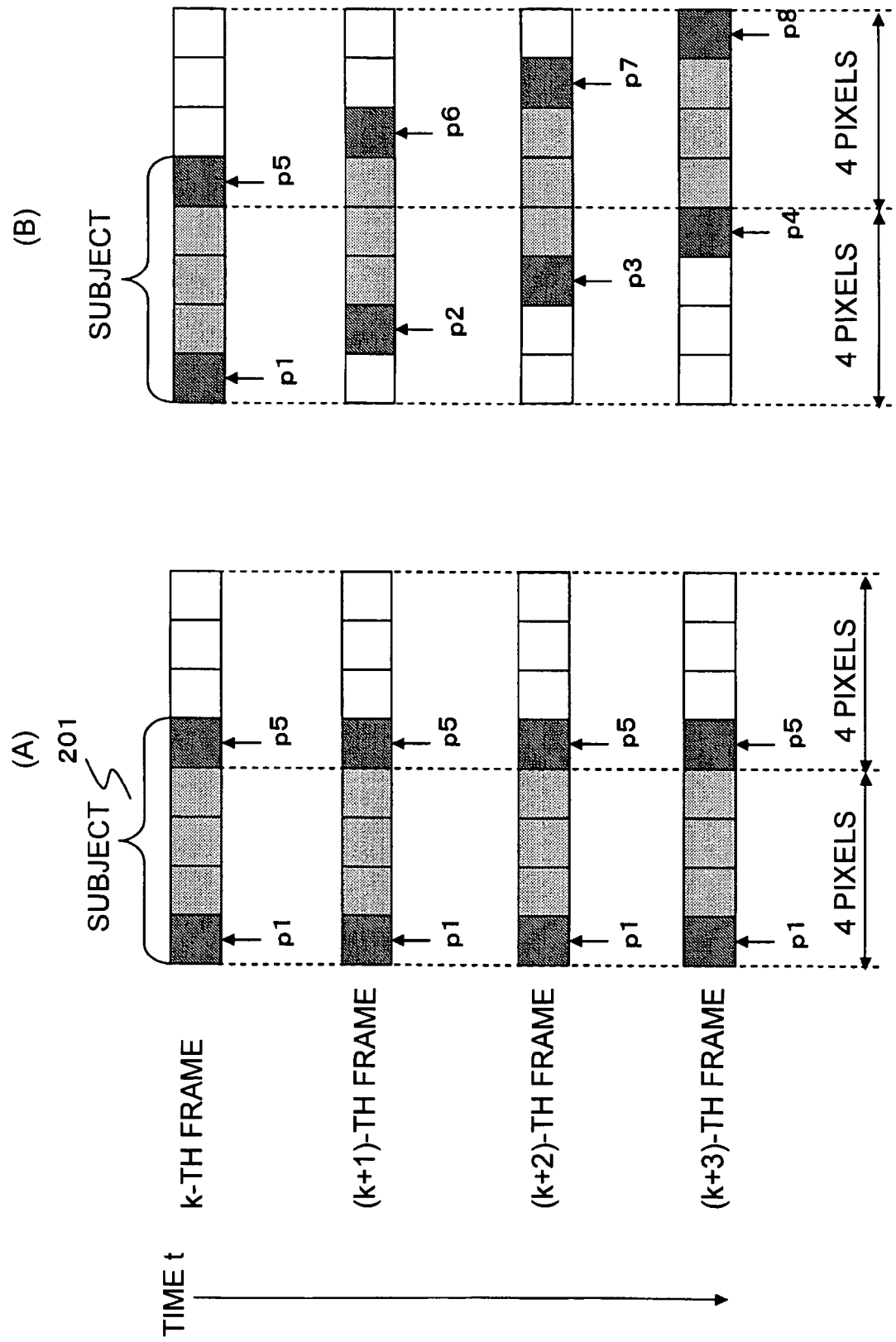
FIG. 19A is diagram showing a decimation process in a fixed sampling point position mode.
FIG. 19B is a diagram showing a decimation process in a sampling point position shifting mode, performed by a block processing unit of a motion image data conversion apparatus.

From equation (4), it can be seen that, from the point of view of the theory of signal processing, shifting of the sampling point position in the same direction as a direction in which a subject is moving is equivalent to deceleration of the moving speed of the subject, and shifting of the sampling point position in a direction opposite to the direction in which the subject is moving is equivalent to acceleration of the moving speed of the subject. As a matter of course, the acceleration or the deceleration caused by the shifting of the sampling point position does not mean that the actual moving speed of the subject changes. Specific examples of decimation processes are described below with reference to FIGS. 19A and 19B.

In the example shown in FIG. 19A, a subject 201 (represented by five pixels p1 to p5 of a k-th frame) does not move during a passage of four frames (k-th to (k+3)-th frames). In the example shown in FIG. 19B, the subject 201 moves at a speed of v=1 pixel/frame during the passage of four frames (k-th to (k+3)-th frames).

The block processing unit 131 of the motion image data conversion apparatus 100 shown in FIGS. 13 and 14 receives blocks whose motion in the horizontal direction is equal to or greater than 2 pixels/frame, and thus frame data such as that shown in FIG. 19A or 19B is not input to the block processing unit 131. On the other hand, if data has motion equal to or greater than 2 pixels/frame in the horizontal direction, decimation is performed in one of modes shown in FIGS. 15 to 17 depending on the amount of motion. That is, the decimation position is shifted or not shifted depending on the amount of motion.

Referring to FIGS. 19A and 19B, the decimation process performed while fixing the sampling point position and the decimation process performed while shifting the sampling point position are described below. In the example shown in FIG. 19A, a subject is at rest, and decimation is performed in the fixed SPP mode. In the example shown in FIG. 19B, a subject moves at a speed of v=1 pixel/frame, and decimation is performed while shifting the sampling point position in a similar manner to the example described earlier with reference to FIG. 16.

For the data shown in FIG. 19A in which the subject does not move, if decimation is performed by a factor of 4, that is, if four pixels are decimated into one pixel in the fixed SPP (sampling point position) mode as described above with reference to FIG. 15, the pixel value p1 of first four pixels and the pixel value p5 of next four pixels are output, and no change occurs in position of output pixel values. On the other hand, for the data shown in FIG. 19B in which the subject moves in the horizontal direction at the speed of v=1 pixel/frame, if decimation is performed in the SPP (sampling point position) shifting mode in which the sampling point position is shifted frame by frame as described above with reference to FIG. 16, the sampling point position, the pixel value at which is employed as the representative pixel value for four pixel values in decimation, is shifted frame by frame as shown in FIG. 19B, that is, the sampling point position is shifted as follows.

p1 and p5 for a k-th frame
p2 and p6 for a (k+1)-th frame
p3 and p7 for a (k+2)-th frame
p4 and p8 for a (k+3)-th frame As a result, in each frame, the same pixel values are output for the subject moving at the speed of 1 pixel/frame shown in FIG. 19B and the subject at rest shown in FIG. 19A. That is, the data which is output as a result of performing decimation on a motion image including a subject moving at a speed of v=1 pixel/frame in the SPP shifting mode, in which the sampling point position is shifted frame by frame as described above with reference to FIG. 16, is identical to the data which is output as a result of performing decimation on a subject moving at a speed of 0 (=v−1) in the fixed SPP mode described above with reference to FIG. 15. That is, performing the decimation process shown in FIG. 16 on a moving subject is equivalent to performing the decimation process shown in FIG. 15 on a subject whose moving speed is reduced by 1.

From the above discussion, it can be seen that it is possible to virtually accelerate or decelerate the moving speed of a subject. In the motion image data conversion apparatus 10 described earlier with reference to FIGS. 1 to 12, the super resolution effect can be obtained only when the decimation factor m and the amount of local motion v satisfy particular conditions, and significant degradation in image quality occurs when the decimation factor m and the amount of local motion v do not satisfy the particular conditions. In contrast, in the motion image data conversion apparatus 100 according to the present embodiment described above with reference to FIG. 13 and other figures, the block processor 130 performs decimation in an optimum mode selected depending on the amount of motion such that the moving speed of a subject is virtually changed to a value at which the super resolution effect can be obtained. Thus, the motion image data conversion apparatus 100 according to the present embodiment can obtain the super resolution effect even for data for which the motion image data conversion apparatus 10 described earlier with reference to FIGS. 1 to 12 cannot obtain a sufficient super resolution effect, and thus the motion image data conversion apparatus 100 can perform image data conversion (compression) even for such data without causing significant degradation in image quality.

Figure 20:
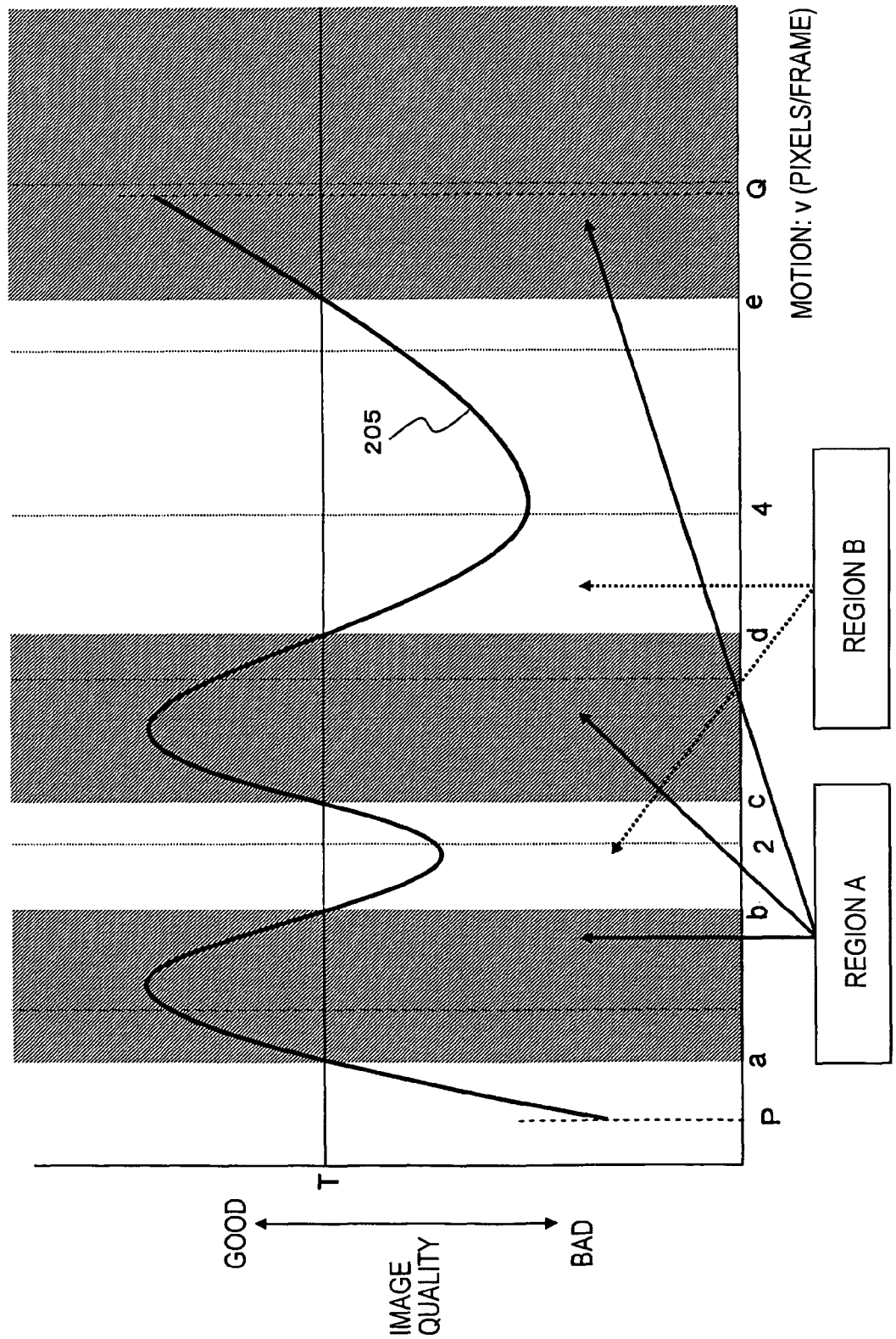
FIG. 20 is a graph showing the correspondence between the moving speed of a subject and the image quality of an image reproduced from data produced by a block processing unit of a motion image data conversion apparatus by performing a decimation process in the sampling point position shifting mode.

Now, a further discussion is made below as to when it is difficult to obtain the super resolution effect for a moving subject. FIG. 20 is a graph showing the quality of image data reproduced (decompressed) from compressed data produced by performing decimation (compression) by a factor of 4 in the fixed SPP mode on original data of a moving image including a subject moving at a speed of v per frame, as a function of the moving speed v of the subject. In FIG. 20, the moving speed v (pixels/frame) of the subject is plotted along the horizontal direction, and the image quality is plotted along the vertical axis. Note that the result shown in FIG. 20 is based on subjective evaluation on image quality for various subject speeds, and the result is plotted as an image evaluation curve 205. In FIG. 20, T denotes a threshold value of the image quality score. When the score is higher than the threshold value T, the image quality is regarded as good.

When decimation (by a factor of 4) is performed in the fixed SPP mode as described earlier with reference to FIG. 15 for various subjects moving at moving speeds v in the range from P to Q (pixels/frame), the image quality score higher than the threshold value T was obtained in regions A shown in FIG. 20. In regions B other than the regions A, the image quality score was lower than the threshold value T.

In the regions A in which the image quality score was higher than the threshold value T, the moving speed v of the subject is within the range from a to b, c to d, or greater than e. When the moving speed is within one of those ranges, high image quality can be obtained even when decimation is performed in the fixed SPP mode described earlier with reference to FIG. 15. That is, the super resolution effect is obtained in those regions. On the other hand, when the moving speed v per frame is within one of the ranges B, that is, the moving speed is not within any one of the ranges a to b, c to d, and greater than e, the image quality score is lower than the threshold value T. That is, in those regions B, the super resolution effect is not obtained or insufficient.

Based on the evaluation result described above, when the moving speed of a subject is within the regions B shown in FIG. 20, decimation is performed in the SPP shifting mode such that the moving speed of the subject is virtually accelerated or decelerated as shown in FIG. 16 or 17. As a result, the super resolution effect is obtained as described above with reference to FIG. 19, and thus as high image quality as that obtained in the regions A is obtained.

Figure 21:
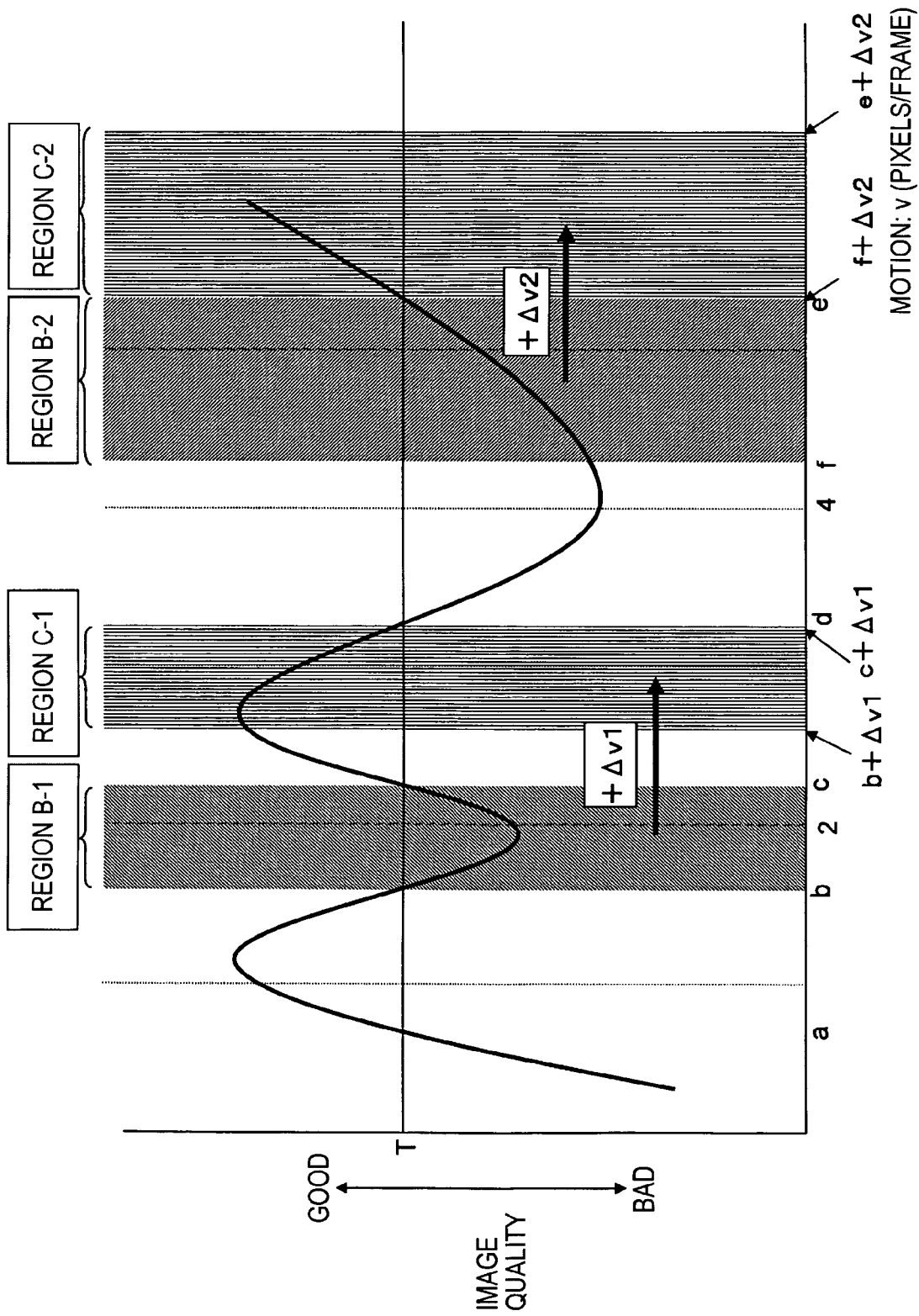
FIG. 21 is a graph showing a virtual change in the moving speed resulting from a decimation process in the sampling point position shifting mode performed by a block processing unit of a motion image data conversion apparatus.

Regions B-1 and B-2 shown in FIG. 21 are part of the regions B shown in FIG. 20. In these regions B-1 and B-2, the image quality score is less than the threshold value, because the moving speed v of a subject does not have a value at which a sufficient super resolution effect occurs. When a subject moves at a speed in the range B-1 or B-2, if the subject is virtually accelerated (by $+\Delta v1$ or $+\Delta v2$), that is, if decimation is performed while shifting the decimation position in a direction opposite to a direction in which the subject is actually moves (for example, when the subject is moving to the right, the sampling point position is shifted to the left as shown in FIG. 17), the region B-1 shown in FIG. 21 is effectively moved to a region C-1 shown in FIG. 21, and the region B-2 shown in FIG. 21 is effectively moved to a region C-2 shown in FIG. 21. As a result, the virtual moving speed per frame, v, of the subject falls within one of regions (C-1 and C-1 shown in FIG. 21) in which the image quality score can be equal to or greater than the threshold value T. That is, by performing decimation while shifting the sampling point position to the left as the frame advances as shown in FIG. 17, it is possible to perform image data conversion (compression) without causing significant degradation in image quality.

Figure 22:
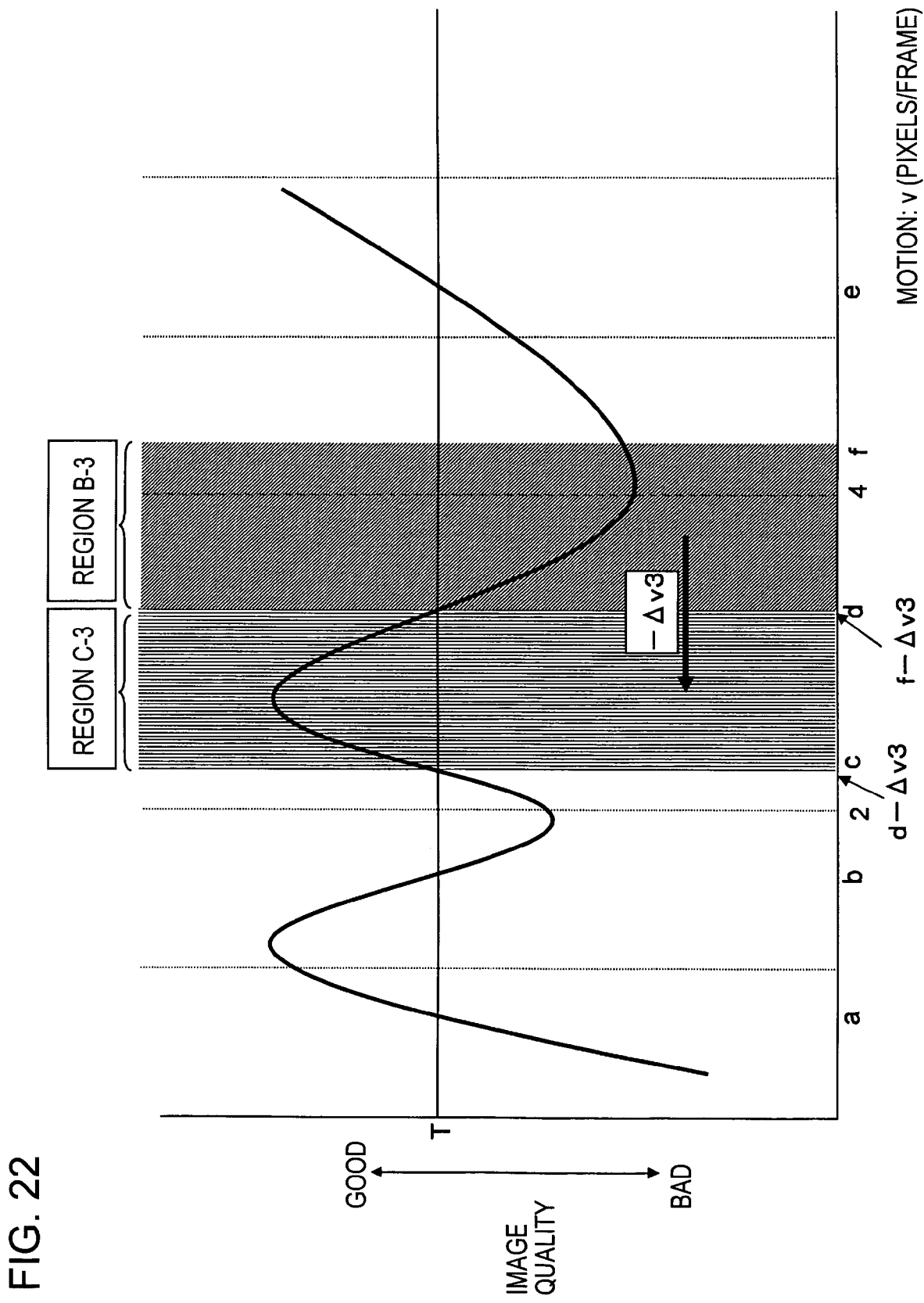
FIG. 22 is a graph showing a virtual change in the moving speed resulting from a decimation process in the sampling point position shifting mode performed by a block processing unit of a motion image data conversion apparatus.

Similarly, when a subject is moving at a speed in a range B-3 shown in FIG. 22, if the subject is virtually decelerated (by $-\Delta v3$), that is, if decimation is performed while shifting the decimation position in the same direction as a direction in which the subject is actually moves (for example, when the subject is moving to the right, the decimation process is performed as shown in FIG. 16), the region B-3 shown in FIG. 22 is effectively moved to a region C-3 shown in FIG. 22. As a result, the virtual moving speed per frame, v, of the subject falls within the region (C-3 shown in FIG. 22) in which the image quality score can be equal to or greater than the threshold value T. That is, by performing decimation while shifting the sampling point position to the right as the frame advances as shown in FIG. 16, it is possible to perform image data conversion (compression) without causing significant degradation in image quality.

In the motion image data conversion apparatus 100 shown in FIGS. 13 and 14 according to the present embodiment, the block processing unit 131 performs spatial pixel decimation by a factor of 4 only for blocks whose motion in the horizontal or vertical direction is equal to or greater than 2 pixels/frame, and thus blocks whose moving speed v is less than 2 pixels/frame in the graphs shown in FIGS. 20 to 22 are not subjected to the process by the block processing unit 131. However, as described earlier, the above-described criterion used by the block dividing unit 122 to determine which one of the block processing units 131 to 133 of the block processor 130 to supply the block to is merely one example, and the block distributor 122 may supply the block whose motion is less than 2 pixels/frame to the block processing unit 131 to perform spatial decimation in one of decimation modes described above with reference to FIGS. 15 to 17. Therefore, the moving speed v less than 2 pixels/frame is also included in the graphs shown in FIGS. 20 to 22.

Note that the image quality evaluation curves shown in FIGS. 20 to 22 are merely examples based on a subjective evaluation result, and the image quality may be evaluated in many ways other than that described above and the decimation mode may be determined in accordance with a result of such an evaluation.

In the block processing unit 131 shown in FIG. 14 responsible for processing block data with motion equal to or greater than 2 pixels/frame, the decimation mode determination unit 151 shown in FIG. 18 determines which one of modes described below should be used based on the amount of motion indicated by motion data received from the motion detector, and the decimation execution unit 152 shown in FIG. 18 executes decimation in the determined mode.

(a) Decimation is performed while fixing sampling point positions (FIG. 15).

(b) Decimation is performed while shifting the sampling point position to the right as the frame advances (FIG. 16).

(c) Decimation is performed while shifting the sampling point position to the left as the frame advances (FIG. 17).

Figure 18:
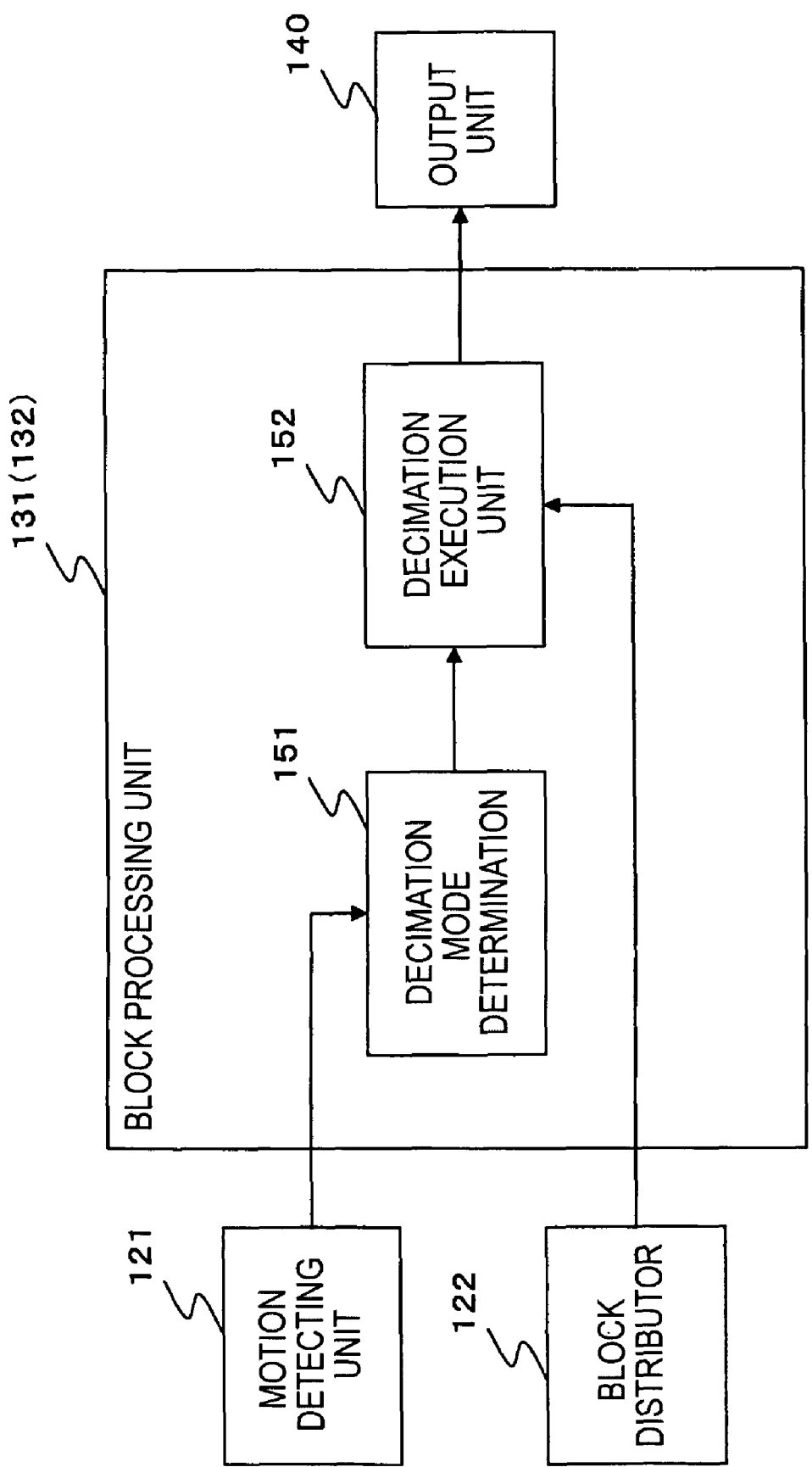
FIG. 18 is a diagram showing a detailed structure of a block processing unit of a motion image data conversion apparatus.

When the decimation mode determination unit 151 shown in FIG. 18 determines the decimation mode, for example, the image quality evaluation curves shown in FIGS. 20 to 22 are used. That is, when the moving speed is in a region in which an image quality score equal to or greater than the threshold value T is obtained judging from the image quality curve, the mode (a) in which decimation is performed while fixing the sampling point position (FIG. 15) is used. When the moving speed is in a region in which the image quality score estimated from the image quality curve is less than the threshold value T, decimation is performed in the mode (b) in which decimation is performed while shifting the sampling point position to the right as the frame advances (FIG. 16) or the mode (c) in which decimation is performed while shifting the sampling point position to the left as the frame advances (FIG. 17) such that the amount of virtual motion falls within a range in which the image quality estimated based on the image quality curve is equal to or greater than the threshold value T.

FIG. 23 is a table showing an example of a manner in which the decimation mode determination unit 151 shown in FIG. 18 determines the decimation mode in accordance with the amount of motion indicated by motion data supplied from the motion detector. In the example shown in FIG. 23, the decimation mode is determined based on the image quality evaluation curves shown in FIGS. 20 to 22.

In rows (a) and (b) in the table shown in FIG. 23, described is a manner of decimation performed when a subject is moving to the right and when the moving speed v is in a range (a) 2 pixels/frame≦v<c pixels/frame or (b) f pixels/frame≦v<c pixels/frame. In this case, decimation is performed while shifting the sampling point position to the left as the frame advances (FIG. 17) to virtually accelerate the moving speed. This process corresponds to the above-described process which causes the region B-1 shown in FIG. 21 to move into the region C-1 or the region B-2 to C-2.

In rows (c) and (d) in the table shown in FIG. 23, described is a manner of decimation performed when a subject is moving to the left and when the moving speed v is in a range (c) 2 pixels/frame≦v<c pixels/frame or (d) f pixels/frame≦v<c pixels/frame.

In this case, decimation is performed while shifting the sampling point position to the right as the frame advances (FIG. 16) to virtually accelerate the moving speed. This process corresponds to the above-described process which causes the region B-1 shown in FIG. 21 to move into the region C-1 or the region B-2 to C-2.

In a row (e) in the table shown in FIG. 23, described is a manner of decimation performed when a subject is moving to the right and when the moving speed v is in a range d pixels/frame≦v<f pixels/frame.

In this case, decimation is performed while shifting the sampling point position to the right as the frame advances (FIG. 16) to virtually decelerate the moving speed. This process corresponds to the above-described process which causes the region B-3 shown in FIG. 22 to move into the region C-3.

In a row (f) in the table shown in FIG. 23, described is a manner of decimation performed when a subject is moving to the left and when the moving speed v is in a range d pixels/frame≦v<f pixels/frame.

In this case, decimation is performed while shifting the sampling point position to the left as the frame advances (FIG. 17) to virtually decelerate the moving speed. This process corresponds to the above-described process which causes the region B-3 shown in FIG. 22 to move into the region C-3.

In a row (g) in the table shown in FIG. 23, described is a manner of decimation performed when a subject is moving to the right or left and when the moving speed v has a value other than those described above, that is, the moving speed v is in a range c pixels/frame≦v<d pixels/frame or e pixels/frame≦v.

In this case, rather than in the mode in which sampling point position is shifted as the frame advances, decimation is performed in the mode in which the sampling point position is fixed (FIG. 15). This process corresponds to the above-described process performed on the block including the subject moving at a speed in the range corresponding to the region A shown in FIG. 20.

In the example described above, the process is performed on blocks with motion in a horizontal direction. For blocks with motion in a vertical direction, the process can be performed in a similar manner. That is, in the block processing unit 131 shown in FIG. 14, the decimation mode determination unit 151 shown in FIG. 18 determines which one of modes described below should be used based on the amount of motion indicated by motion data received from the motion detector, and the decimation execution unit 152 shown in FIG. 18 executes decimation in the determined mode.

(a) Decimation is performed while fixing sampling point positions (FIG. 24B).

Figure 25:
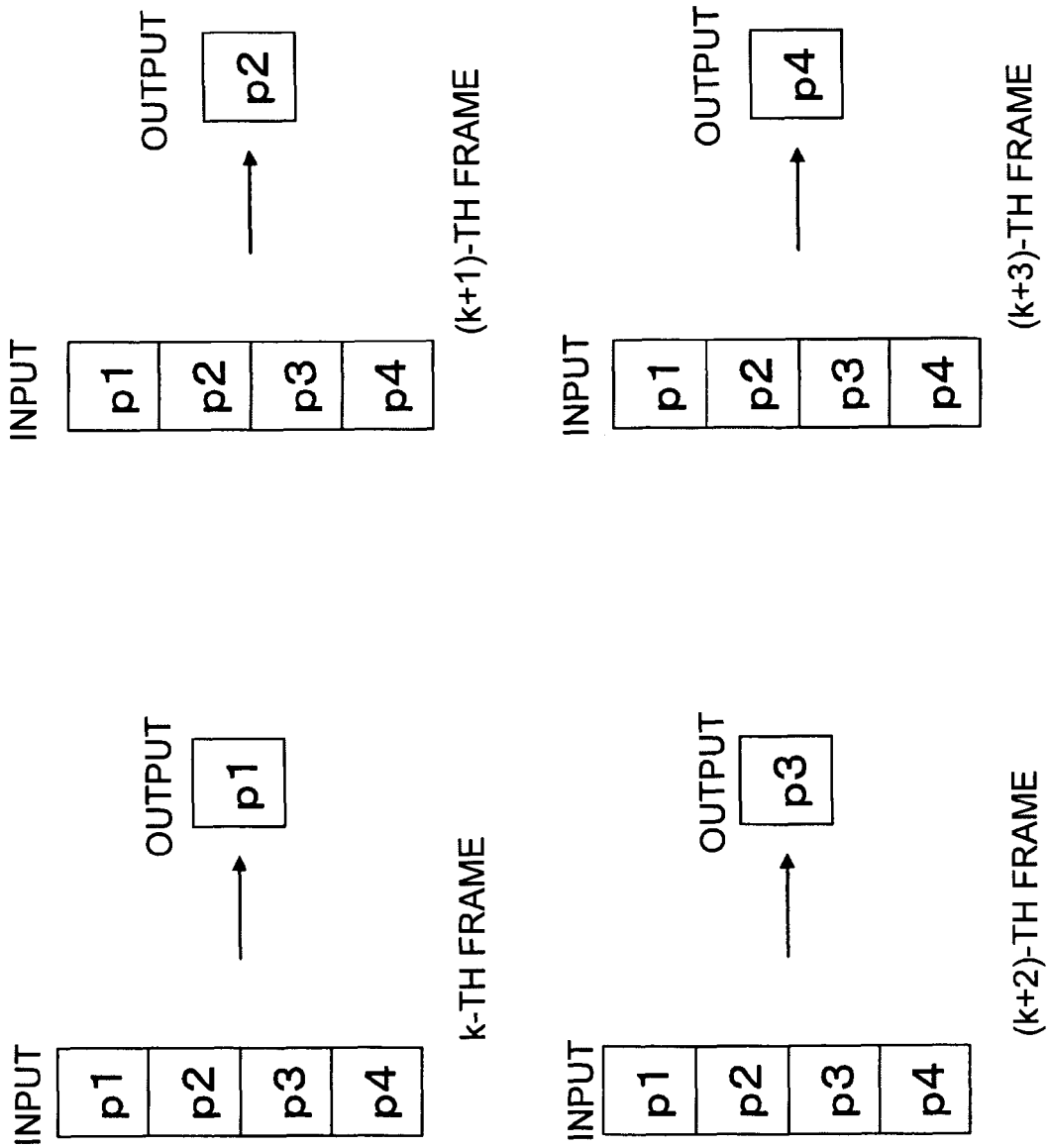
FIG. 25 is a diagram showing a process performed by a block processing unit of a motion image data conversion apparatus.

(b) Decimation is performed while shifting the sampling point position downward as the frame advances (FIG. 25).

Figure 26:
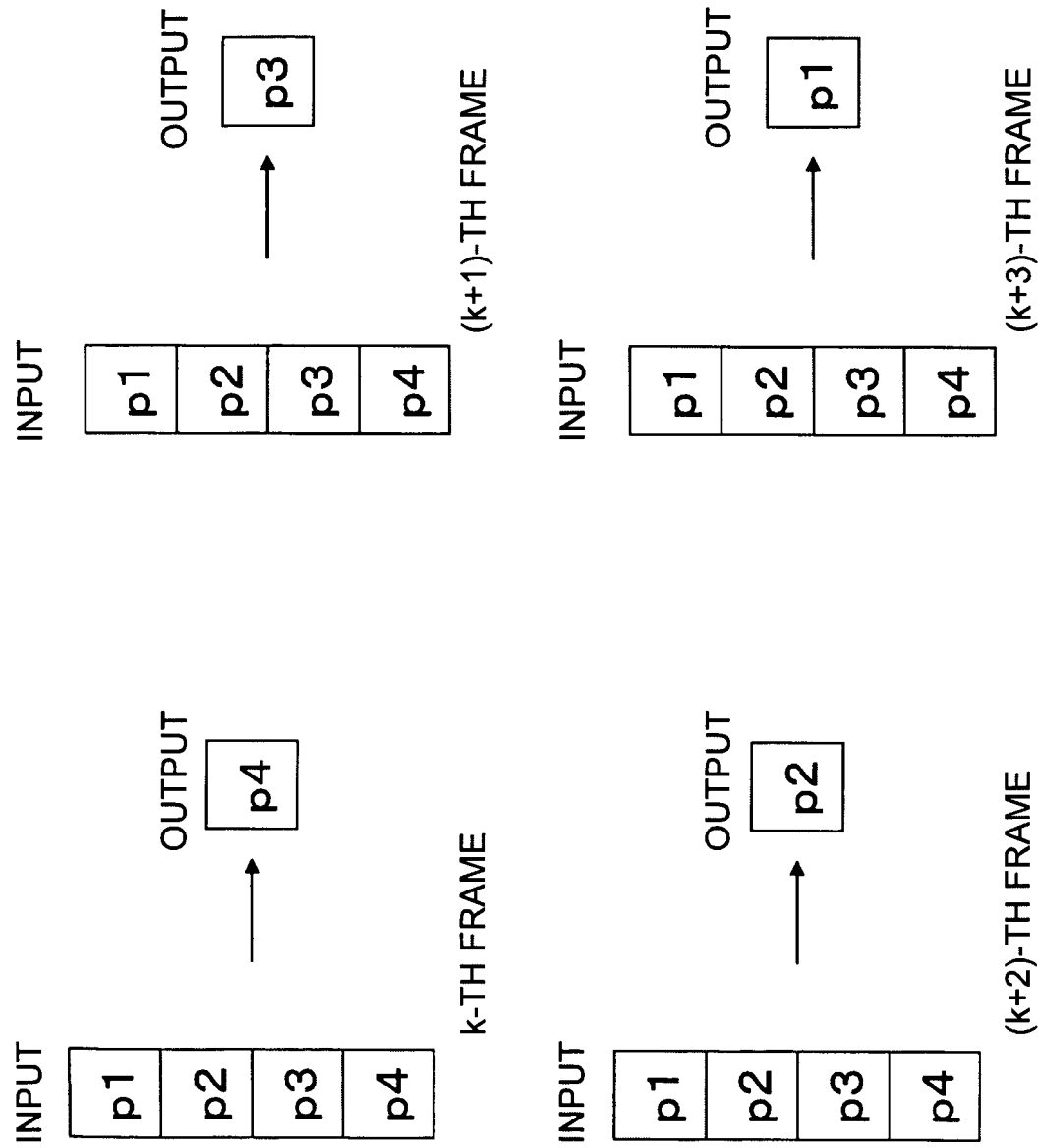
FIG. 26 is a diagram showing a process performed by a block processing unit of a motion image data conversion apparatus.

(c) Decimation is performed while shifting the sampling point position upward as the frame advances (FIG. 26).

More specifically, in the case in which each block includes 8×8 pixels, when the amount of motion in the vertical direction is equal to or greater than 2 pixels/frame, the block processing unit 131 divides each block into pixel sets each including 1×4 pixels as shown in FIG. 24A. The block processing unit 131 decimates pixel values p1 to p4 of each 1×4 pixel set into one pixel value equal to one of the pixel values p1 to p4 (that is, four pixels are decimated into one pixel, in other words, pixels are decimated by a factor of 4) in one of modes shown in FIGS. 24B, 25, and 26.

When the decimation mode determination unit 151 shown in FIG. 18 determines the decimation mode, the determination can be made based on image quality evaluation curves which are similar to those shown in FIGS. 20 to 22 except that the amount of motion in the vertical direction is plotted along the horizontal axis. That is, when the moving speed is in a region in which an image quality score equal to or greater than the threshold value T is obtained judging from the image quality curve, the mode (a) in which decimation is performed while fixing the sampling point position (FIG. 24) is used. When the moving speed is in a region in which the image quality score estimated from the image quality curve is less than the threshold value T, decimation is performed in the mode (b) in which decimation is performed while shifting the sampling point position downward as the frame advances (FIG. 25) or the mode (c) in which decimation is performed while shifting the sampling point position upward as the frame advances (FIG. 26) such that the amount of virtual motion falls within a range in which the image quality estimated based on the image quality curve is equal to or greater than the threshold value T.

FIG. 27A is a table summarizing processing modes that are selected based on image quality evaluation curves similar to those shown in FIGS. 20 to 22 depending on the moving speed v per frame of a subject. FIG. 27B is a table showing the details of the respective modes 1 to 3 shown in FIG. 27A.

The processing modes shown in FIG. 27A are described below.

When 2≦v<c, decimation is performed in the processing mode 3 in which decimation position is shifted in a direction opposite to a direction in which a subject is moving.

When c≦v<d, decimation is performed in the processing mode 1 in which decimation position is not shifted.

When d≦v<f, decimation is performed in the processing mode 2 in which decimation position is shifted in the same direction as a direction in which a subject is moving.

When f≦v<e, decimation is performed in the processing mode 3 in which decimation position is shifted in a direction opposite to a direction in which a subject is moving.

When e≦v, decimation is performed in the processing mode 1 in which decimation position is not shifted.

By switching the decimation mode depending on the moving speed v per frame of a subject included in a block in the above-described manner, it is possible to virtually change the moving speed of the subject such that the virtual moving speed falls within the range A shown in FIG. 20, thereby achieving image data conversion so that image quality score equal to or higher than the threshold value T is guaranteed.

The block processing unit 131 performs decimation in one of modes depending on the moving speed v per frame of a subject included in a block as described above, and outputs resultant data to the output unit 140 (FIGS. 13 and 14). In a case in which spatial decimation is performed by a factor of 4, the block processing unit 131 performs the spatial decimation on each of four supplied blocks (each set of adjacent four pixels is decimated into one pixel), and thus the data size of each block is reduced to ¼ of the original data size, and the total data size of four blocks is also reduced to ¼ of the original total data size. The resultant data of four blocks whose data size was reduced to ¼ of the original data size is supplied from the block processing unit 131 to the output unit 14.

Although in the above-described example of the decimation process performed by the block processing unit 131, the decimation factor m=4 and the number of frames N=4, the parameters are not limited to these values. Note that the image quality evaluation curves 205 indicating the image quality as a function of the moving speed of a subject shown in FIGS. 20 to 22 are for the decimation factor m=4, and the image quality evaluation curve varies depending on the values of parameters. Thus, it is necessary to determine an image quality evaluation curve for the parameter values employed, and determine the decimation mode depending on the determined image quality evaluation curve.

In the example of the decimation process in the fixed SPP mode described above with reference to FIG. 15, the pixel value p1 at the leftmost position of each set of 1×4 pixels in a horizontal line is selected. In the example of the decimation process in the fixed SPP mode described above with reference to FIG. 24, the pixel value p1 at the top of each set of 4×1 pixels in a vertical line is selected. However, the pixel positions are not limited to those employed in the above example, but a pixel value at another position may be selected. In the example of the decimation process in the mode in which the sample point position is shifted, described earlier with reference to FIGS. 16 and 17, the pixel sample position is shifted to the right or left starting from a pixel at the leftmost or rightmost position of a set of 1×4 pixels, shifting may be started from another position. This also applies to the decimation process in which the sample point position is shifted in the vertical direction, described above with reference to FIGS. 25 and 26.

Figure 28:
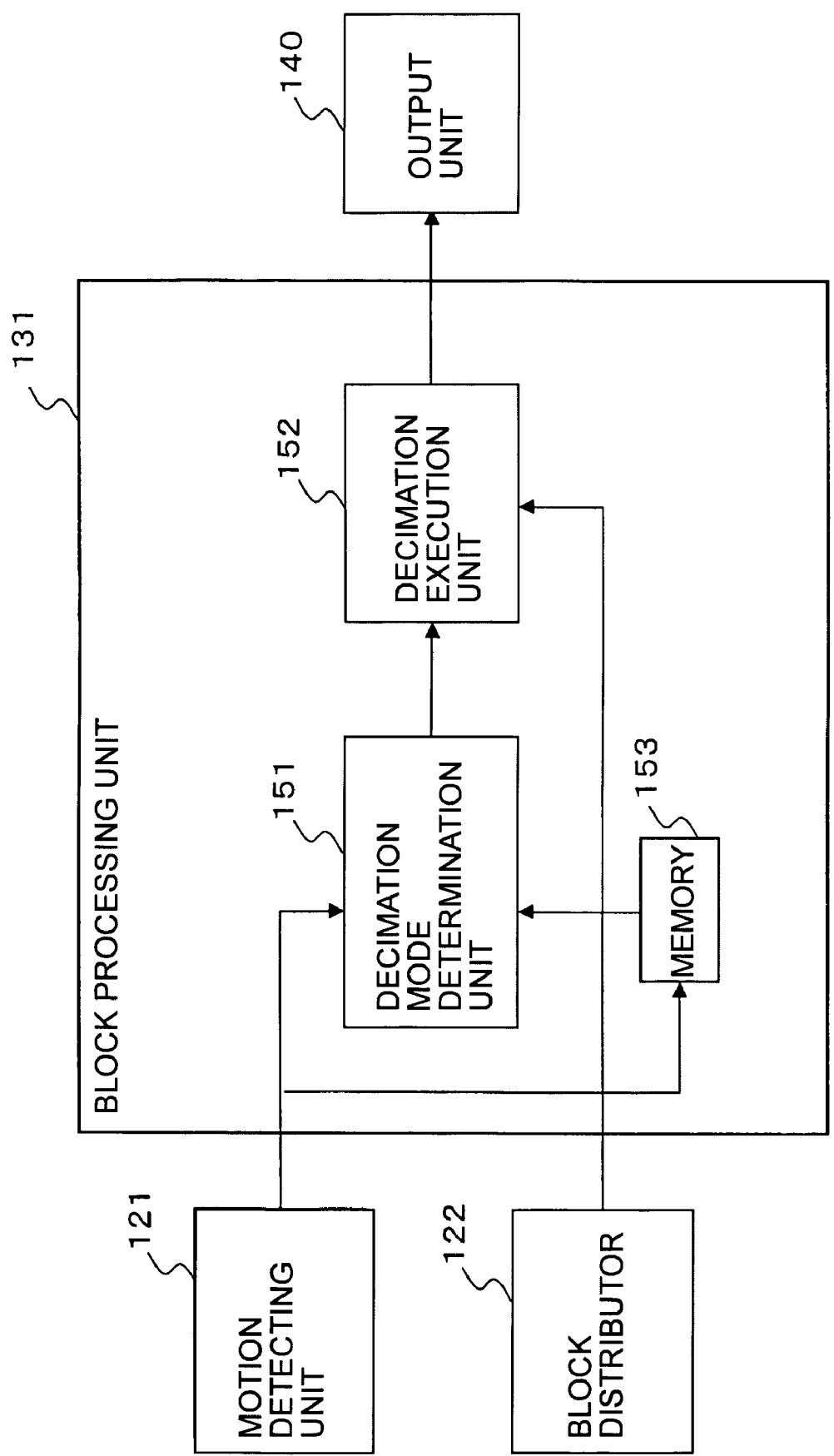
FIG. 28 is a diagram showing a structure of a block processing unit of a motion image data conversion apparatus, the block processing unit including a memory.

In the examples described above, the threshold value T is predetermined as a criterion for evaluation of the image quality. Depending on whether the image quality score is higher than the threshold value T, a determination is made as to whether to perform spatial decimation in the fixed SPP mode or in the SPP shifting mode, and as to how to shift the decimation position when the decimation is performed in the SPP shifting mode. Alternatively, the structure of the block processing unit 131 shown in FIG. 18 may be modified as shown in FIG. 28, the limits of the allowable ranges of the moving speed may have margins of $\Delta v1$ to $\Delta v9$, and the mode of the spatial decimation may be determined depending on which range with margins the moving speed falls in, as shown in FIG. 29. If the mode of the spatial decimation performed on a block is switched very frequently with passage of time, degradation in image quality can occur. Such degradation in image quality can be avoided by using the structure shown in FIG. 28 and introducing margins ($\Delta v1$ to $\Delta v9$) in the range of allowable moving speed. The flow of determining the spatial decimation mode in the structure shown in FIG. 28 is described below.

In the structure shown in FIG. 28, a memory 153 is additionally disposed between the motion detecting unit 121 and the decimation mode determination unit 151 in the structure shown in FIG. 18. Use of the memory 153 makes it possible for the decimation mode determination unit 151 to determine the decimation mode based on not only the moving speed v of a current frame but also the moving speed p of a previous frame. The manner in which the decimation mode determination unit 151 determines the decimation mode is described below with reference to FIG. 29.

First, the decimation mode determination unit 151 examines the moving speed p of a block of an immediately previous frame received from the memory 153.

In a case in which the moving speed p is in the range $2 \leq p < c$, if the moving speed v of a current frame received from the motion detecting unit 121 is within the range $2-\Delta v1 \leq v < c+\Delta v2$, then the decimation mode determination unit 151 selects a process 3 (a mode in which the decimation position is shifted in a direction opposite to a direction in which a subject is moving) as shown in FIG. 29. When the moving speed p is not within the range described above, the process mode to be used is determined according to the criterion shown in FIG. 27.

In a case in which the moving speed p is in the range $c \leq p < d$, if the moving speed v of the current frame received from the motion detecting unit 121 is within the range $c-\Delta v3 \leq v < d+\Delta v4$, then the decimation mode determination unit 151 selects a process 1 (a mode in which the decimation position is not shifted) as shown in FIG. 29. When the moving speed p is not within the range described above, the process mode to be used is determined according to the criterion shown in FIG. 27.

In a case in which the moving speed p is in the range $d \leq p < f$, if the moving speed v of the current frame received from the motion detecting unit 121 is within the range $d-\Delta v5 \leq v < f+\Delta v6$, then the decimation mode determination unit 151 selects a process 2 (a mode in which the decimation position is shifted in the same direction as the direction in which the subject is moving) as shown in FIG. 29. When the moving speed p is not within the range described above, the process mode to be used is determined according to the criterion shown in FIG. 27.

In a case in which the moving speed p is in the range $f \leq p < e$, if the moving speed v of the current frame received from the motion detecting unit 121 is within the range $f-\Delta v7 \leq v < e+\Delta v8$, then the decimation mode determination unit 151 selects the process 3 (the mode in which the decimation position is shifted in a direction opposite to the direction in which the subject is moving) as shown in FIG. 29. When the moving speed p is not within the range described above, the process mode to be used is determined according to the criterion shown in FIG. 27.

In a case in which the moving speed p is in the range $e \leq p$, if the moving speed v of the current frame received from the motion detecting unit 121 is within the range $e-\Delta v9 \leq v$, then the decimation mode determination unit 151 selects the process 1 (the mode in which the decimation position is not shifted) as shown in FIG. 29. When the moving speed p is not within the range described above, the process mode to be used is determined according to the criterion shown in FIG. 27.

As described above, when the decimation mode determination unit 151 determines the decimation method, if the moving speed of the current frame is within a range wider by margins than a strict range corresponding to a decimation mode applied to the previous frame, the decimation mode determination unit 151 determines that the current frame should be decimated in the same decimation mode as that applied to the previous frame. This prevents the decimation method from being switched very frequently with passage of time.

Figure 30:
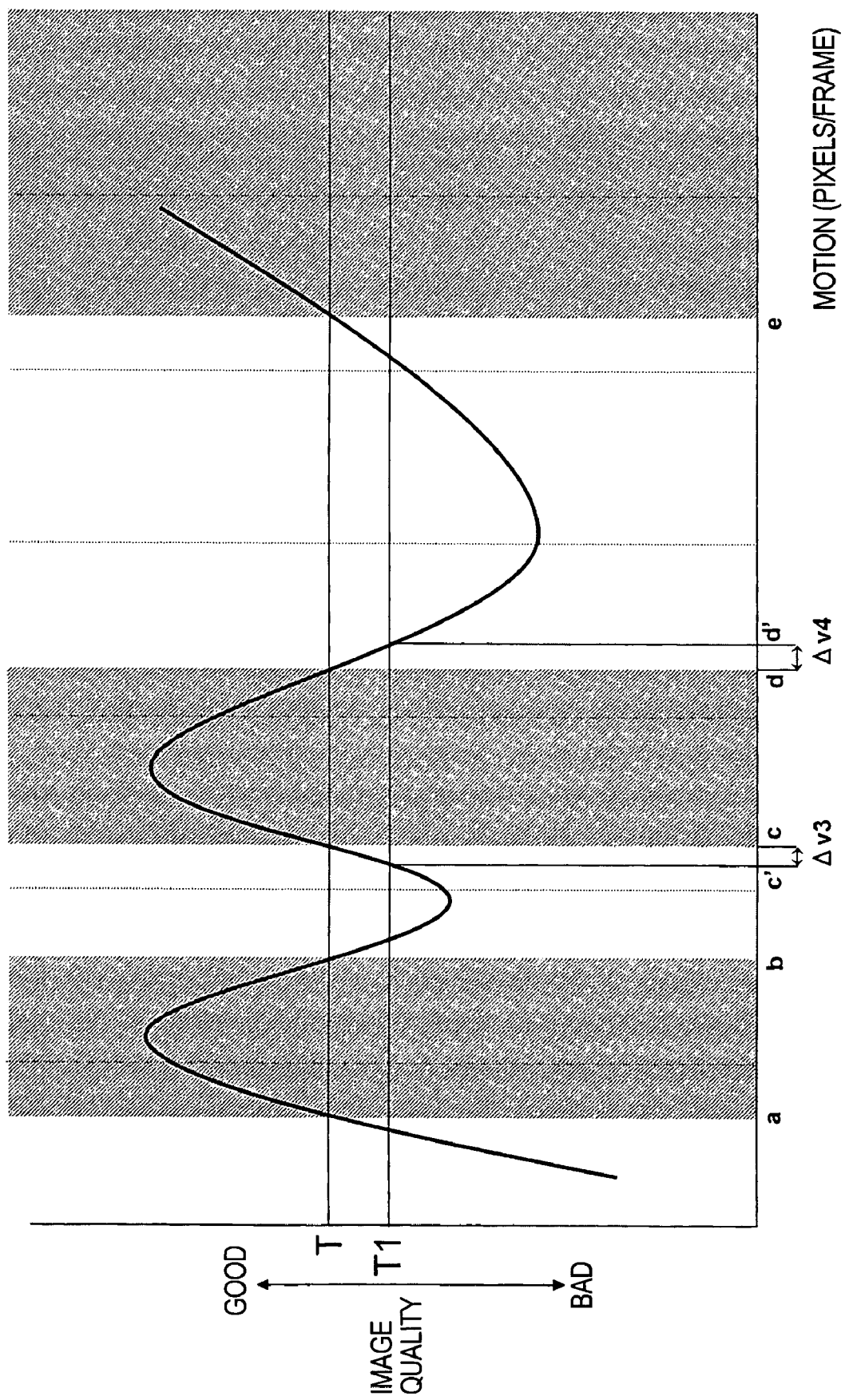
FIG. 30 is a graph showing a manner in which margins of limits of allowable ranges of the moving speed are defined by introducing another threshold value of the image quality score in addition to a standard threshold value.

The margins $\Delta v1$ to $\Delta v9$ of the limits of the ranges of the moving speed may be determined in many ways. For example, as shown in FIG. 30, a new threshold value T1 lower than the threshold value T may be introduced, and margins may be defined by differences between new ranges determined by the threshold value T1 and the corresponding ranges determined by the threshold value T. For example, a margin $\Delta v3$ shown in FIG. 30 is given by the absolute value of the difference between the lower limit c of a range determined by the threshold value T and the lower limit c' of a corresponding range determined by the threshold value T1. A margin $\Delta v4$ for the upper limit of the same range is given by the absolute value of the difference between the upper limit d of the range determined by the threshold value T and the upper limit d' of the corresponding range determined by the threshold value T1.

Referring to FIG. 28, the structure of the block processing unit 131 and the process performed by the block processing unit 131 are described below. The memory 153 stores the result of the decimation mode determined by the decimation mode determination unit 151 for a previous frame. The decimation mode determination unit 151 determines the decimation mode in accordance with data indicating the correspondence between the moving speed of a subject and the image quality of data generated as a result of the decimation process performed in the mode in which the sample point position is not shifted, and in accordance with the decimation mode used in a previous frame.

More specifically, in a case in which the decimation process for a previous frame was performed in the fixed SPP mode and the moving speed of a subject detected by the motion detecting unit 121 corresponds to an image quality score equal to or higher than a predetermined threshold value T1, the decimation mode determination unit 151 determines that the decimation process should be performed in the fixed SPP mode. In a case in which the decimation process for a previous frame was performed in the fixed SPP mode and the moving speed of a subject detected by the motion detecting unit 121 corresponds to an image quality score less than the predetermined threshold value T1, the decimation mode determination unit 151 determines that the decimation process should be performed in the SPP shifting mode. In a case in which the decimation process for a previous frame was performed in the SPP shifting mode and the moving speed of a subject detected by the motion detecting unit 121 corresponds to an image quality score less than a predetermined threshold value T2, the decimation mode determination unit 151 determines that the decimation process should be performed in the SPP shifting mode. In a case in which the decimation process for a previous frame was performed in the SPP shifting mode and the moving speed of a subject detected by the motion detecting unit 121 corresponds to an image quality score equal to or higher than the predetermined threshold value T2, the decimation mode determination unit 151 determines that the decimation process should be performed in the fixed SPP mode.

The memory 153 also stores data indicating the mode in which the sampling point position was shifted or fixed in the spatial decimation performed on the previous frame by the block processing unit 131. The block processing unit 131 performs spatial decimation such that when the virtual moving speed of a subject obtained as a result of spatial decimation performed on the previous frame depending on the mode in which the sampling point position was shifted or fixed is evaluated based on data indicating the correspondence between the moving speed of a subject and the image quality score for data obtained as a result of decimation in the fixed SPP mode, if an image quality score corresponding to the virtual moving speed of the subject is equal to or higher than a predetermined threshold value T3, then the spatial decimation is performed in the same mode as the mode used in the spatial decimation performed on the previous frame, but when the virtual moving speed of the subject obtained as the result of spatial decimation performed on the previous frame depending on the mode in which the sampling point position was shifted or fixed is evaluated based on data indicating the correspondence between the moving speed of a subject and the image quality score for data obtained as a result of decimation in the fixed SPP mode, if the image quality score corresponding to the virtual moving speed of the subject is lower than the predetermined threshold value T3, then the spatial decimation is performed in a mode selected such that the virtual speed of the subject obtained as a result of the decimation falls within a range of the moving speed in which the image quality score evaluated based on the data indicating the correspondence between the moving speed of a subject and the image quality score for data obtained as a result of decimation in the fixed SPP mode is equal to or higher than a predetermined threshold value T4.

Before the operation of the block processing unit 132 is described, the operation of the block processing unit 133 is described below.

The block processing unit 133 performs frame decimation (temporal decimation) when the amount of motion of N blocks located at the same position of respective N successive frames supplied from the block distributor 122 of the motion detector 120 is less than 1 pixel in both horizontal and vertical directions.

Figure 31:
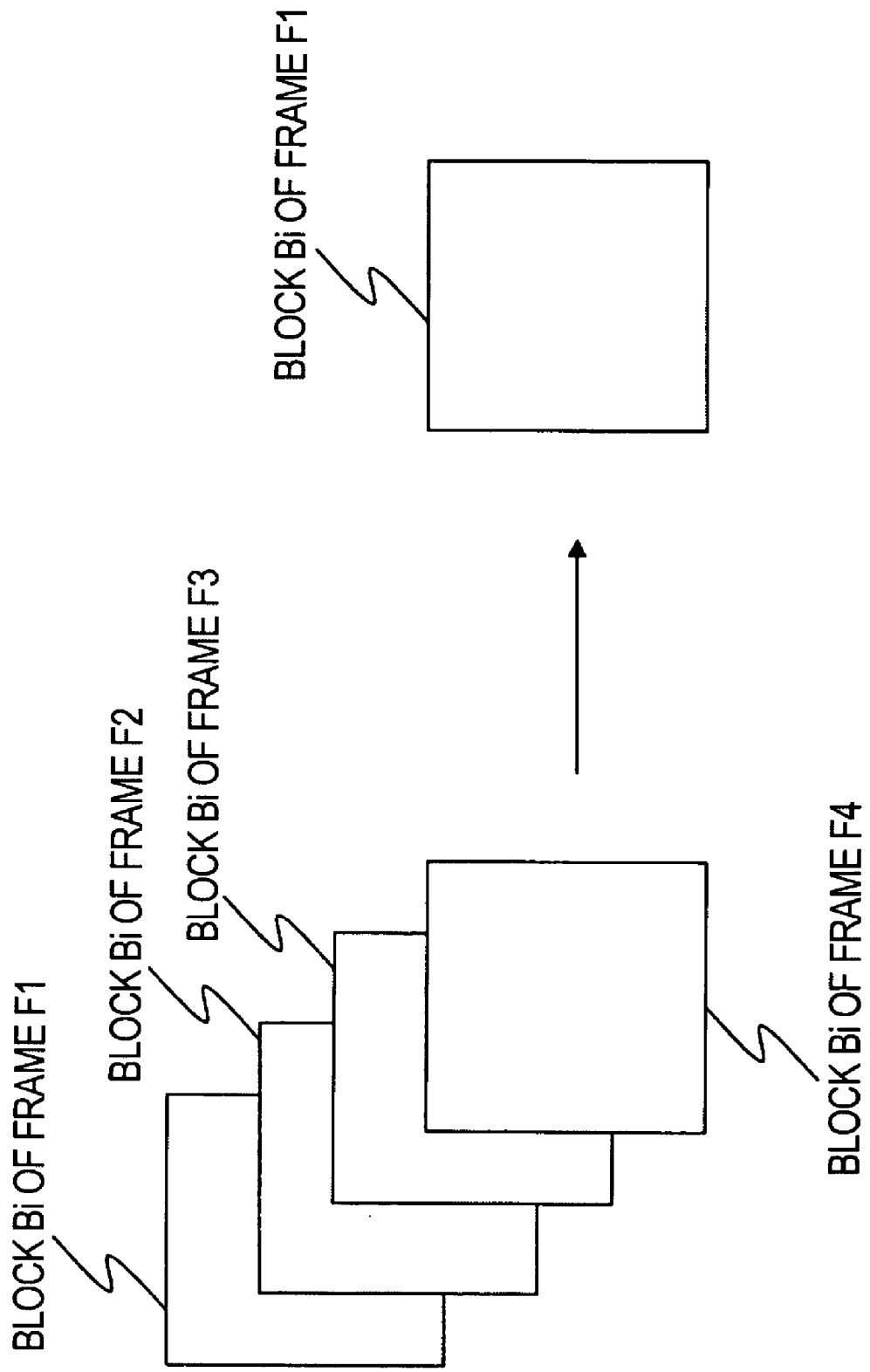
FIG. 31 is a diagram showing a process performed by a block processing unit of a motion image data conversion apparatus.

More specifically, as shown in FIG. 31, the block processing unit 133 performs decimation such that four blocks Bi at the same position of respective four successive frames F1 to F4 are decimated into one block (block Bi of frame F1 in the example shown in FIG. 9) identical to one of these four blocks.

The resultant data of the four blocks whose total data size was reduced to ¼ of the original total data size via the temporal decimation is supplied from the block processing unit 133 to the output unit 140 (that is, the data of one block is supplied to the output unit 140). Although in the present example N=4, the value of N is not limited to 4 but N may have another value.

Furthermore, although in the present example, the block Bi of the frame F1 is selected from blocks Bi of four frames F1 to F4 and the selected block Bi of the frame F1 is output as the surviving block, a block of another frame may be selected. Yet alternatively, a block may be calculated from four frames F1 and F4, and the resultant block may be output.

Now, the operation of the block processing unit 132 is described below. The block processing unit 132 performs pixel decimation (spatial decimation) and frame decimation (temporal decimation) when the amount of motion of N blocks located at the same position of respective N successive frames supplied from the block distributor 122 of the motion detector 120 is equal to or greater than 1 pixel but less than 2 pixels in both horizontal and vertical directions.

The moving speed (v=1 to 2) per frame of blocks supplied to the block processing unit 132 satisfies equations (1) and (2), that is, the moving speed satisfies the condition necessary to obtain the super resolution effect. However, if decimation is performed in the fixed SPP mode in a similar manner as described earlier with reference to FIGS. 1 and 12, there is a possibility that perceptible degradation in image quality occurs.

To avoid the above problem, the block processing unit 132 performs spatial decimation by a factor of 2 (m=2) rather than a factor of 4 (m=4). In the decimation process, as with the block processing unit 131, the block processing unit 132 selects the fixed SPP mode or the SPP shifting mode depending on the moving speed of a subject.

The decimation process by a factor of 2 (m=2) in the fixed SPP mode and that in the SPP shifting mode are described in detail below with reference to FIGS. 32 to 37.

Figure 32:
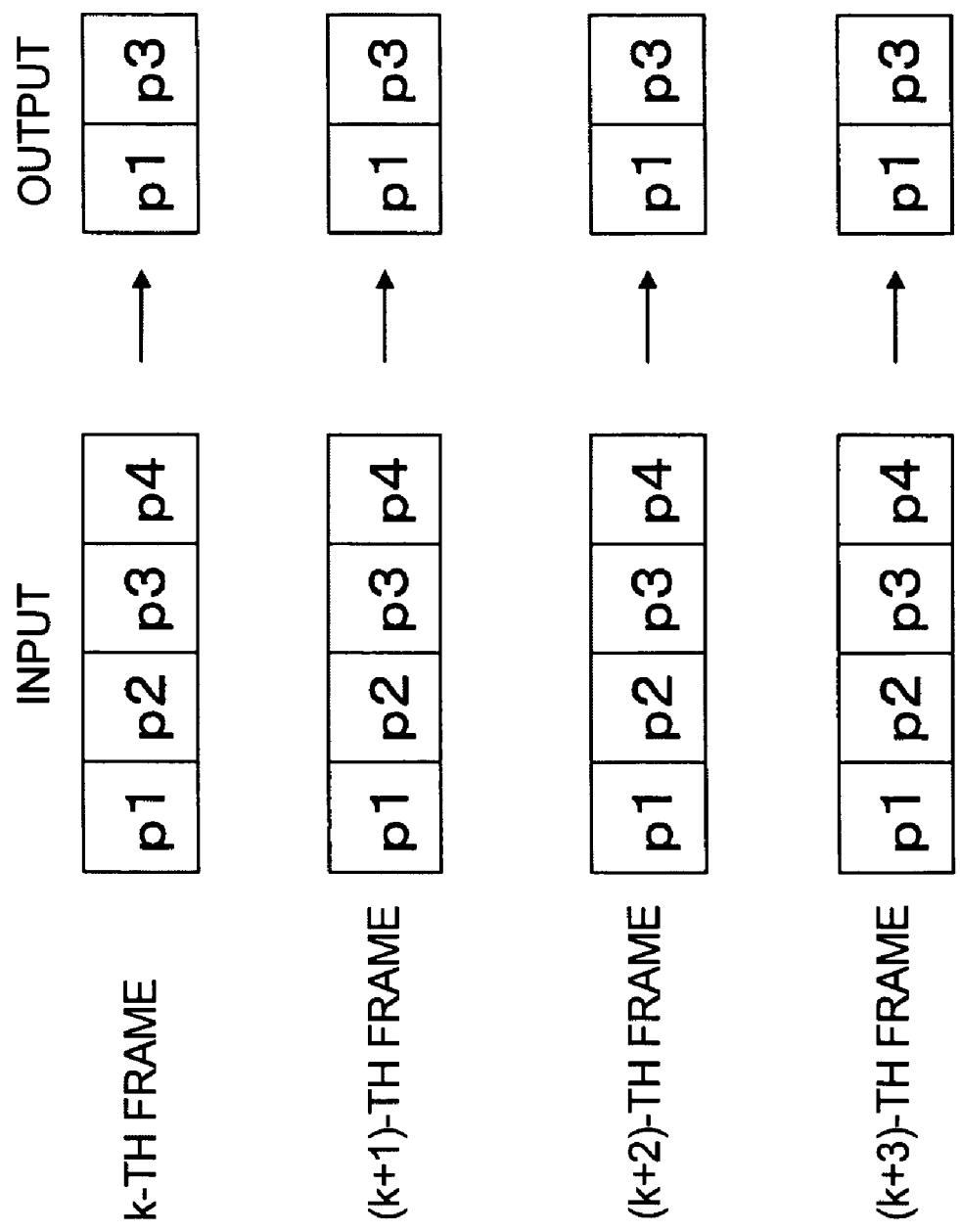
FIG. 32 is a diagram showing a process performed by a block processing unit of a motion image data conversion apparatus.
Figure 33:
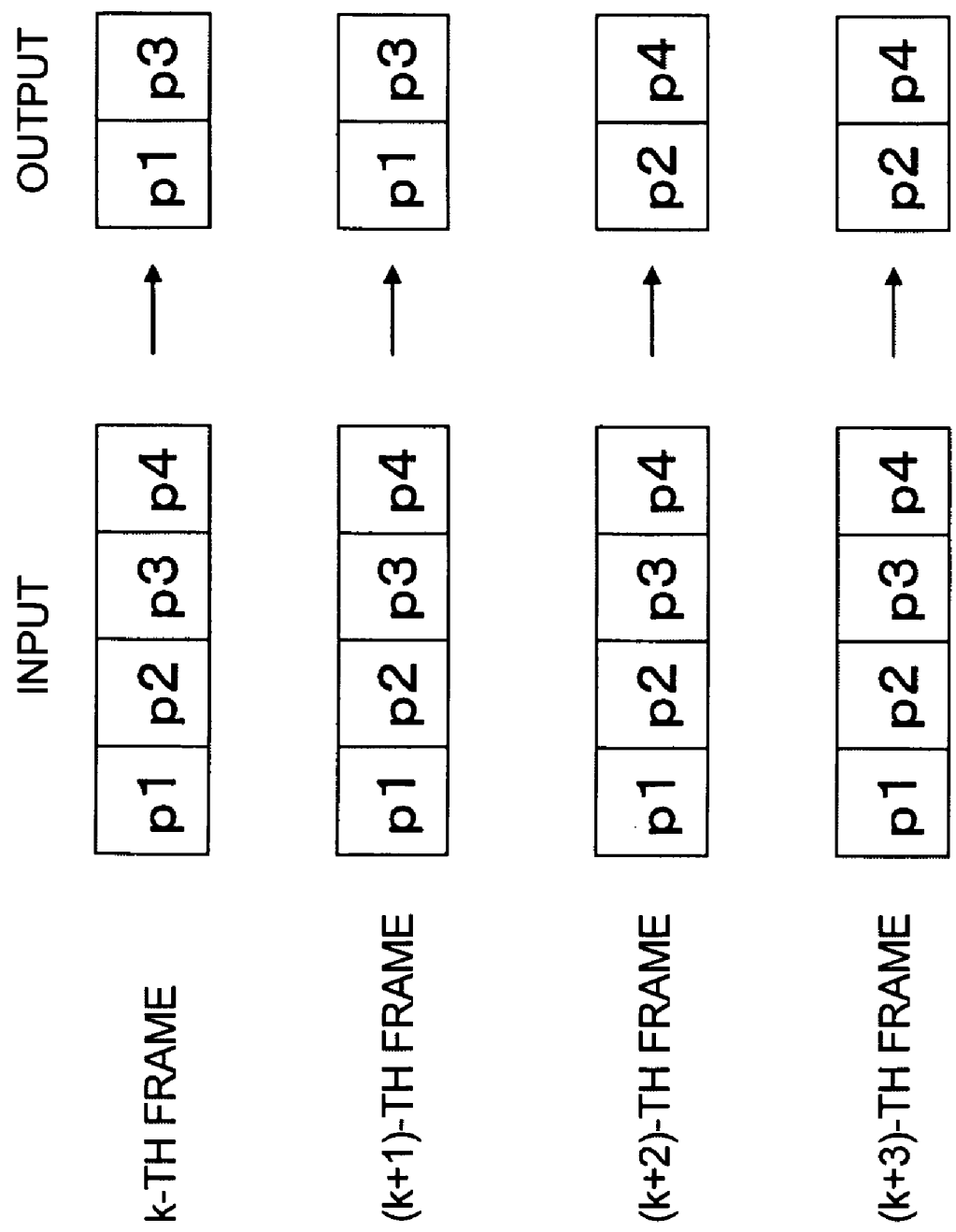
FIG. 33 is a diagram showing a process performed by a block processing unit of a motion image data conversion apparatus.
Figure 34:
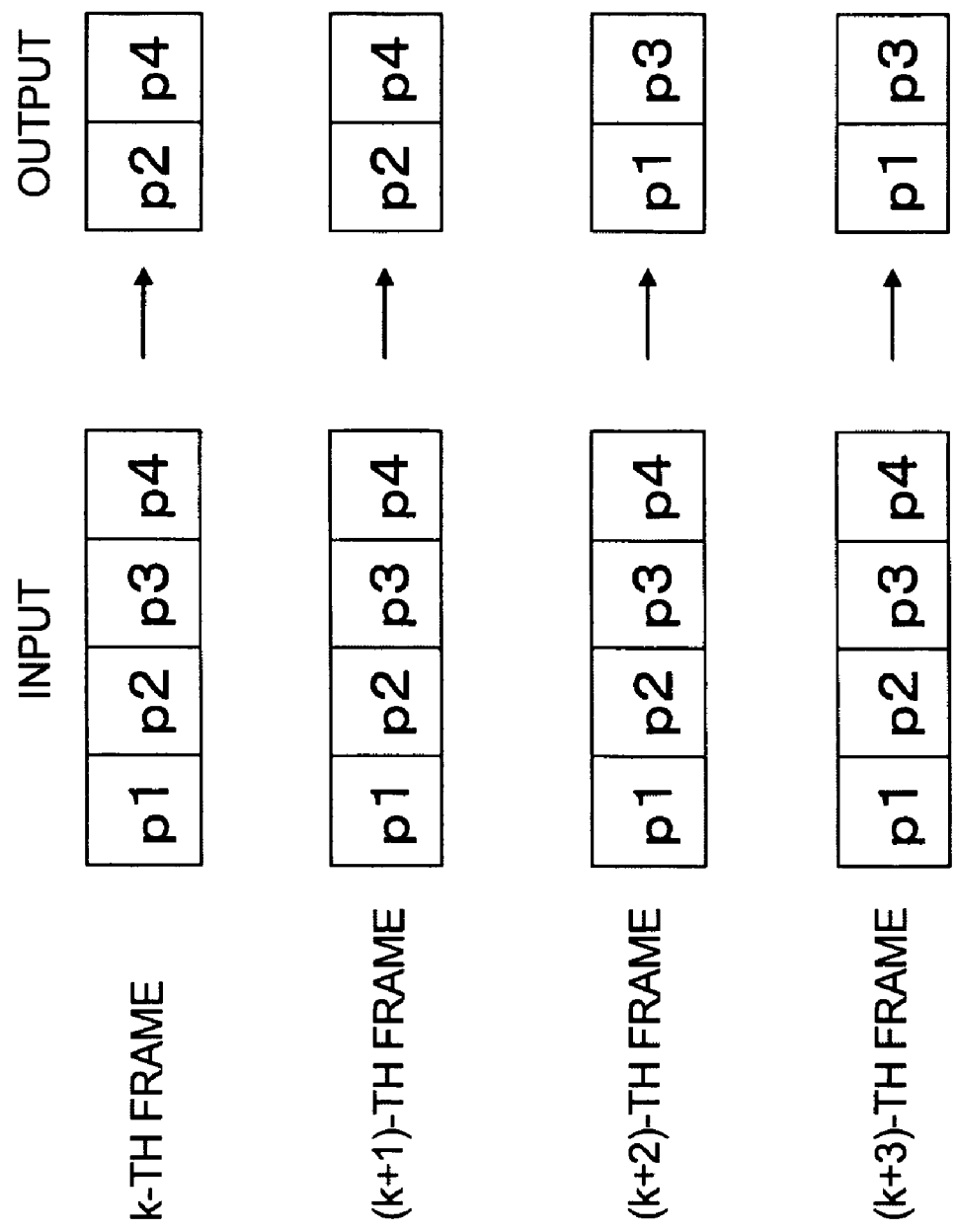
FIG. 34 is a diagram showing a process performed by a block processing unit of a motion image data conversion apparatus.

FIGS. 32 to 34 show examples of decimation processes performed by the block processing unit 132 when the moving speed v in the horizontal direction is 1 to 2 pixels/frame.

In the example shown in FIG. 32, decimation is performed in the fixed SPP mode such that pixel values p1 to p4 of respective frames (k-th to (k+3)-th frames) are decimated into two pixel values equal to two pixel values (p1 and p3 in this specific example) selected from pixel values p1 to p4. In other words, two pixels are decimated into one pixel (that is, the decimation factor m=2).

In the example shown in FIG. 33, decimation is performed in the SPP shifting mode such that pixel values p1 to p4 of first two frames (k-th and (k+1)-th frames) are decimated into pixel values p1 and p3, and pixel values p1 to p4 of the following two frames ((k+2)-th and (k+3)-th frames) are decimated into pixel values p2 and p4. In the example shown in FIG. 34, decimation is also performed in the SPP shifting mode, but the decimation is performed such that pixel values p1 to p4 of first two frames (k-th and (k+1)-th frames) are decimated into pixel values p2 and p4, and pixel values p1 to p4 of the following two frames ((k+2)-th and (k+3)-th frames) are decimated into pixel values p1 and p3.

Figure 35:
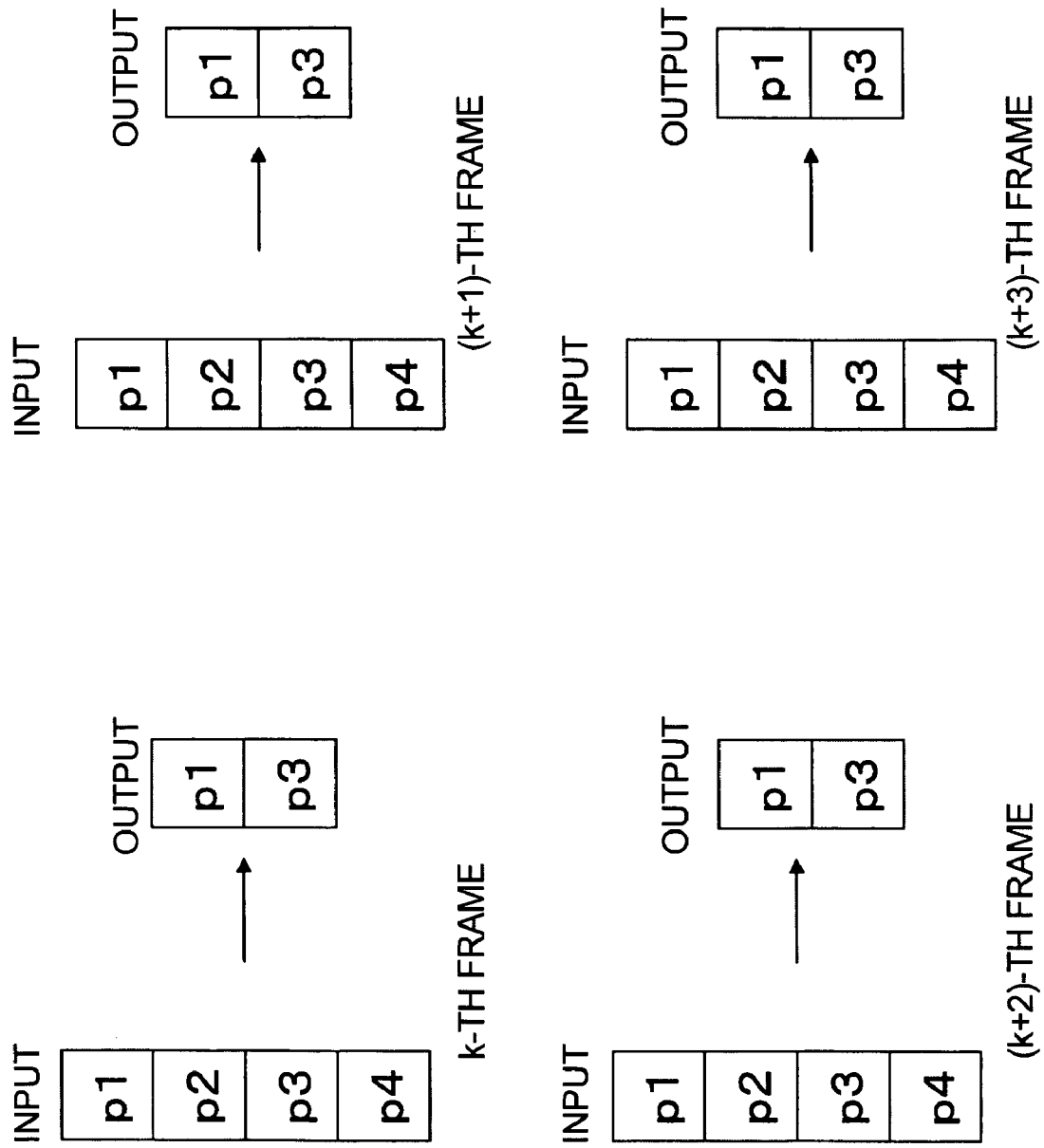
FIG. 35 is a diagram showing a process performed by a block processing unit of a motion image data conversion apparatus.
Figure 36:
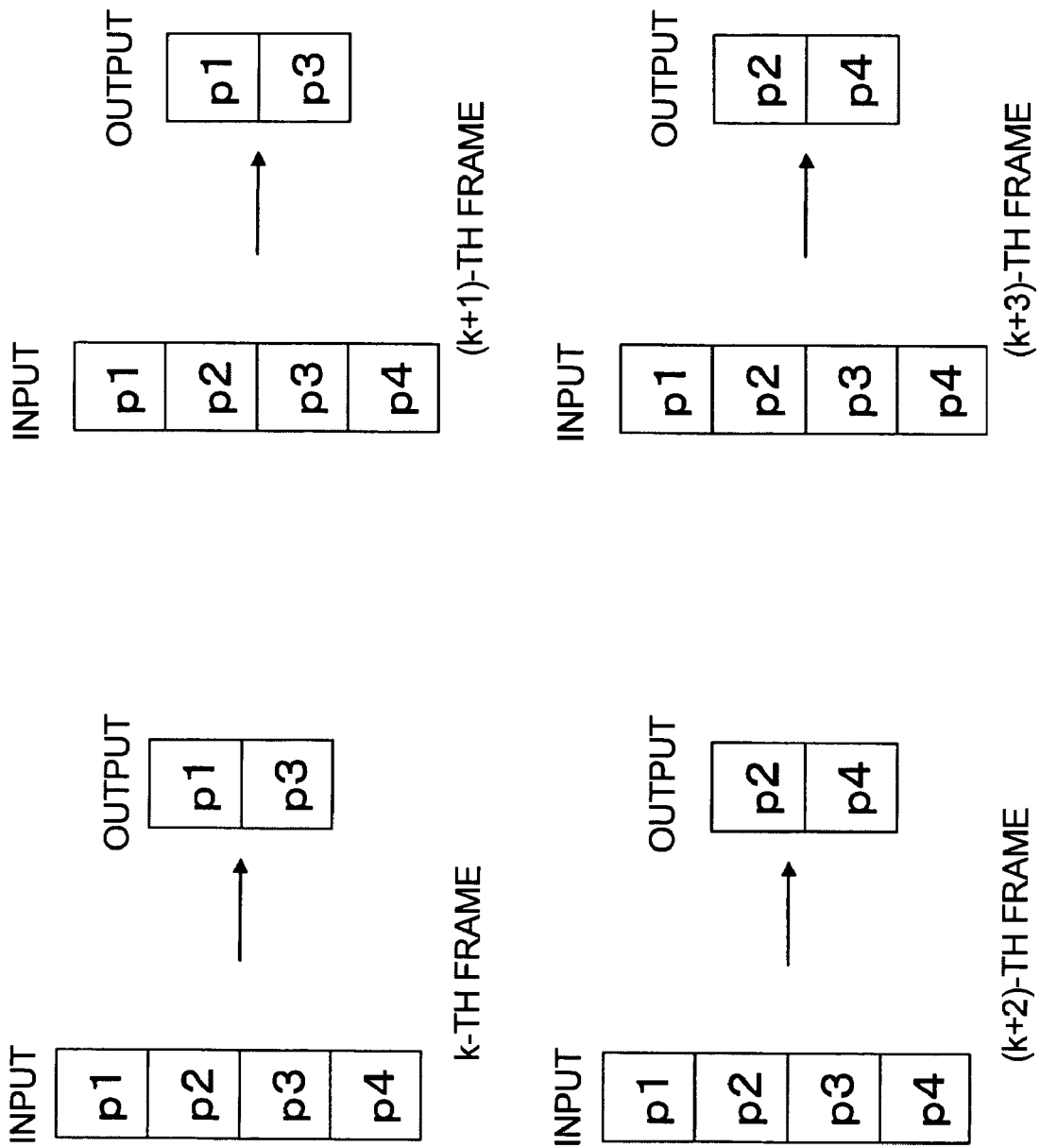
FIG. 36 is a diagram showing a process performed by a block processing unit of a motion image data conversion apparatus.
Figure 37:
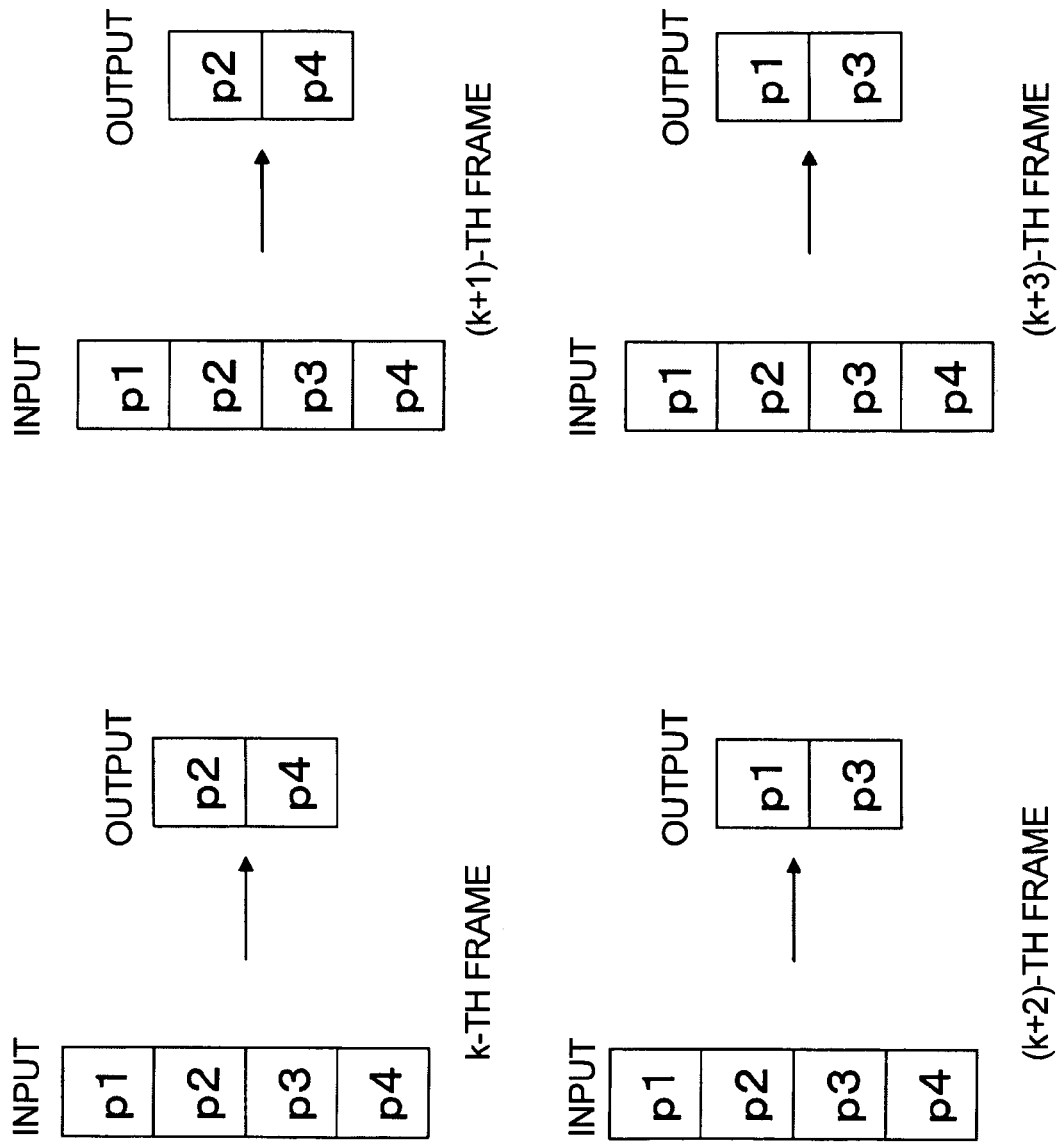
FIG. 37 is a diagram showing a process performed by a block processing unit of a motion image data conversion apparatus.

FIGS. 35 to 37 show examples of decimation processes performed by the block processing unit 132 when the moving speed v in the vertical direction is 1 to 2 pixels/frame.

In the example shown in FIG. 35, decimation is performed in the fixed SPP mode such that pixel values p1 to p4 of respective frames (k-th to (k+3)-th frames) are decimated into two pixel values equal to two pixel values (p1 and p3 in this specific example) selected from pixel values p1 to p4. In other words, two pixels are decimated into one pixel (that is, the decimation factor m=2).

In the example shown in FIG. 36, decimation is performed in the SPP shifting mode such that pixel values p1 to p4 of first two frames (k-th and (k+1)-th frames) are decimated into pixel values p1 and p3, and pixel values p1 to p4 of the following two frames ((k+2)-th and (k+3)-th frames) are decimated into pixel values p2 and p4. In the example shown in FIG. 37, decimation is also performed in the SPP shifting mode, but the decimation is performed such that pixel values p1 to p4 of first two frames (k-th and (k+1)-th frames) are decimated into pixel values p2 and p4, and pixel values p1 to p4 of the following two frames ((k+2)-th and (k+3)-th frames) are decimated into pixel values p1 and p3.

As with the block processing unit 131, the block processing unit 132 has a structure similar to that shown in FIG. 18. That is, the block processing unit 132 includes a decimation mode determination unit 151 and a decimation execution unit 152. The data indicating the amount of motion output from the motion detecting unit 121 is applied to the decimation mode determination unit 151. As described earlier, blocks supplied to the block processing unit 132 are those blocks whose moving speed v is 1 to 2 pixels/frame. Thus, the moving speed v indicated by the data input to the decimation mode determination unit 151 of the block processing unit 132 is 1 to 2 pixels/frame.

Based on the moving speed, the decimation mode determination unit 151 selects one of modes shown in FIG. 32 to 37 in which to perform decimation. In accordance with the determination made by the decimation mode determination unit 151, the decimation execution unit 152 executes the decimation process in the mode selected from those shown in FIG. 32 to 37.

Figure 24:
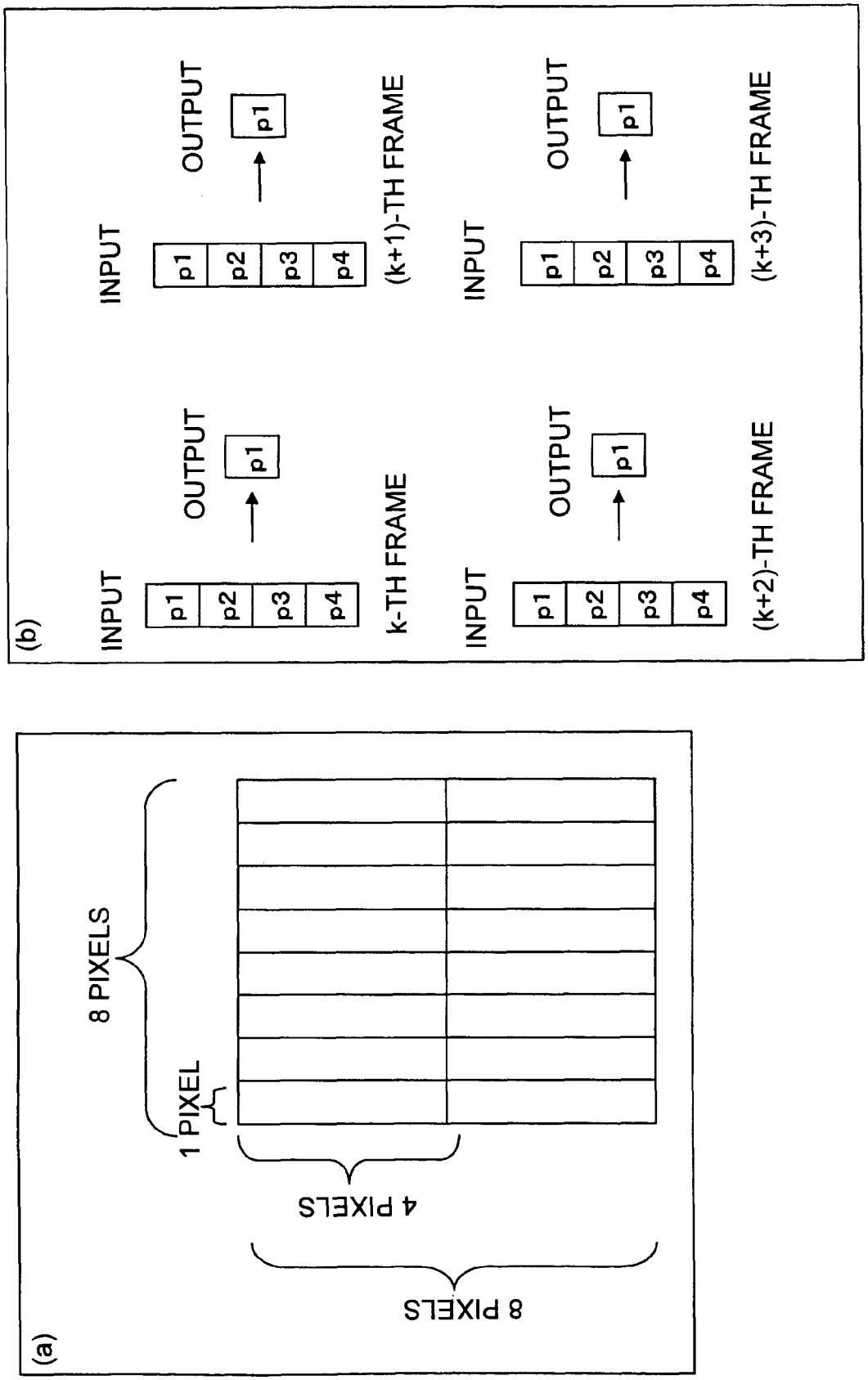
FIG. 24 is a diagram showing a process performed by a block processing unit of a motion image data conversion apparatus.
Figure 38:
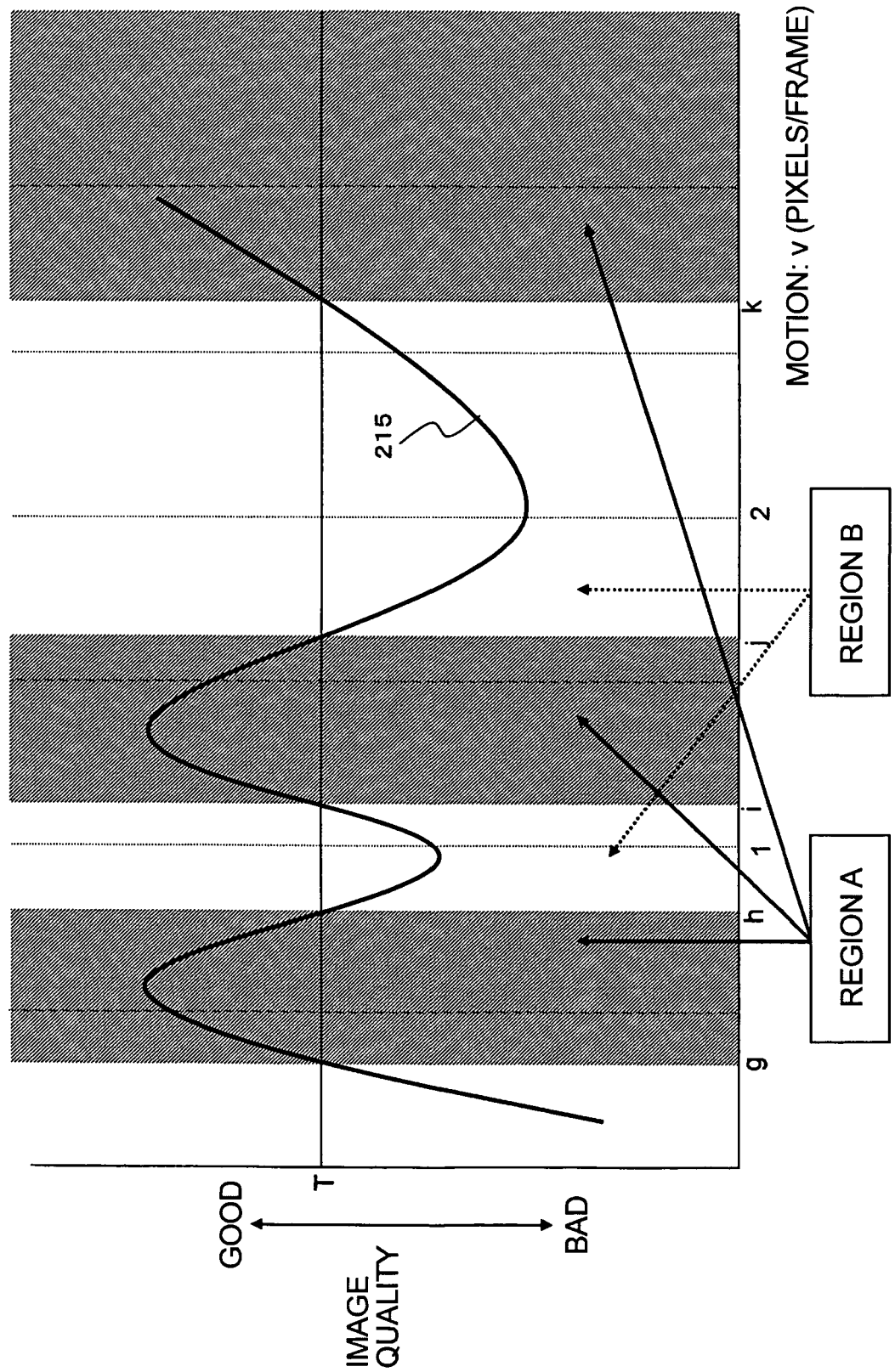
FIG. 38 is a graph showing the correspondence between the moving speed of a subject and the image quality of an image reproduced from data produced by a block processing unit of a motion image data conversion apparatus by performing a decimation process in the sampling point position shifting mode.
Figure 39:
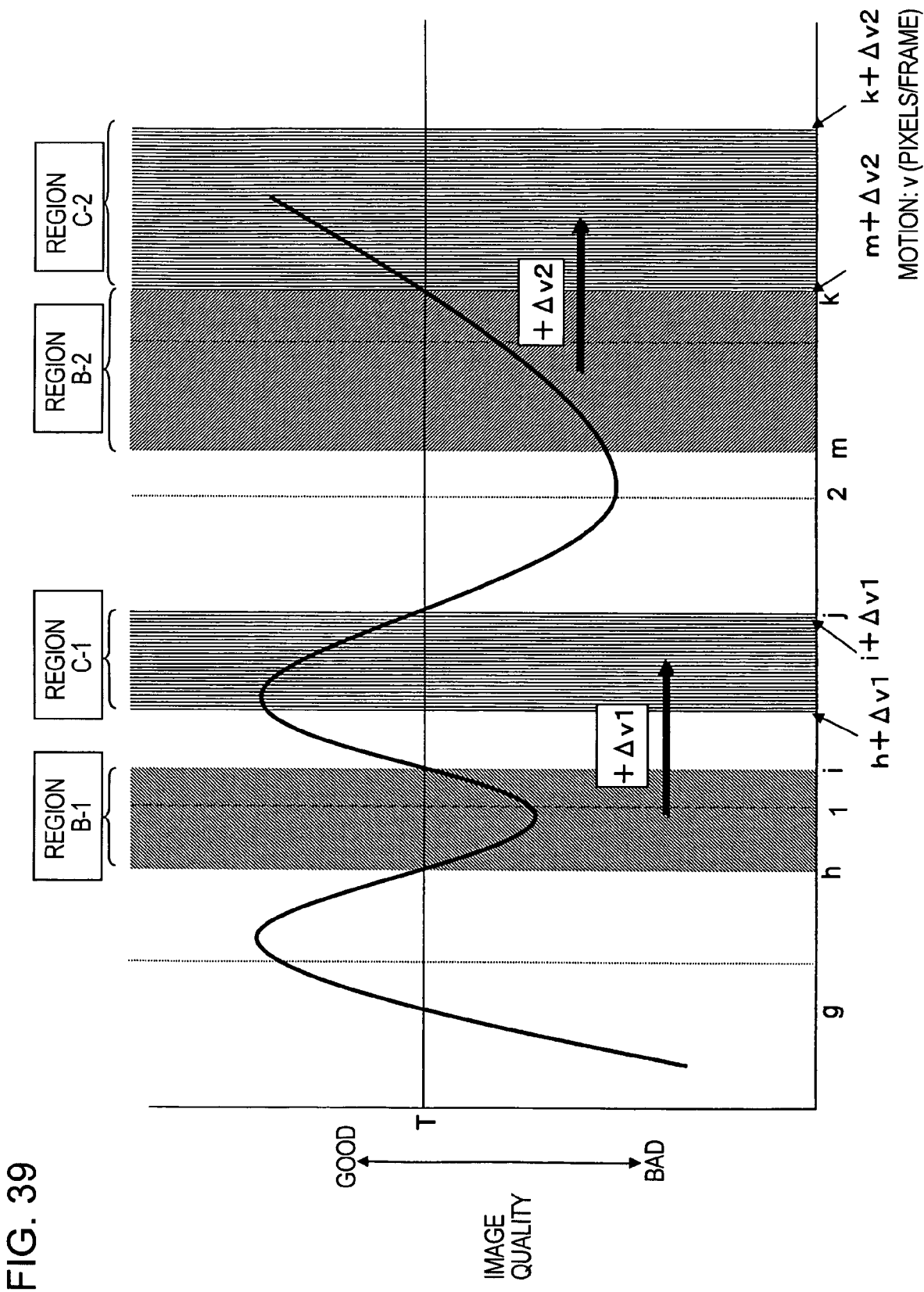
FIG. 39 is a graph showing a virtual change in the moving speed resulting from a decimation process in the sampling point position shifting mode performed by a block processing unit of a motion image data conversion apparatus.
Figure 40:
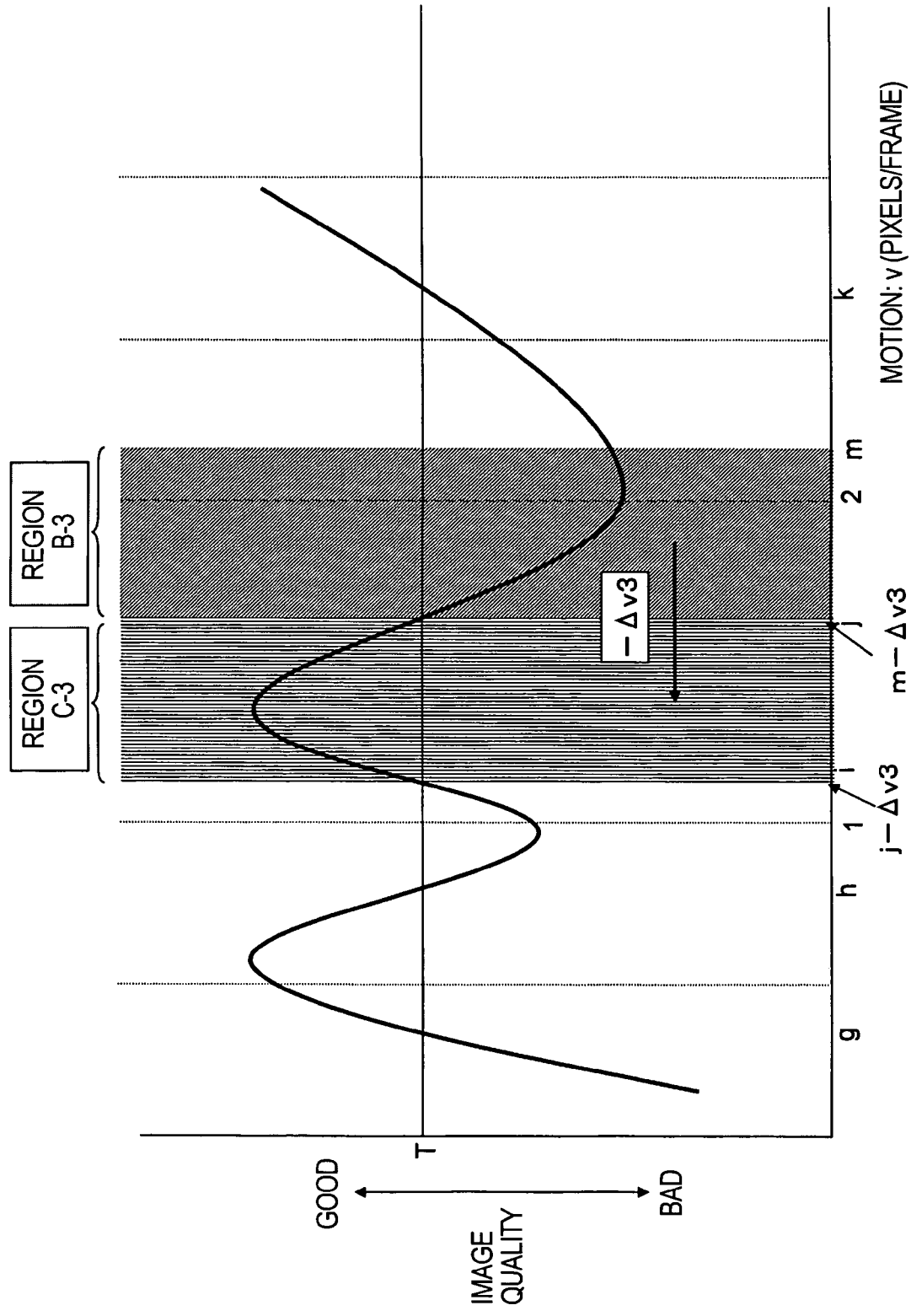
FIG. 40 is a graph showing a virtual change in the moving speed resulting from a decimation process in the sampling point position shifting mode performed by a block processing unit of a motion image data conversion apparatus.

The details of the decimation mode determination process performed by the decimation mode determination unit 151 of the block processing unit 132 are described below with reference to FIGS. 38 to 40. FIGS. 38 to 40 are graphs, similar to those shown in FIGS. 22 to 24, showing the quality of image data reproduced from data produced by performing decimation (spatial/temporal decimation) in the fixed SPP mode as shown in FIG. 32 or 35. In these graphs, the image quality based on subjective evaluation is plotted as a function of the moving speed of a subject. The horizontal axis represents the moving speed of the subject, and the vertical axis represents the image quality score.

In FIG. 38, as in FIG. 20, T denotes a threshold value of the image quality score. When the score is higher than the threshold value T, the image quality is regarded as good. In the example shown in FIG. 38, image quality scores higher than the threshold value T are obtained In regions denoted by A. In regions B other than the regions A, the image quality score is lower than the threshold value T. When a subject has a moving speed in one of these regions B, if decimation is performed in the fixed SPP mode, the super resolution effect cannot be obtained at all or the super resolution effect is insufficient even if it is obtained.

When the moving speed is in one of regions B, decimation is performed in the SPP shifting mode such that the moving speed of the subject is virtually accelerated or decelerated. More specifically, when the subject is moving in a horizontal direction, decimation is performed in the SPP shifting mode as shown in FIG. 33 or 34. When the subject is moving in a vertical direction, decimation is performed in the SPP shifting mode as shown in FIG. 36 or 37. By performing decimation in such a manner, as high image quality as that obtained in the regions A can be obtained.

In addition to the spatial decimation, the block processing unit 132 also performs temporal decimation. The temporal decimation is performed in a similar manner as described earlier with reference to FIG. 12. More specifically, for example, two frames are selected from successive four frames, and blocks of the four frames are decimated into blocks of the selected two frames. In a case in which temporal decimation is performed before spatial decimation is performed, data applied to the spatial decimation process has a frame rate one-half the original frame rate, and thus the effective moving speed of a subject in the decimation process in the SPP shifting mode becomes ±0.5 pixels/frame.

Regions B-1 and B-2 shown in FIG. 39 are part of the regions B shown in FIG. 38. In these regions B-1 and B-2, the image quality score is less than the threshold value, because the moving speed v of a subject does not have a value at which a sufficient super resolution effect occurs. When a subject moves at a speed in the range B-1 or B-2, if the subject is virtually accelerated (by +Δv1 or +Δv2), that is, if decimation is performed while shifting the decimation position in a direction opposite to a direction in which the subject is actually moves the region B-1 shown in FIG. 39 is effectively moved to a region C-1 and the region B-2 is effectively moved to a region C-2 As a result, the virtual moving speed per frame, v, of the subject is moved into one of regions (C-1 and C-1 shown in FIG. 39) in which the image quality score can be equal to or greater than the threshold value T. That is, by performing decimation while shifting the sampling point position to the left as the frame advances as shown in FIG. 33, 34, 36, or 37, it is possible to perform image data conversion (compression) without significant degradation in image quality.

Similarly, when a subject is moving at a speed in a range B-3 shown in FIG. 40, if the subject is virtually decelerated (by $-\Delta v3$), that is, if decimation is performed while shifting the decimation position in the same direction as a direction in which the subject is actually moves (for example, when the subject is moving to the right, the decimation process is performed as shown in FIG. 33), the region B-3 shown in FIG. 40 is effectively moved to a region C-3. As a result, the virtual moving speed per frame, v, of the subject falls within the region (C-3 shown in FIG. 40) in which the image quality score can be equal to or greater than the threshold value T, and thus image data conversion (compression) is performed without causing significant degradation in image quality.

In the motion image data conversion apparatus 100 according to the present embodiment, the block processing unit 132 performs spatial pixel decimation by a factor of 2 only for blocks whose motion in the horizontal or vertical direction is equal to or greater than 1 pixel/frame but less than 2 pixels/frame, and thus blocks whose moving speed v is less than 1 pixels/frame in the graphs shown in FIGS. 38 to 40 are not subjected to the process by the block processing unit 132. However, as described earlier, the above-described criterion used by the block dividing unit 122 to determine which one of the block processing units 131 to 133 of the block processor 130 to supply the block to is merely one example, and the block distributor 122 may supply the block whose motion is less than 1 pixel/frame to the block processing unit 132 to perform spatial decimation in one of decimation modes described above with reference to FIGS. 32 to 37. Therefore, the moving speed v less than 1 pixel/frame is also included in the graphs shown in FIGS. 32 to 37.

Note that the image quality evaluation curves shown in FIGS. 38 to 40 are merely examples based on a subjective evaluation result, and the image quality may be evaluated in many ways other than that described above and the decimation mode may be determined in accordance with the evaluation result.

In the block processing unit 132 shown in FIG. 14 responsible for processing block data with motion equal to or greater than 1 pixel/frame but less than 2 pixels/frame, the decimation mode determination unit 151 shown in FIG. 18 determines which one of modes described below should be used based on the amount of motion indicated by motion data received from the motion detector, and the decimation execution unit 152 shown in FIG. 18 executes decimation in the determined mode.

(a) Decimation is performed while fixing sampling point positions (FIGS. 32 and 35).

(b) Decimation is performed while shifting the sampling point position in the same direction as a direction in which a subject is moving, as the frame advances (FIGS. 33, 34, 36, and 37).

(c) Decimation is performed while shifting the sampling point position in a direction opposite to a direction in which a subject is moving, as the frame advances (FIGS. 33, 34, 36, and 37).

When the decimation mode determination unit 151 shown in FIG. 18 determines the decimation mode, for example, the image quality evaluation curves shown in FIGS. 38 to 40 are used. That is, when the moving speed is in a region in which an image quality score equal to or greater than the threshold value T is obtained judging from the image quality curve, decimation is performed in the fixed SPP mode, while when the moving speed is in a region in which the image quality score estimated from the image quality curve is less than the threshold value T, decimation is performed in the SPP shifting mode such that the amount of virtual motion falls within a range in which the image quality estimated based on the image quality curve is equal to or greater than the threshold value T.

The block processing unit 132 selects a proper decimation mode depending on the moving speed v per frame in the horizontal direction indicated by motion data received from the motion detecting unit 121. FIG. 41A is a table indicating the correspondence between the moving speed v and the decimation mode. FIG. 41B is a table representing the details of the respective decimation modes described in the table shown in FIG. 41A. In the table shown in FIG. 41A, values of i, j, m, and k corresponds to values of the moving speed indicated on the horizontal axes of FIGS. 38 to 40.

The decimation processing modes shown in FIG. 41A are described below.

When $1 \leq v < i$, decimation is performed in the mode 3 in which decimation position is shifted in a direction opposite to a direction in which a subject is moving.

When $i \leq v < j$, decimation is performed in the mode 1 in which decimation position is not shifted. When $j \leq v < m$, decimation is performed in the mode 2 in which decimation position is shifted in the same direction as a direction in which a subject is moving.

When $m \leq v < k$, decimation is performed in the mode 3 in which decimation position is shifted in a direction opposite to a direction in which a subject is moving.

When $k \leq v$, decimation is performed in the mode 1 in which decimation position is not shifted.

By changing the decimation mode depending on the moving speed v per frame of a subject included in a block in the above-described manner, it is possible to virtually change the moving speed of the subject such that the virtual moving speed falls within the range A shown in FIG. 38, thereby achieving image data conversion in a manner in which image quality score equal to or higher than the threshold value T is guaranteed.

Figure 12:
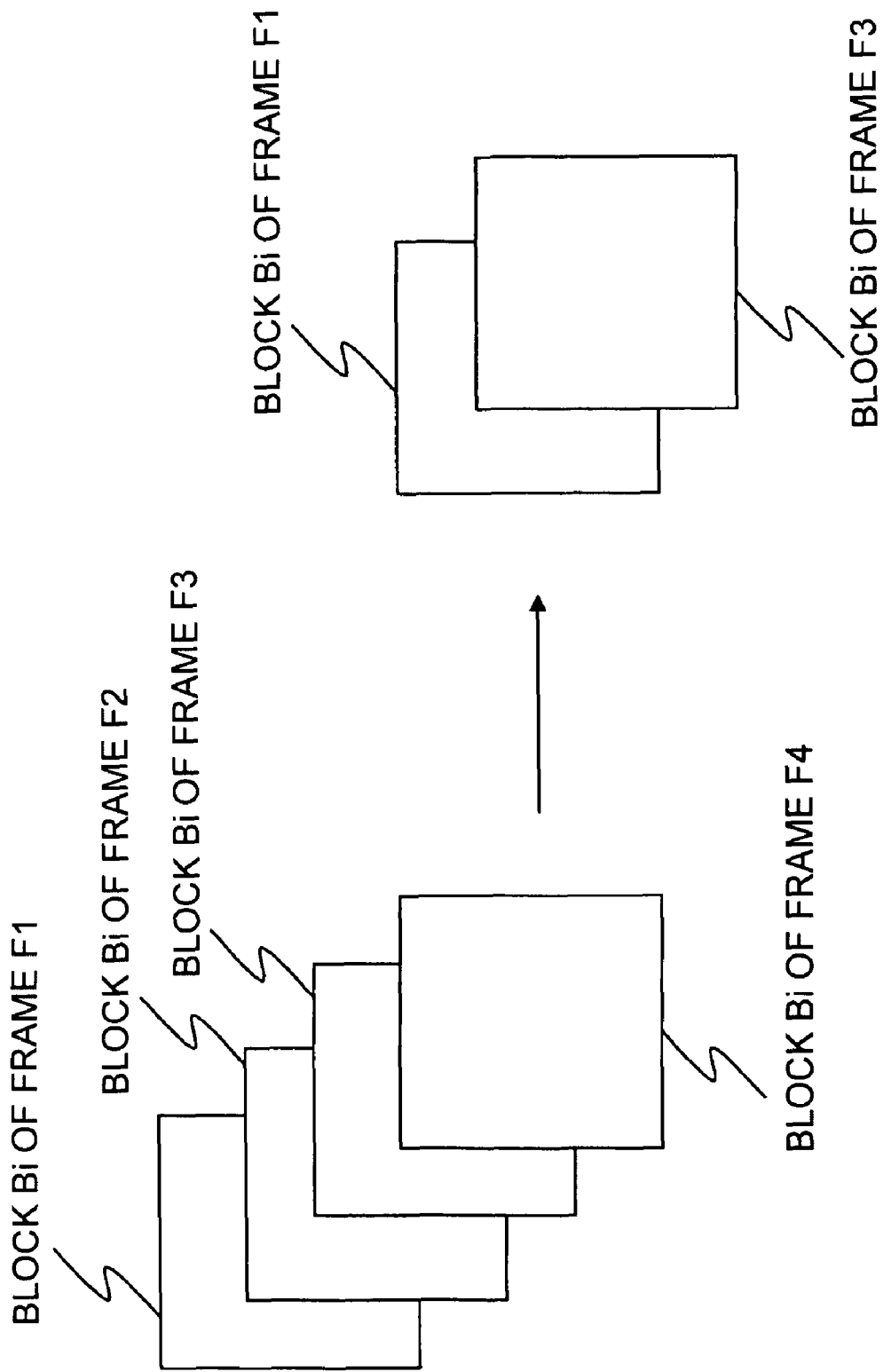
FIG. 12 is a diagram showing a process performed by a block processing unit of a motion image data conversion apparatus.

The block processing unit 132 performs decimation in one of modes depending on the moving speed v per frame of a subject included in a block as described above, and outputs resultant data to the output unit 140 (FIGS. 13 and 14). In addition to the spatial decimation by a factor of 2, the block processing unit 132 also performs temporal decimation (to decimate four frames into 2 frames) as shown in FIG. 12, and thus the data size of each block is reduced to ¼ of the original data size, and the total data size of four blocks is also reduced to ¼ of the original total data size. The resultant data of 4 blocks with the data size reduced by the factor of 4 is supplied from the block processing unit 131 to the output unit 14.

Either one of the spatial decimation and the temporal decimation may be performed first, and the other may be performed next, because the same result can be obtained regardless of the order of processing. The process described above can be performed for N/2 frames and N/2 adjacent pixels when N is a positive even number, and thus it is not necessarily needed to perform the process in units of 2 frames or in units of 2 pixels.

Although in the above-described example of the decimation process performed by the block processing unit 131, the decimation factor m=4 and the number of frames N=4, the parameters are not limited to these values. Note that the image quality evaluation curves 215 indicating the image quality as a function of the moving speed of a subject shown in FIGS. 38 to 40 are for the decimation factor m=4 and the number of frames N=4, and the image quality evaluation curve varies depending on the values of the parameters. Thus, it is necessary to determine an image quality evaluation curve for the specific parameter values employed, and determine the decimation mode depending on the determined image quality evaluation curve.

Now, the output unit 140 is described below. If the output unit 140 receives data of blocks with reduced data sizes from the block processing units 131 to 133 of the block processor 130, the output unit 140 outputs the received data together with data indicating the manner in which each block was processed. The data indicating the manner of processing includes data indicating which one of the spatial decimation mode, the temporal decimation mode, and the spatial/temporal decimation mode the processing was performed in, data indicating whether shifting of the decimation position was performed when the spatial decimation was performed, data indicating a manner in which the decimation position was shifted when the decimation position was shifted, and data indicating the frame rate and the spatial resolution of an original motion image. Note that other data may be included in the data indicating the manner of processing.

Figure 42:
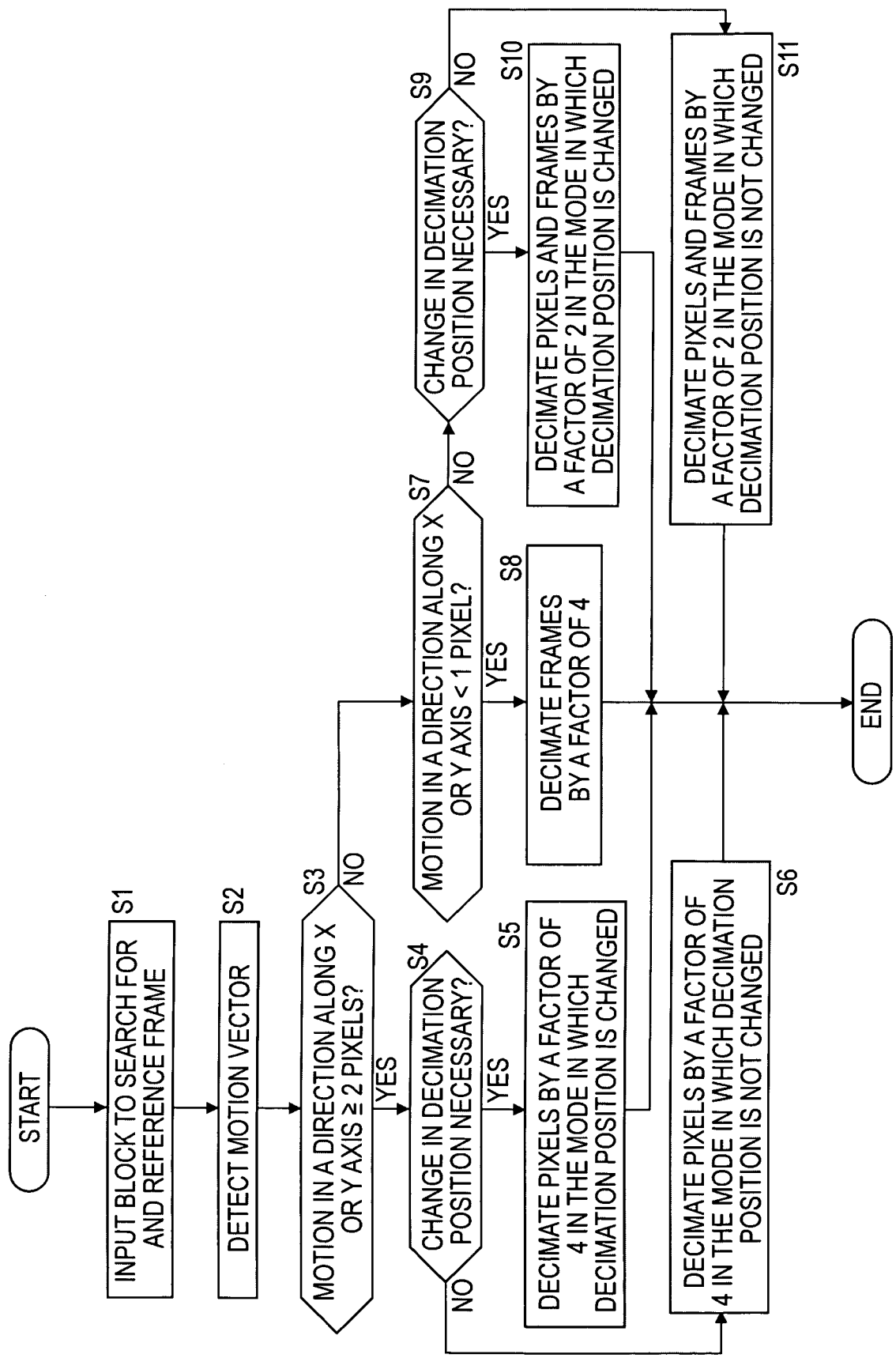
FIG. 42 is a flow chart of a process performed by a motion image data conversion apparatus.

Now, referring to a flow chart shown in FIG. 42, the operation of the motion detector 120 and the block processor 130 of the motion image data conversion apparatus 100 is described below.

In step S1, blocks of a P-th frame of four frames successively input to the motion image data conversion apparatus 100 are supplied to the motion detecting unit 121 of the motion detector 120 from the block dividing unit 112 of the block divider 110. Furthermore, the motion detecting unit 121 of the motion detector 120 receives an M-th frame (reference frame) from the image storage unit 111.

In step S2, the motion detecting unit 121 selects one of the blocks included in the P-th frame as a block of interest and detects the motion vector of the block of interest with respect to the reference frame. The motion detector 121 supplies the detected motion vector to the block distributor 122.

In step S3, the block distributor 122 determines whether the amount of motion, in the horizontal (X) direction or the vertical (Y) direction in which the amount of motion is greater than in the other direction, indicated by the motion vector supplied from the motion detecting unit 121 is equal to or greater than 2 pixels, the block distributor 122. If it is determined that at least the amount of motion in one of the horizontal (X) and vertical (Y) directions is equal to or greater than 2 pixels, the process proceeds to step S4.

In step S4, a determination as to the decimation mode is made by the decimation mode determination unit 151 (shown in FIG. 18) of the block processing unit 131 of the block processor 130. More specifically, based on the amount of motion, the decimation mode determination unit 151 determines which one of the modes shown in FIGS. 15 to 17 (when a subject is moving in a horizontal direction) or modes shown in FIGS. 24 to 16 (when the subject is moving in a vertical direction) the decimation should be performed in. That is, depending on the amount of motion indicated by the data supplied from the motion detecting unit 121, the decimation mode determination unit 151 determines whether to perform decimation in the fixed SPP mode (FIGS. 15 and 24) or the SPP shifting mode (FIGS. 16, 17, 25, and 26).

When the decimation mode determination unit 151 determines the decimation mode, for example, the image quality evaluation curves shown in FIGS. 20 to 22 are used. More specifically, when the amount of motion (per frame) in the horizontal (X) or vertical (Y) direction indicated by the motion vector supplied from the motion detecting unit 121 is within one of ranges in which the image quality score is equal to or greater than the threshold value T, the decimation is performed in the fixed SPP mode (FIG. 15 or 24). On the other hand, when the amount of motion (per frame) in the horizontal (X) or vertical (Y) direction indicated by the motion vector supplied from the motion detecting unit 121 is within one of ranges in which the image quality score is less than the threshold value T, the decimation is performed in the SPP shifting mode (FIG. 16, 17, 25, or 26) such that the amount of virtual motion falls within a range in which the image quality estimated based on the image quality curve is equal to or greater than the threshold value T.

If it is determined in step S4 that the amount of motion (per frame) in the horizontal (X) or vertical (Y) direction indicated by the motion vector supplied from the motion detecting unit 121 is within one of ranges in which the image quality score is equal to or greater than the threshold value T, then the decimation mode determination unit 151 determines, judging from the amount of motion, that decimation should be performed without shifting the decimation position. In this case, the process proceeds to step S6. In step S6, the decimation execution unit 152 shown in FIG. 18 executes a decimation process in the fixed SPP mode (FIG. 15 or 24).

On the other hand, if it is determined that the amount of motion (per frame) in the horizontal (X) or vertical (Y) direction indicated by the motion vector supplied from the motion detecting unit 121 is not within any one of ranges in which the image quality score is equal to or greater than the threshold value T, the decimation mode determination unit 151 determines that shifting of the decimation position should be performed. In this case, the process proceeds to step S5, and the decimation execution unit 152 shown in FIG. 18 executes a decimation process in the SPP shifting mode (FIG. 16, 17, 25, or 26). The decimation mode determination unit 151 also determines whether the sample position is shifted in the same direction as a direction in which a subject is moving or in an opposite direction, and the decimation execution unit 152 (FIG. 18) executes the decimation process in accordance with the determination made by the decimation mode determination unit 151.

That is, in step S5 or S6, the block processing unit 131 performs decimation on the four blocks supplied from the block distributor 122 as shown in FIG. 15, 16, or 17 or in FIG. 24, 25, or 26 such that the number of pixels is reduced by a factor of 4. The resultant data of four blocks whose data size was reduced to ¼ of the original data size is supplied to the output unit 140.

Note that in the example described above, it is assumed that the decimation factor m is equal to 4 and the number N of frames processed at a time is equal to 4. The values of the parameters are not limited to those employed above, but other values may be employed. When the parameters have other values, data is compressed by a different factor depending on the values of the parameters employed. Note that as described earlier with reference to FIGS. 20 to 22, the image quality evaluation curve indicating the image quality as a function of the moving speed of a subject varies depending on the values of parameters. Thus, it is necessary to determine an image quality evaluation curve for the specific parameter values employed, and determine the decimation mode depending on the determined image quality evaluation curve.

In a case in which the block distributor 122 determines in step S3 that the amount of motion indicated by the motion vector supplied from the motion detecting unit 121 is not equal to or greater than 2 pixels/frame in either the horizontal (X) direction or vertical (Y) direction, the process proceeds to step S7. In step S7, if the block distributor 122 further determines that the amount of motion (per frame) indicated by the motion vector supplied from the motion detecting unit 121 is less than 1 pixel/frame in both the horizontal (X) direction and the vertical (Y) direction, the process proceeds to step S8.

In step S8, only temporal decimation is performed by the block processing unit 133 of the block processor 130. More specifically, the block processing unit 133 performs frame decimation (temporal decimation) on a total of N blocks of successive N frames (whose motion is less than 1 pixel/frame both in the horizontal direction and in the vertical direction) supplied from the block distributor 122 of the motion detector 120.

More specifically, as described earlier with reference to FIG. 31, the block processing unit 133 performs frame decimation such that four blocks Bi at the same position of respective four successive frames F1 to F4 are decimated into one block (block Bi of frame F1 in the example shown in FIG. 9) selected from thee four blocks.

The resultant data of the four blocks whose total data size was reduced to ¼ of the original total data size via the temporal decimation is supplied from the block processing unit 133 to the output unit 140 (that is, the data of one block is supplied to the output unit 140). Although in the present example N=4, the value of N is not limited to 4 but N may have another value.

Furthermore, although in the present example, the block Bi of the frame F1 is selected from blocks Bi of four frames F1 to F4 and the selected block Bi of the frame F1 is output as the surviving block, a block of another frame may be selected. Yet alternatively, a block may be calculated from four frames F1 and F4, and the resultant block may be output.

In a case in which the block distributor 122 determines in step S7 that the amount of motion in either the horizontal (X) or vertical (Y) direction indicated by the motion vector supplied from the motion detecting unit 121 is less than 1 pixel/frame, the process proceeds to step S9.

In step S9, a determination as to the decimation mode is made by the decimation mode determination unit 151 (shown in FIG. 18) of the block processing unit 132 of the block processor 130. More specifically, the decimation mode determination unit 151 determines which one of the modes shown in FIGS. 32 to 34 (when a subject is moving in a horizontal direction) or modes shown in FIGS. 35 to 37 (when the subject is moving in a vertical direction) the decimation should be performed in. That is, depending on the amount of motion indicated by the data supplied from the motion detecting unit 121, the decimation mode determination unit 151 determines whether to perform decimation in the fixed SPP mode (FIG. 32 or 35) or the SPP shifting mode (FIG. 33, 34, 36, or 37).

When the decimation mode determination unit 151 determines the decimation mode, for example, the image quality evaluation curves shown in FIGS. 38 to 40 are used. More specifically, when the amount of motion (per frame) in the horizontal (X) or vertical (Y) direction indicated by the motion vector supplied from the motion detecting unit 121 is within one of ranges in which the image quality score is equal to or greater than the threshold value T, the decimation is performed in the fixed SPP mode (FIG. 32 or 35). On the other hand, when the amount of motion (per frame) in the horizontal (X) or vertical (Y) direction indicated by the motion vector supplied from the motion detecting unit 121 is within one of ranges in which the image quality score is less than the threshold value T, the decimation is performed in the SPP shifting mode (FIG. 33, 34, 36, or 37) such that the amount of virtual motion falls within a range in which the image quality estimated based on the image quality curve is equal to or greater than the threshold value T.

If it is determined in step S9 that the amount of motion (per frame) in the horizontal (X) or vertical (Y) direction indicated by the motion vector supplied from the motion detecting unit 121 is within one of ranges in which the image quality score is equal to or greater than the threshold value T, the decimation mode determination unit 151 determines that shifting of the decimation position should not be performed. In this case, the process proceeds to step S11, and the decimation execution unit 152 shown in FIG. 18 executes a spatial decimation process in the fixed SPP mode (FIG. 32 or 35). Furthermore, the decimation execution unit 152 executes a temporal decimation process in such a manner as described earlier with reference to FIG. 12. Note that either one of the spatial decimation and the temporal decimation may be performed first, and the other process may be performed next.

On the other hand, if it is determined that the amount of motion (per frame) in the horizontal (X) or vertical (Y) direction indicated by the motion vector supplied from the motion detecting unit 121 is not within any one of ranges in which the image quality score is equal to or greater than the threshold value T, the decimation mode determination unit 151 determines that shifting of the decimation position should be performed. In this case, the process proceeds to step S10, and the decimation execution unit 152 shown in FIG. 18 executes a decimation process in the SPP shifting mode (FIG. 33, 34, 36, or 37). Furthermore, the decimation execution unit 152 executes a temporal decimation process in such a manner as described earlier with reference to FIG. 12. Note that either one of the spatial decimation and the temporal decimation may be performed first, and the other process may be performed next.

The decimation mode determination unit 151 also determines whether the sample position is shifted in the same direction as a direction in which a subject is moving or in an opposite direction, and the decimation execution unit 152 (FIG. 18) executes the decimation process in accordance with the determination made by the decimation mode determination unit 151.

That is, in step S10 or step S11, the block processing unit 132 performs the spatial decimation by a factor of m=2 and also the temporal decimation on the four blocks supplied from the block distributor 122, and the resultant data of four blocks whose data size was reduced to ¼ of the original data size is supplied to the output unit 140.

Note that, as described above, the values of parameters such as the decimation factor m and the number N of frames processed at a time are not limited to those employed above, but other values may be employed. When the parameters have other values, data is compressed by a different factor depending on the values of the parameters employed. Note that as described earlier with reference to FIGS. 38 to 40, the image quality evaluation curve indicating the image quality as a function of the moving speed of a subject varies depending on the values of parameters. Thus, it is necessary to determine an image quality evaluation curve for the specific parameter values employed, and determine the decimation mode depending on the determined image quality evaluation curve.

The above-described process is performed each time blocks of N (for example, four) frames are supplied from the block divider 110.

At a stage following the output unit 140 of the motion image data conversion apparatus 100 shown in FIG. 13, there is disposed a storage medium such as a hard disk or a DVD or a network output device so that the compressed data obtained via the above-described process is stored or output over a network.

(3) Apparatus and Method of Reproducing Motion Image Data

A motion image reproduction apparatus for reproducing a motion image from compressed data produced by the motion image data conversion apparatus 100 and a method of reproducing a motion image are described below.

FIG. 43 shows the structure of the motion image reproduction apparatus 300. As shown in FIG. 43, the motion image reproduction apparatus 300 includes a distributor 310, block decompressors 321 to 323, and a combiner 330.

Compressed data produced by the motion image data conversion apparatus 100 described above and associated attributed data necessary to reproduce the image from the compressed data are input to the distributor 310. The attribute data includes not only attribute data of blocks but also data indicating the manner in which blocks were processed, that is, data indicating whether spatial decimation or temporal decimation was performed, whether the spatial decimation was performed in the fixed SPP mode or the SPP shifting mode if the spatial decimation was performed, and in which direction the sample point position was shifted if the spatial decimation was performed in the SPP shifting mode.

In accordance with the manner, indicated by the input attribute data, in which blocks were processed, the distributor 310 supplies the compressed data to be decompressed and the attribute data indicating the manner in which the blocks were process to one of the block decompressors 321 to 323.

More specifically, in a case in which the blocks are those processed by the block processing unit 131 of the motion image data conversion apparatus 100 shown in FIGS. 13 and 14, the distributor 310 supplies, to the block decompressor 321, the block data subjected to the spatial decimation together with data indicating which direction the spatial decimation was performed in, whether the decimation position was shifted, and whether which direction the decimation position was shifted in.

On the other hand, in a case in which the blocks are those processed by the block processing unit 132 of the motion image data conversion apparatus 100, the distributor 310 supplies similar data to the block decompressor 322. In a case in which the blocks are those processed by the block processing unit 133 of the motion image data conversion apparatus 100, the distributor 310 supplies similar data to the block decompressor 323. Note that there is no particular restriction on the data associated with blocks and the data indicating the manner in which blocks were processed, as long as data indicates information sufficient to reproduce a motion image.

Figure 44A:
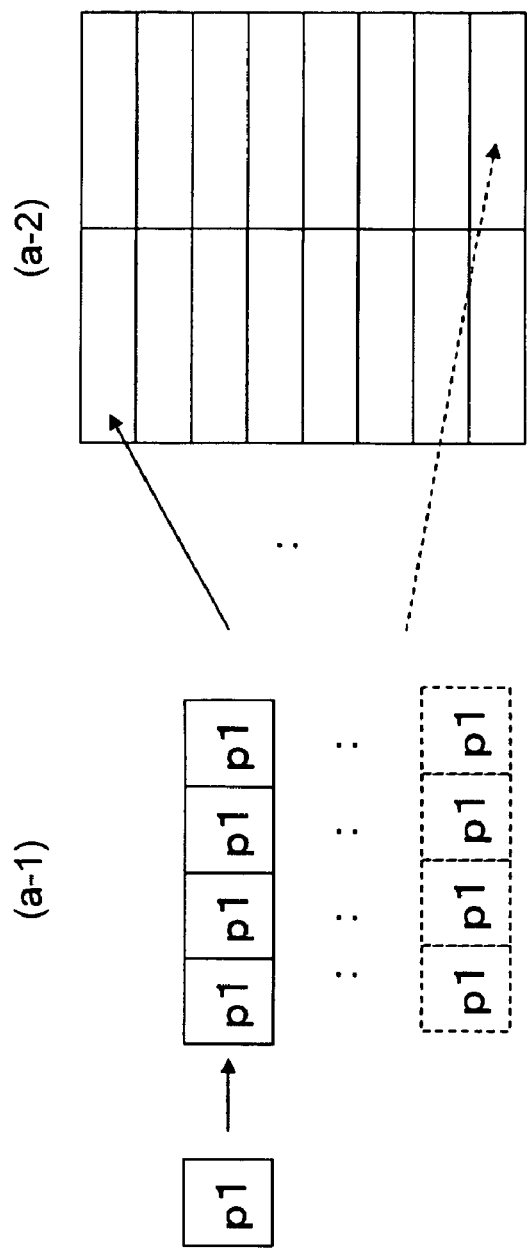
FIGS. 44A and 44B are diagrams showing processes performed by a block decompressor of a motion image reproduction apparatus.
Figure 44B:
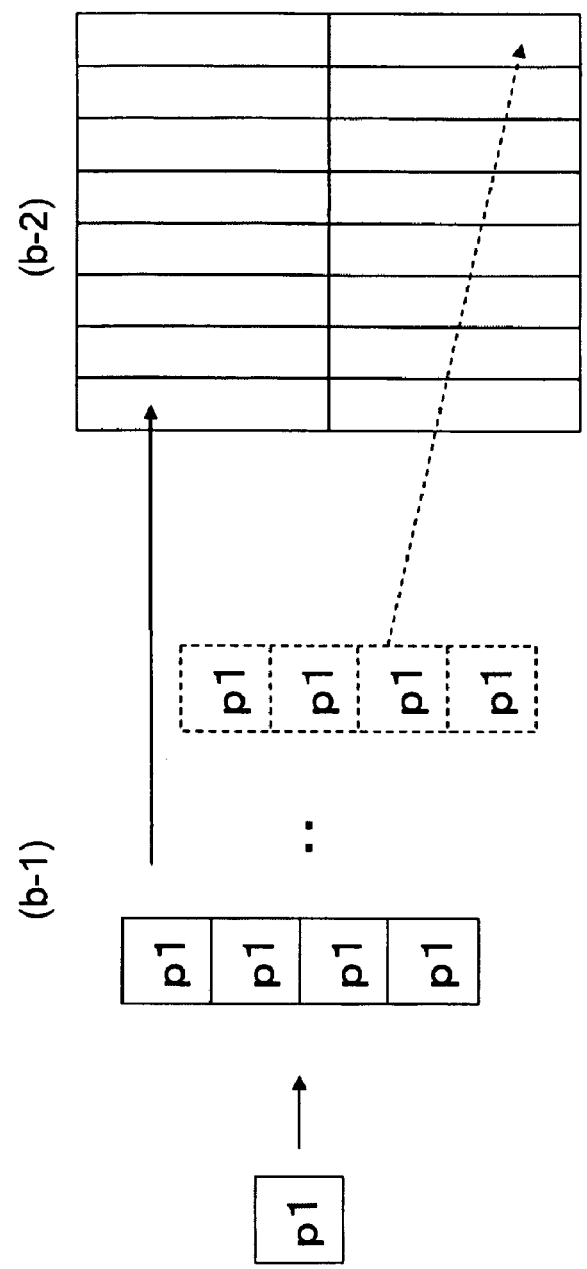

The block decompressor 321 decompresses the data subjected to the spatial decimation performed by the block processing unit 131 of the motion image data conversion apparatus 100. The decompression is performed as shown in FIG. 44A or 44B in accordance with the data supplied from the distributor 310 and indicating which direction the spatial decimation was performed in, whether shifting of the decimation position was performed, and which direction the decimation position was shifted in, thereby reconstructing the block. The resultant reconstructed block and data indicating the mode in which the process was performed are output to the combiner 330.

The process shown in FIGS. 44A and 44B are described in further detail below. FIG. 44A shows the process performed by the block decompressor 321 of the motion image reproduction apparatus 300 to decompress data subjected to the spatial decimation in the horizontal direction by the block processing unit 131 of the motion image data conversion apparatus 100. For example, when the original block has a size of 8×8 pixels, the data supplied to the block decompressor 321 has a data size one-quarter the original data size, that is, the data supplied to the block decompressor 321 includes 16 pixels. The block decompressor 321 expands each pixel into 1×4 pixels by performing a process (a-1) shown in FIG. 44. Although in the process (a-1) shown in FIG. 44, the given pixel value is directly used as pixel values of all four expanded pixels, pixel values of four expanded pixels may be calculated from the given pixel value and other pixel values.

In a case in which decimation in the horizontal direction was performed, the block decompressor 321 further performs a process (a-2) shown in FIG. 44. More specifically, a set of 1×4 pixels obtained via the process (a-1) is laid as shown in (a-2) thereby reproducing a block including 8×8 pixels from the input 16 pixels. The resultant reproduced data is output to the combiner 330 together with data indicating the manner in which decimation was performed.

FIG. 44B shows a process performed by the block decompressor 321 to decompress data subjected to the spatial decimation in the vertical direction by the block processing unit 131 of the motion image data conversion apparatus 100. For example, when the original block has a size of 8×8 pixels, the data supplied to the block decompressor 321 has a data size one-quarter the original data size, that is, the data supplied to the block decompressor 321 includes 16 pixels. The block decompressor 321 expands each pixel into 4×1 pixels by performing a process (b-1) shown in FIG. 44. Although in the process (b-1) shown in FIG. 44, the given pixel value is directly used as pixel values of all four expanded pixels, pixel values of four expanded pixels may be calculated from the given pixel value and other pixel values.

In a case in which decimation in the vertical direction was performed, the block decompressor 321 further performs a process (b-2) shown in FIG. 44. More specifically, a set of 4×1 pixels obtained via the process (b-1) shown in FIG. 44 is laid as shown in (b-2) thereby reproducing a block including 8×8 pixels from the input 16 pixels. The resultant reproduced data is output to the combiner 330 together with data indicating the manner in which decimation was performed.

Now, a process performed by the block decompressor 323 is described. The block decompressor 323 decompresses the data subjected to the temporal decimation performed by the block processing unit 133 of the motion image data conversion apparatus 100.

Figure 45:
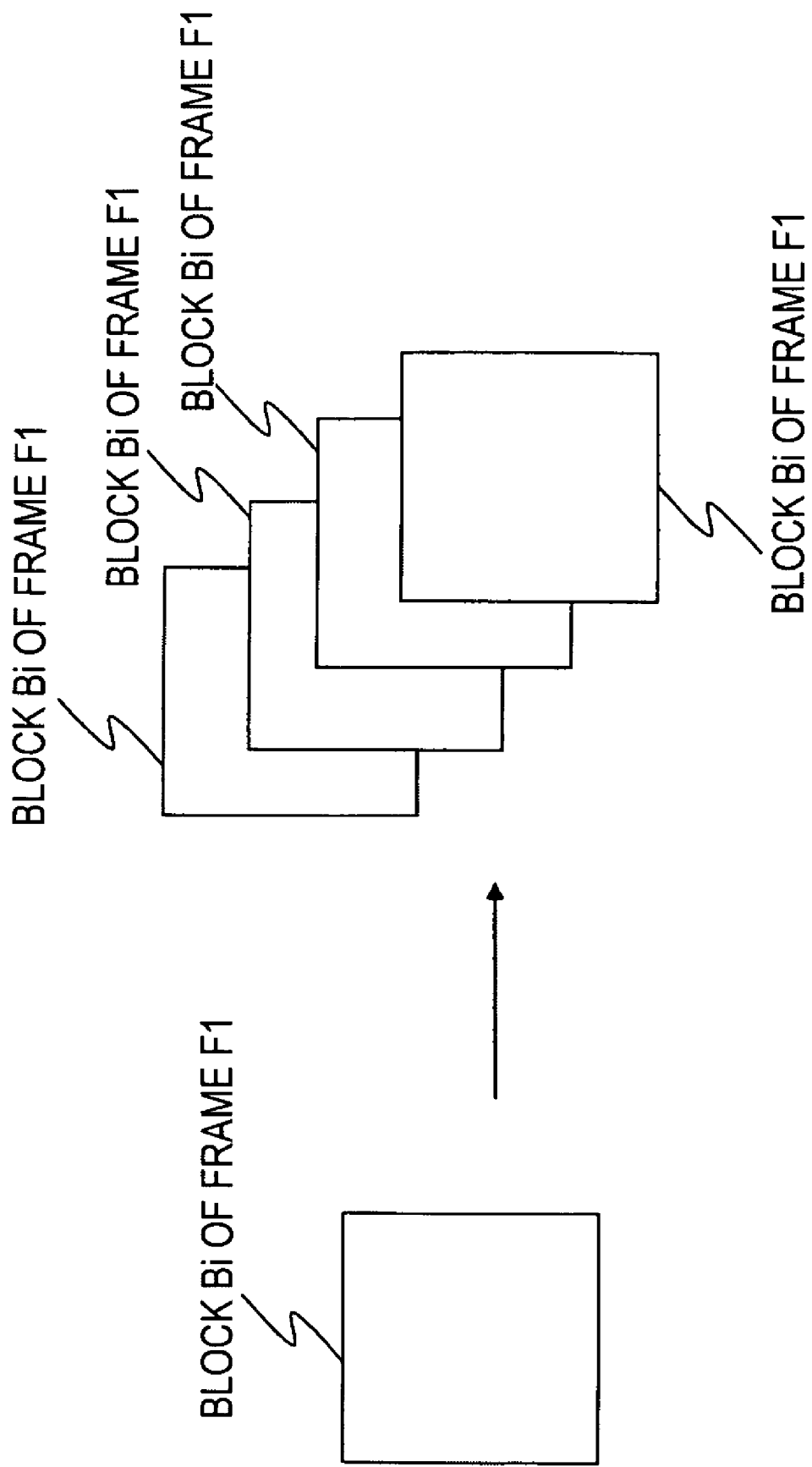
FIG. 45 is a diagram showing a process performed by a block decompressor of a motion image reproduction apparatus.

As shown in FIG. 45, the block decompressor 323 produces block data of a plurality of frames from block data of one frame. More specifically, the block decompressor 323 has a counter whose initial value is set to 0. Each time reproduction of one frame of data is completed, the counter is incremented by 1. When the counter value reaches 4 (=N (when m=4)), the counter value is reset to 0.

When block data to be expanded is received from the data distributor 310, the block data is stored in the memory of the data decompressor 323, and block data of a plurality of frames is produced by copying the block data stored in the memory until the counter value reaches the allowable upper limit preset depending on the decimation factor. The resultant data is output to the mixer 330. In the example shown in FIG. 45, the decimation factor m=4, and thus block data for four frames is produced from one block data, and the produced data is output to the mixer 330.

Now, a process performed by the block decompressor 322 is described below. The block decompressor 323 is responsible for decompression of data subjected to the spatial and temporal decimation performed by the block processing unit 132 of the motion image data conversion apparatus 100. Note that either one of the spatial decompression and the temporal decompression may be performed first, and the other process may be performed next.

Figure 46:
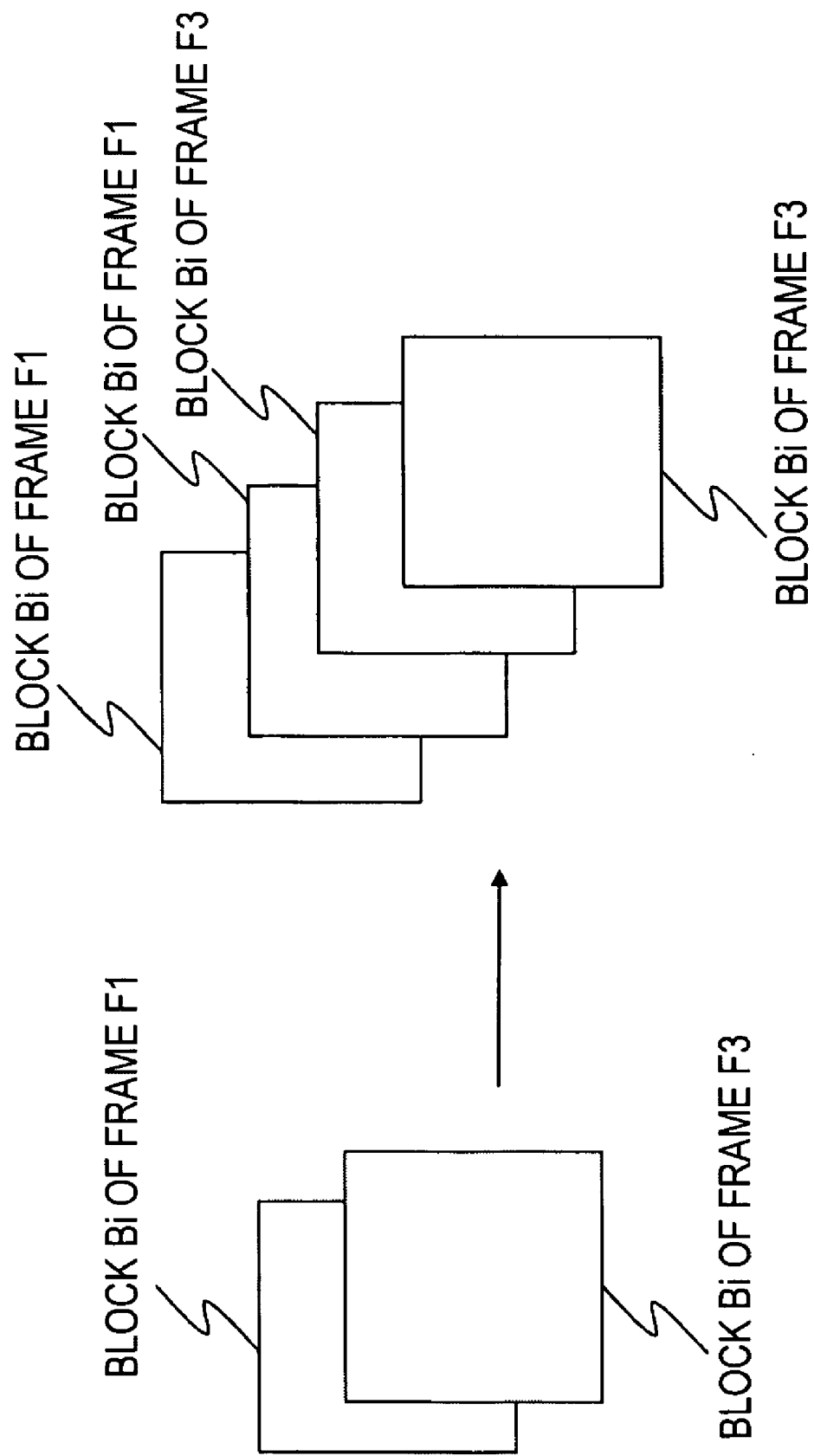
FIG. 46 is a diagram showing a process performed by a block decompressor of a motion image reproduction apparatus.

FIG. 46 shows an example of a manner in which the block decompressor 322 performs temporal decompression. The block decompressor 322 has a counter whose initial value is set to 0. Each time reproduction of one frame of data is completed, the counter is incremented by 1. When the counter value reaches 2 (=N/2 (when temporal decimation factor m=2)), the counter value is reset to 0.

When block data to be decompressed is received from the data distributor 310, the block data is stored in the memory of the data decompressor 322, and block data of a plurality of frames is produced by copying the block data stored in the memory until the counter value reaches the allowable upper limit preset depending on the decimation factor. The resultant data is output to the mixer 330. In the example shown in FIG. 46, the temporal decimation factor m=2, and thus block data for two frames is produced from one block data.

The block decompressor 322 performs a spatial decompression process as follows. Data expansion (decompression) is performed as shown in FIG. 47A or 47B in accordance with the data (supplied from the distributor 310) indicating which direction the spatial decimation was performed in, whether shifting of the decimation position was performed, and which direction the decimation position was shifted in, thereby reconstructing the block.

The process shown in FIGS. 47A and 47B are described in further detail below. FIG. 47A shows the process performed by the block decompressor 322 of the motion image reproduction apparatus 300 to decompress data subjected to the spatial decimation in the horizontal direction by the block processing unit 132 of the motion image data conversion apparatus 100. For example, when the original block has a size of 8×8 pixels, the data supplied to the block decompressor 321 has a data size one-half the original data size, that is, the data supplied to the block decompressor 321 includes 32 pixels. The block decompressor 321 expands each two pixels into 1×4 pixels by performing a process (a-1) shown in FIG. 47. Although in the process (a-1) shown in FIG. 47, the given pixel values of two pixels are directly used to produce four expanded pixels, pixel values of four expanded pixels may be calculated from the given pixel value and other pixel values.

In a case in which decimation in the horizontal direction was performed, the block decompressor 322 further performs a process (a-2) shown in FIG. 47. More specifically, a set of 1×4 pixels obtained via the process (a-1) is laid as shown in (a-2) thereby reproducing a block including 8×8 pixels from the input 32 pixels. The resultant reproduced data is output to the combiner 330 together with data indicating the manner in which decimation was performed.

FIG. 47B shows a process performed by the block decompressor 322 to decompress data subjected to the spatial decimation in the vertical direction by the block processing unit 132 of the motion image data conversion apparatus 100. For example, when the original block has a size of 8×8 pixels, the data supplied to the block decompressor 321 has a data size one-half the original data size, that is, the data supplied to the block decompressor 321 includes 32 pixels. The block decompressor 321 expands each two pixels into 4×1 pixels by performing a process (b-1) shown in FIG. 47. Although in the process (b-1) shown in FIG. 47, the given pixel values of two pixels are directly used to produce four expanded pixels, pixel values of four expanded pixels may be calculated from the given pixel value and other pixel values.

In a case in which decimation in the vertical direction was performed, the block decompressor 322 further performs a process (b-2) shown in FIG. 47. More specifically, a set of 4×1 pixels obtained via the process (b-1) shown in FIG. 47 is laid as shown in (b-2) thereby reproducing a block including 8×8 pixels from the input 32 pixels. The resultant reproduced data is output to the combiner 330 together with data indicating the manner in which decimation was performed.

When the number of blocks input to the combiner 330 from the block decompressors 321 to 323 has reached a value that allows one complete frame to be reproduced, the combiner 330 lays the received blocks in a proper manner in accordance with the data which was received together with the blocks and which indicates the manner in which the decimation was performed, thereby reproducing one complete frame. The resultant reproduced one frame of data is output from the combiner 330. The block laying process is described in further detail below with reference to FIGS. 48 to 51.

FIGS. 48 to 51 show examples of data of one frame including a plurality of blocks. In these examples shown in FIGS. 48 to 51, one frame of data is composed of 3×3 blocks, that is, 9 blocks. In these figures, each square bordered by dotted lines is a block. A shaded square (for example, a block 401 in FIG. 48) denotes a block of interest that was received from one of the block decompressors 321 to 323 and is to be laid by the combiner 330.

FIG. 48 shows a manner of laying a block that was supplied to the combiner 330 from one of the block decompressor 321 to 323 and that is to be laid by the combiner 330 is a block that was not subjected to shifting of the decimation position. In this case, the combiner 330 lays the block at the same position as the original position at which the block was divided by the block divider 110 of the motion image data conversion apparatus 100 shown in FIGS. 13 and 14.

FIGS. 49A to 49D show examples of manners of laying blocks supplied from one of the block decompressor 321 to 323 in a case in which the blocks were subjected to the spatial decimation in which the sampling point position was shifted horizontally.

Figure 49B:
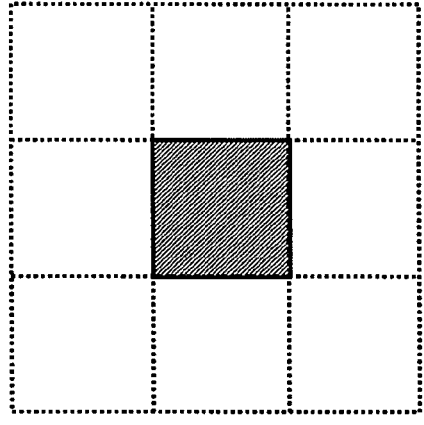
FIGS. 49A to 49D are diagrams showing a block laying process performed by a motion image reproduction apparatus.
Figure 49D:
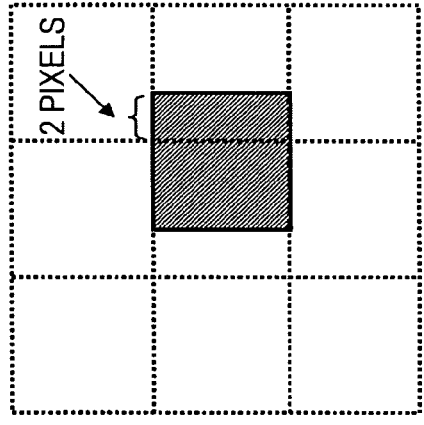
Figure 49A:
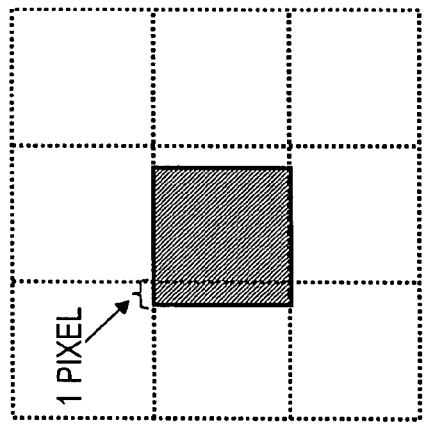

The block shown in FIG. 49A is a block of a first frame (when motion image data is processed in units of 4 (=N) frames) reproduced from block data that was subjected to the decimation in which the sampling point position was shifted to the right with frame advance, in the manner as described earlier with reference to FIG. 16, or the block shown in FIG. 49A is a block of a fourth frame (when motion image data is processed in units of 4 (=N) frames) reproduced from block data that was subjected to the decimation in which the sampling point position was shifted to the left with frame advance, in the manner as described earlier with reference to FIG. 17. In this case, the block is laid at a position shifted to the left by one pixel from the position of the input data.

The block shown in FIG. 49B is a block of a second frame (when motion image data is processed in units of 4 (=N) frames) reproduced from block data that was subjected to the decimation in which the sampling point position was shifted to the right with frame advance, in the manner as described earlier with reference to FIG. 16, or the block shown in FIG. 49B is a block of a third frame (when motion image data is processed in units of 4 (=N) frames) reproduced from block data that was subjected to the decimation in which the sampling point position was shifted to the left with frame advance, in the manner as described earlier with reference to FIG. 17. In this case, the block is laid at the same position as the position of the input data.

Figure 49C:
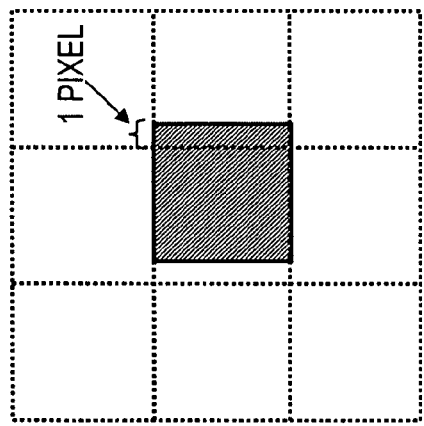

The block shown in FIG. 49C is a block of a third frame (when motion image data is processed in units of 4 (=N) frames) reproduced from block data that was subjected to the decimation in which the sampling point position was shifted to the right with frame advance, in the manner as described earlier with reference to FIG. 16, or the block shown in FIG. 49C is a block of a second frame (when motion image data is processed in units of 4 (=N) frames) reproduced from block data that was subjected to the decimation in which the sampling point position was shifted to the left with frame advance, in the manner as described earlier with reference to FIG. 17. In this case, the block is laid at a position shifted to the right by one pixel from the position of the input data.

The block shown in FIG. 49D is a block of a fourth frame (when motion image data is processed in units of 4 (=N) frames) reproduced from block data that was subjected to the decimation in which the sampling point position was shifted to the right with frame advance, in the manner as described earlier with reference to FIG. 16, or the block shown in FIG. 49D is a block of a first frame (when motion image data is processed in units of 4 (=N) frames) reproduced from block data that was subjected to the decimation in which the sampling point position was shifted to the left with frame advance, in the manner as described earlier with reference to FIG. 17. In this case, the block is laid at a position shifted to the right by two pixels from the position of the input data.

As described above, when motion image data is reproduced from data subjected to the decimation process in which the sampling point position was shifted in the horizontal direction, the mixer 330 horizontally shifts, frame by frame, the positions at which reproduced blocks are laid. The reason why shifting of positions is necessary is described below with reference to FIG. 50.

FIGS. 50A to 50D each show pixels constituting part of a block of frame data corresponding to FIGS. 49A to 49D. As can be seen from FIGS. 50A to 50D, in the production of conversion data, the sampling point position was shifted by one pixel to the right, frame by frame.

When decimation is performed by factor m=4, four pixel values in a horizontal line are decimated into one pixel value equal to one of the four pixel values. However, the true position of such the pixel value changes by one pixel, frame by frame, as shown in FIGS. 50A to 50D rather than at a fixed position. If the position of the pixel value is set to be nearly at the center of the display area, then the pixel position changes in the display area (denoted by a dotted line) of the original data starting from a position shifted to the left by one pixel shown in FIG. 50A to a position shifted to the right by two pixels shown in FIG. 50D, and thus the resultant displayed image becomes closer to the original image data.

FIGS. 51A to 51D show examples of manners of laying blocks supplied from one of the block decompressor 321 to 323 in a case in which the blocks were subjected to the spatial decimation in which the sampling point position was shifted vertically.

Figure 51A:
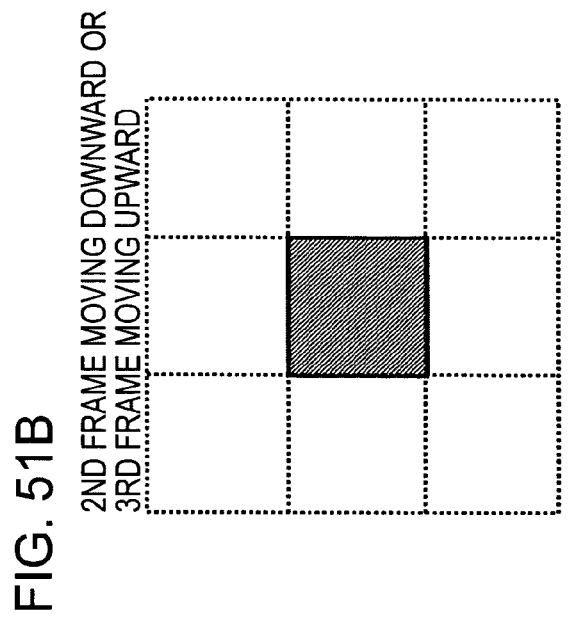
FIGS. 51A to 51D are diagrams showing a block laying process performed by a motion image reproduction apparatus.

The block shown in FIG. 51A is a block of a first frame (when motion image data is processed in units of 4 (=N) frames) reproduced from block data that was subjected to the decimation in which the sampling point position was shifted downward with frame advance, in the manner as described earlier with reference to FIG. 25, or the block shown in FIG. 51A is a block of a fourth frame (when motion image data is processed in units of 4 (=N) frames) reproduced from block data that was subjected to the decimation in which the sampling point position was shifted upward with frame advance, in the manner as described earlier with reference to FIG. 26. In this case, the block is laid at a position shifted upward by one pixel from the position of the input data.

Figure 51B:
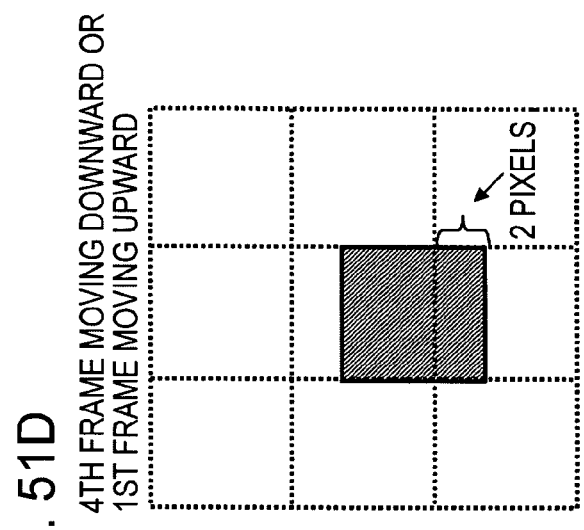

The block shown in FIG. 51B is a block of a second frame (when motion image data is processed in units of 4 (=N) frames) reproduced from block data that was subjected to the decimation in which the sampling point position was shifted downward with frame advance, in the manner as described earlier with reference to FIG. 25, or the block shown in FIG. 51B is a block of a third frame (when motion image data is processed in units of 3 (=N) frames) reproduced from block data that was subjected to the decimation in which the sampling point position was shifted upward with frame advance, in the manner as described earlier with reference to FIG. 26. In this case, the block is laid at the same position as the position of the input data.

Figure 51C:
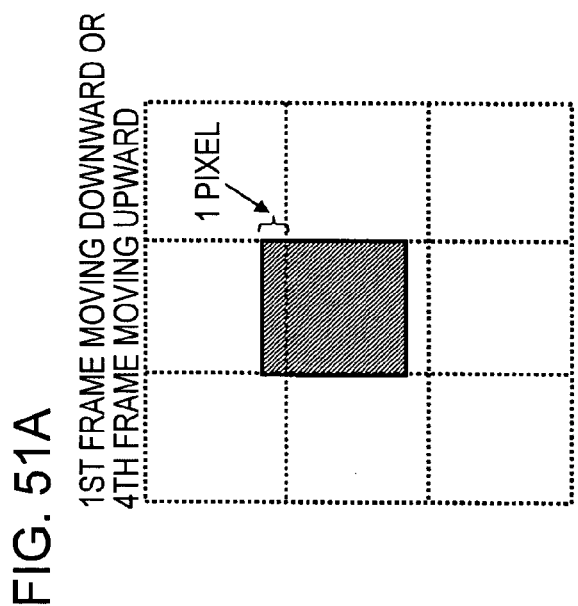

The block shown in FIG. 51C is a block of a third frame (when motion image data is processed in units of 4 (=N) frames) reproduced from block data that was subjected to the decimation in which the sampling point position was shifted downward with frame advance, in the manner as described earlier with reference to FIG. 25, or the block shown in FIG. 51C is a block of a second frame (when motion image data is processed in units of 2 (=N) frames) reproduced from block data that was subjected to the decimation in which the sampling point position was shifted upward with frame advance, in the manner as described earlier with reference to FIG. 26. In this case, the block is laid at a position shifted downward by one pixel from the position of the input data.

Figure 51D:
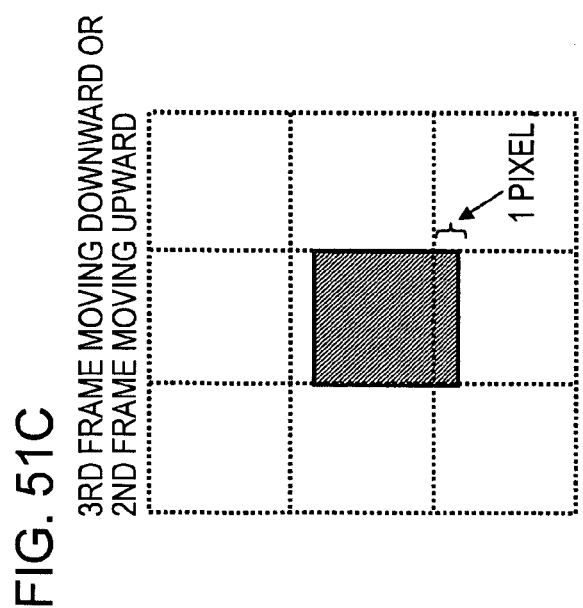

The block shown in FIG. 51D is a block of a fourth frame (when motion image data is processed in units of 4 (=N) frames) reproduced from block data that was subjected to the decimation in which the sampling point position was shifted downward with frame advance, in the manner as described earlier with reference to FIG. 25, or the block shown in FIG. 51D is a block of a first frame (when motion image data is processed in units of 4 (=N) frames) reproduced from block data that was subjected to the decimation in which the sampling point position was shifted upward with frame advance, in the manner as described earlier with reference to FIG. 26. In this case, the block is laid at a position shifted downward by two pixels from the position of the input data.

As described above, when motion image data is reproduced from data subjected to the decimation process in which the sampling point position was shifted vertically, the mixer 330 vertically shifts, frame by frame, the positions at which reproduced blocks are laid for a reason similar to the reason for the horizontal shifting described above with reference to FIG. 50, that is, the vertical shifting is performed to achieve a reproduced image more similar to the original image.

Figure 52B:
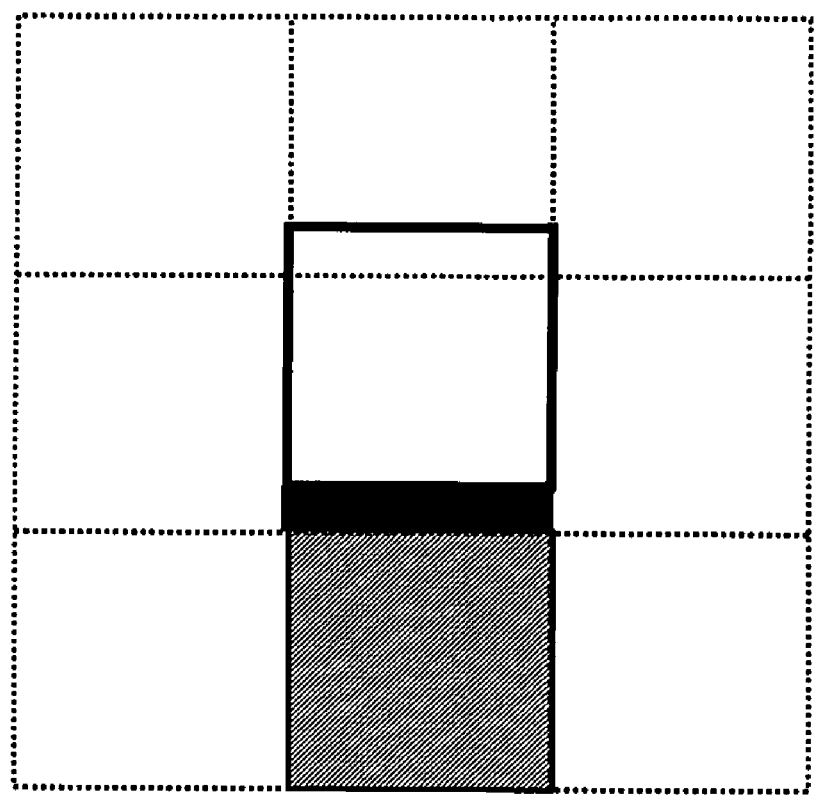
FIGS. 52A and 52B are diagrams showing a block laying process and a correction process performed by a motion image reproduction apparatus.
Figure 52A:
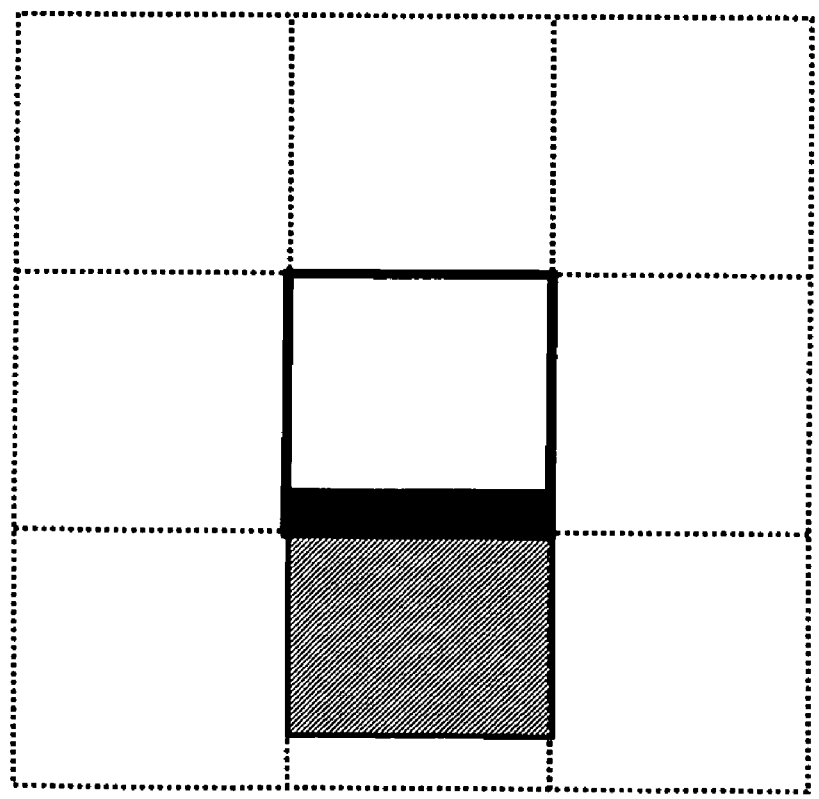

When a block is laid at a position shifted from an original position as described above, there is a possibility that two adjacent blocks overlap each other as shown in FIG. 52A or a gap is created between two adjacent blocks as shown in FIG. 52B, depending on the manner in which adjacent two blocks was processed. When there is an overlap, pixel values in the overlap area may be replaced with the average values of pixel values of respective blocks in the overlap area. When a gap is created, the gap may be filled with pixel values calculated, for example, by means of linear interpolation, from pixel values located at edges facing the gap. After obtaining a complete frame data by performing such a correction, the combiner 330 outputs the resultant frame data.

The present invention has been described above with reference to specific embodiments by way of example and not limitation. It should be apparent to those skilled in the art that various modifications and substitutions are possible without departing from the spirit and the scope of the invention. That is, the embodiments have been described above by way of example and not limitation. The scope of the invention is to be determined solely by the claims.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). The program may also be temporarily or permanently stored in a removable storage medium such as a flexible disk, a CD-ROM (Compact Disc Read Only Memory), an MO (Magneto-optical) disk, a DVD (Digital Versatile Disc), a magnetic disk, or a semiconductor memory. The program stored on such a removable storage medium may be supplied in the form of so-called packaged software.

Instead of installing the program from the removable storage medium onto the computer, the program may also be transferred to the computer from a download site via radio transmission or via a network such as an LAN (Local Area Network) or the Internet by means of wire communication. In this case, the computer receives the program transmitted in the above-described manner and installs the program on a storage medium such as a hard disk disposed in the computer.

The processes disclosed in the present description may be performed time-sequentially in the same order as that described in the program, or may be performed in parallel or individually depending on the processing power of the computer. In the present description, the term "system" is used to describe a logical collection of a plurality of devices, and it is not necessarily required that the plurality of devices be disposed in a single case.

It should be understood by those skilled in the art that various modifications, combinations, sub-combinations and alterations may occur depending on design requirements and other factors insofar as they are within the scope of the appended claims or the equivalents thereof.

What is claimed is:

1. A motion image data conversion apparatus comprising:
a block divider that divides each frame of the motion image data into blocks;
a motion detector that detects the amount of motion of a subject for each block generated by the block divider; and
a block processing unit that receives block data of blocks generated by the block divider and the data of motion detected by the motion detector and that decimates the block data;
wherein,
the block processing unit includes (1) a decimation mode determination unit that determines a decimation mode as to whether to perform spatial decimation in a fixed sampling point position mode or a sampling point position shifting mode, in accordance with the data of motion and (2) a decimation execution unit that executes spatial decimation in the fixed sampling point position mode or the sampling point position shifting mode in accordance with a determination made by the decimation mode determination unit,
the decimation mode determination unit further includes a memory adapted to store a decimation mode determined for a previous frame by the decimation mode determination unit; and
the decimation mode determination unit determines the decimation mode in accordance with data indicating the correspondence between an evaluated image quality score and a moving speed of a subject, the evaluated image quality score being estimated for data obtained as a result of the decimation process in the fixed sampling point position mode, and also in accordance with the decimation mode determined for the previous frame, the determination being made such that when the decimation mode determined for the previous frame was the fixed sample point position mode and when a moving speed of a subject indicated by the data of motion detected by the motion detector corresponds to an evaluated image quality score equal to or higher than a predetermined threshold value T1, the decimation mode determination unit determines that the decimation process should be performed in the fixed process point position mode,
when the decimation mode determined for the previous frame was the fixed sample point position mode and when a moving speed of a subject indicated by the data of motion detected by the motion detector corresponds to an evaluated image quality score lower than the predetermined threshold value T1, the decimation mode determination unit determines that the decimation process should be performed in the process point position shifting mode,
when the decimation mode determined for the previous frame was the sample point position shifting mode and when a moving speed of a subject indicated by the data of motion detected by the motion detector corresponds to an evaluated image quality score lower than a predetermined threshold value T2, the decimation mode determination unit determines that the decimation process should be performed in the process point position shifting mode, and
when the decimation mode determined for the previous frame was the sample point position shifting mode and when a moving speed of a subject indicated by the data of motion detected by the motion detector corresponds to an evaluated image quality score equal to or higher than the predetermined threshold value T2, the decimation mode determination unit determines that the decimation process should be performed in the fixed process point position mode.

2. A motion image data conversion apparatus comprising:
a block divider that divides each frame of the motion image data into blocks;
a motion detector that detects the amount of motion of a subject for each block generated by the block divider; and
a block processing unit that receives block data of blocks generated by the block divider and the data of motion detected by the motion detector and that decimates the block data,
wherein,
the block processing unit includes (1) a decimation mode determination unit that determines a decimation mode as to whether to perform spatial decimation in a fixed sampling point position mode or a sampling point position shifting mode, in accordance with the data of motion and (2) a decimation execution unit that executes spatial decimation in the fixed sampling point position mode or the sampling point position shifting mode in accordance with a determination made by the decimation mode determination unit, the block processing unit further includes a memory adapted to store data indicating a mode in which the sample point position is shifted or fixed in the spatial decimation process performed by the block processing unit for a previous frame; and the block processing unit performs a spatial decimation process on a current frame in a mode in which the sampling point position is shifted or fixed, the mode being determined such that when the virtual moving speed of a subject obtained as a result of spatial decimation performed on the previous frame depending on the mode in which the sampling point position was shifted or fixed is evaluated based on data indicating the correspondence between the moving speed of a subject and the image quality score for data obtained as a result of decimation in the fixed sampling point position mode, if an image quality score corresponding to the virtual moving speed of the subject is equal to or higher than a predetermined threshold value T3, then the spatial decimation is performed in the same mode as the mode used in the spatial decimation performed on the previous frame, but when the virtual moving speed of the subject obtained as the result of spatial decimation performed on the previous frame depending on the mode in which the sampling point position was shifted or fixed is evaluated based on data indicating the correspondence between the moving speed of a subject and the image quality score for data obtained as a result of decimation in the fixed sampling point position mode, if the image quality score corresponding to the virtual moving speed of the subject is lower than the predetermined threshold value T3, then the spatial decimation is performed in a mode selected such that the virtual speed of the subject obtained as a result of the decimation falls within a range of the moving speed in which the image quality score evaluated based on the data indicating the correspondence between the moving speed of a subject and the image quality score for data obtained as a result of decimation in the fixed sampling point position mode is equal to or higher than a predetermined threshold value T4.

* * * * *